(12) United States Patent
Chou

(10) Patent No.: US 10,564,383 B2
(45) Date of Patent: Feb. 18, 2020

(54) IMAGING LENS SET WITH PLASTIC LENS ELEMENT, IMAGING LENS MODULE AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 215 days.

(21) Appl. No.: 15/687,708

(22) Filed: Aug. 28, 2017

(65) Prior Publication Data

US 2018/0292626 A1 Oct. 11, 2018

(30) Foreign Application Priority Data

Apr. 10, 2017 (TW) .............................. 106111916 A

(51) Int. Cl.
*G02B 7/02* (2006.01)
*G02B 27/00* (2006.01)
*G02B 13/00* (2006.01)
*G02B 1/04* (2006.01)

(52) U.S. Cl.
CPC ............. *G02B 7/022* (2013.01); *G02B 7/021* (2013.01); *G02B 13/001* (2013.01); *G02B 1/041* (2013.01)

(58) Field of Classification Search
CPC ............. G02B 13/002; G02B 13/0055; G02B 27/0018; G02B 7/021; G02B 7/022; G02B 7/028; G02B 13/003; G02B 13/0035; G02B 13/004; G02B 13/0045

USPC .......................................................... 359/738
See application file for complete search history.

(56) References Cited

U.S. PATENT DOCUMENTS

| 6,011,661 | A  | 1/2000  | Weng         |
| 6,898,030 | B1 | 5/2005  | Lin et al.   |
| 7,293,886 | B2 | 11/2007 | Homgren et al. |
| 7,545,583 | B2 | 6/2009  | Hayashi et al. |
| 7,965,445 | B2 | 6/2011  | Chen et al.  |
| 8,031,412 | B2 | 10/2011 | Shintani     |

(Continued)

FOREIGN PATENT DOCUMENTS

| CN | 203658652 U | 6/2014 |
| CN | 205333947 U | 6/2016 |

(Continued)

*Primary Examiner* — Jordan M Schwartz
(74) *Attorney, Agent, or Firm* — McClure, Qualey & Rodack, LLP

(57) ABSTRACT

An imaging lens set includes a plastic lens element. The plastic lens element having a central axis includes an object-side surface and an image-side surface, wherein the image-side surface is located opposite to the object-side surface. Each of the object-side surface and the image-side surface includes an effective optical section and a lens peripheral section in order from the central axis to an edge of the plastic lens element. The effective optical section is for being passed through by an imaging light and aspheric. The lens peripheral section surrounds the effective optical section. At least one of the lens peripheral section of the object-side surface and the lens peripheral section of the image-side surface includes at least one annular groove structure, wherein the annular groove structure includes a plurality of stepped surfaces and is not in contact with the optical elements.

26 Claims, 50 Drawing Sheets

(56) References Cited

U.S. PATENT DOCUMENTS

| | | | |
|---|---|---|---|
| 8,102,609 B2 | 1/2012 | Tsuchiya et al. | |
| 8,253,839 B2 | 8/2012 | Chang | |
| 8,320,059 B2 | 11/2012 | Lin | |
| 8,493,673 B2 | 7/2013 | Yen | |
| 8,736,989 B2 | 5/2014 | Wu | |
| 8,780,461 B2 | 7/2014 | Watanabe | |
| 8,842,376 B2 | 9/2014 | Yang et al. | |
| 9,019,617 B2 | 4/2015 | Tsai | |
| 9,329,355 B2 | 5/2016 | Lyu | |
| 9,413,937 B2 | 8/2016 | Lin | |
| 9,638,838 B1* | 5/2017 | Fan | G02B 3/08 |
| 9,864,160 B2 | 1/2018 | Lin et al. | |
| 2004/0105173 A1* | 6/2004 | Yamaguchi | G02B 9/06 |
| | | | 359/793 |
| 2005/0243429 A1* | 11/2005 | Shulepova | G02B 3/00 |
| | | | 359/601 |
| 2010/0027137 A1* | 2/2010 | Noh | G02B 7/021 |
| | | | 359/811 |
| 2013/0050850 A1* | 2/2013 | Lin | G02B 7/021 |
| | | | 359/738 |
| 2014/0347738 A1* | 11/2014 | Tsai | G02B 13/0015 |
| | | | 359/642 |
| 2015/0062727 A1 | 3/2015 | Kang | |
| 2015/0103407 A1 | 4/2015 | Chen | |
| 2015/0146310 A1 | 5/2015 | Choi | |
| 2015/0277085 A1* | 10/2015 | Noda | G02B 13/0045 |
| | | | 359/713 |
| 2015/0323708 A1 | 11/2015 | Hashimoto et al. | |
| 2016/0349476 A1 | 12/2016 | Lin et al. | |
| 2017/0010434 A1 | 1/2017 | Chou | |
| 2017/0176649 A1 | 6/2017 | Chang | |
| 2018/0013939 A1* | 1/2018 | Shigemitsu | G02B 7/02 |

FOREIGN PATENT DOCUMENTS

| | | |
|---|---|---|
| CN | 206074846 U | 4/2017 |
| JP | 4729395 B2 | 7/2011 |
| TW | I506329 B | 11/2015 |
| TW | M512712 U | 11/2015 |

* cited by examiner

IMAGING LENS SET WITH PLASTIC LENS ELEMENT, IMAGING LENS MODULE AND ELECTRONIC DEVICE

RELATED APPLICATIONS

This application claims priority to Taiwan Application Serial Number 106111916, filed Apr. 10, 2017, which is herein incorporated by reference.

BACKGROUND

Technical Field

The present disclosure relates to an imaging lens set with a plastic lens element, and an imaging lens module. More particularly, the present disclosure relates to an imaging lens set and an imaging lens module which are applicable to portable electronic devices.

DESCRIPTION OF RELATED ART

Plastic lens elements are generally used to effectively reduce the manufacturing cost of imaging lens modules. Conventional plastic lens elements are typically made by the injection molding method and have smooth and bright surfaces, which are featured with high reflectivity. Accordingly, when the stray light travels to the surfaces of the plastic lens element, the stray light reflected from the surfaces of the plastic lens element cannot be effectively attenuated. Furthermore, the stray light insufficiently attenuated in the conventional imaging lens module would cause problems such as flare on the image surface and affect the image quality.

In addition, conventional compact imaging lens modules typically include a plurality of plastic lens elements so as to enhance the image quality by the plastic lens elements featured with compact sizes, aspheric surfaces and sharp changing of curvatures. However, lens elements with compact sizes and aspheric surfaces usually result in insufficient accuracy and alignment problems among lens elements.

Given the above, how to simultaneously meet the requirements of suppressing the stray light and accurate alignment with the optical axis of the compact imaging lens module has become one of the important subjects, so that the image quality of the compact imaging lens modules can be enhanced, and the requirements of high-end optical systems with camera functionalities can be satisfied.

SUMMARY

According to one aspect of the present disclosure, an imaging lens set includes a plurality of optical elements, wherein at least one of the optical elements is a lens element, and at least one of the lens element is a plastic lens element. The plastic lens element having a central axis includes an object-side surface and an image-side surface, wherein the image-side surface is located opposite to the object-side surface. Each of the object-side surface and the image-side surface includes an effective optical section and a lens peripheral section in order from the central axis to an edge of the plastic lens element. The effective optical section is for being passed through by an imaging light and aspheric. The lens peripheral section surrounds the effective optical section. At least one of the lens peripheral section of the object-side surface and the lens peripheral section of the image-side surface includes at least one annular groove structure, wherein the annular groove structure includes a plurality of stepped surfaces and is not in contact with the optical elements.

According to another aspect of the present disclosure, an imaging lens module includes the imaging lens set according to the foregoing aspect and a plastic barrel. The imaging lens set is disposed along the central axis in the plastic barrel. The plastic barrel includes a barrel hole, wherein the barrel hole has a smallest diameter position.

According to another aspect of the present disclosure, an electronic device includes the imaging lens module according to the foregoing aspect and an image sensor, wherein the image sensor is disposed on an image surface of the imaging lens module.

According to another aspect of the present disclosure, an imaging lens set includes a plurality of optical elements, wherein at least one of the optical elements is a lens element, and at least one of the lens element is a plastic lens element. The plastic lens element having a central axis includes an object-side surface and an image-side surface, wherein the image-side surface is located opposite to the object-side surface. Each of the object-side surface and the image-side surface includes an effective optical section and a lens peripheral section in order from the central axis to an edge of the plastic lens element. The effective optical section is for being passed through by an imaging light and aspheric. The lens peripheral section surrounds the effective optical section. At least one of the lens peripheral section of the object-side surface and the lens peripheral section of the image-side surface includes at least one annular groove structure, wherein the annular groove structure includes a plurality of stepped surfaces, a light absorbing coating portion is disposed on at least part of the stepped surfaces, and the annular groove structure is not in contact with the optical elements.

According to another aspect of the present disclosure, an imaging lens module includes the imaging lens set according to the foregoing aspect and a plastic barrel. The imaging lens set is disposed along the central axis in the plastic barrel. The plastic barrel includes a barrel hole, wherein the barrel hole has a smallest diameter position.

According to another aspect of the present disclosure, an electronic device includes the imaging lens module according to the foregoing aspect and an image sensor, wherein the image sensor is disposed on an image surface of the imaging lens module.

DETAILED DESCRIPTION

1st Embodiment

Figure 1A:
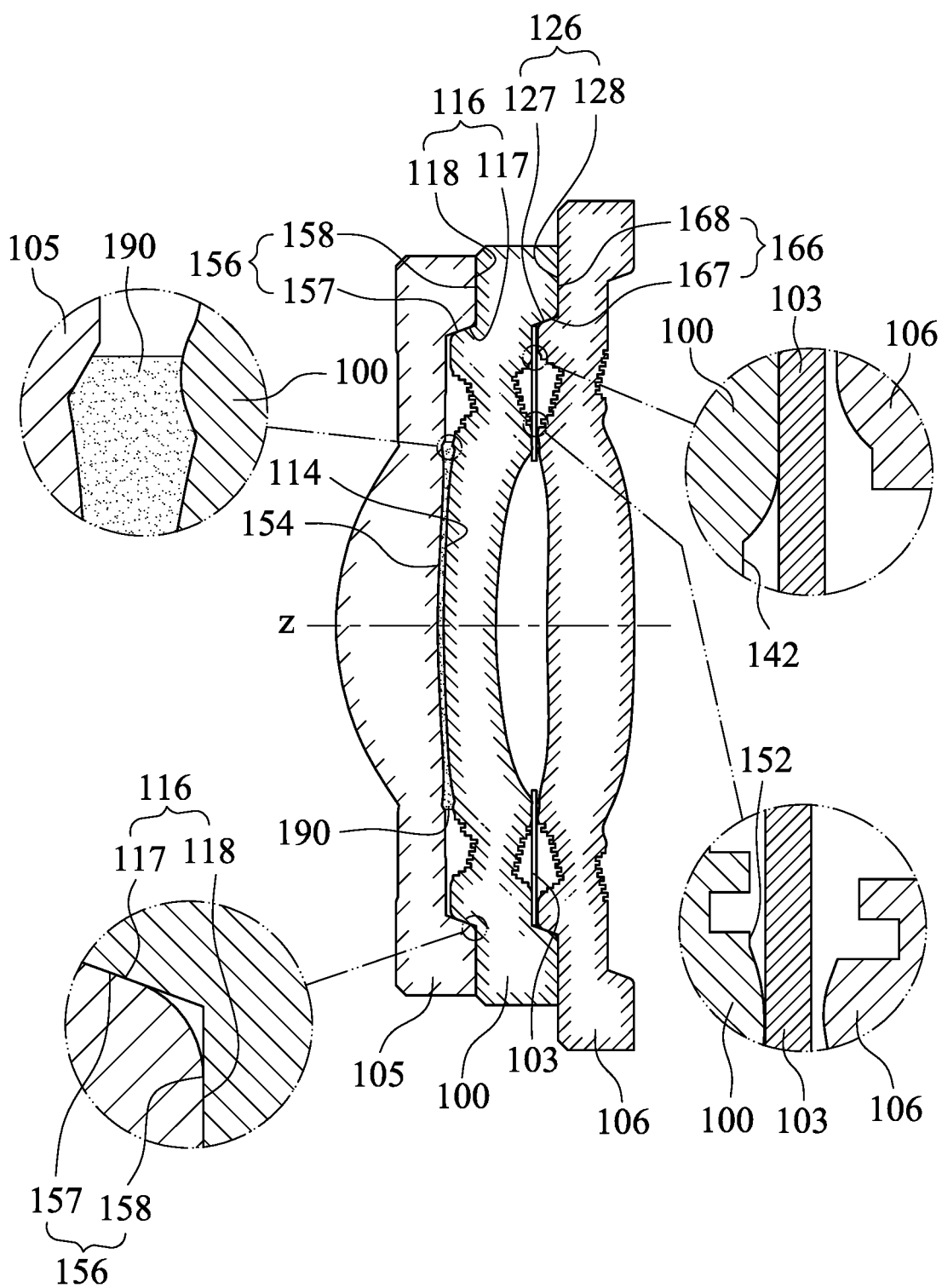
FIG. 1A is a schematic view of an imaging lens set according to the 1st embodiment of the present disclosure.

FIG. 1A is a schematic view of an imaging lens set according to the 1st embodiment of the present disclosure. In FIG. 1A, the imaging lens set (its reference numeral is omitted) includes a plurality of optical elements, wherein at least one of the optical elements is a lens element, and at least one of the lens element is a plastic lens element 100.

Figure 1B:
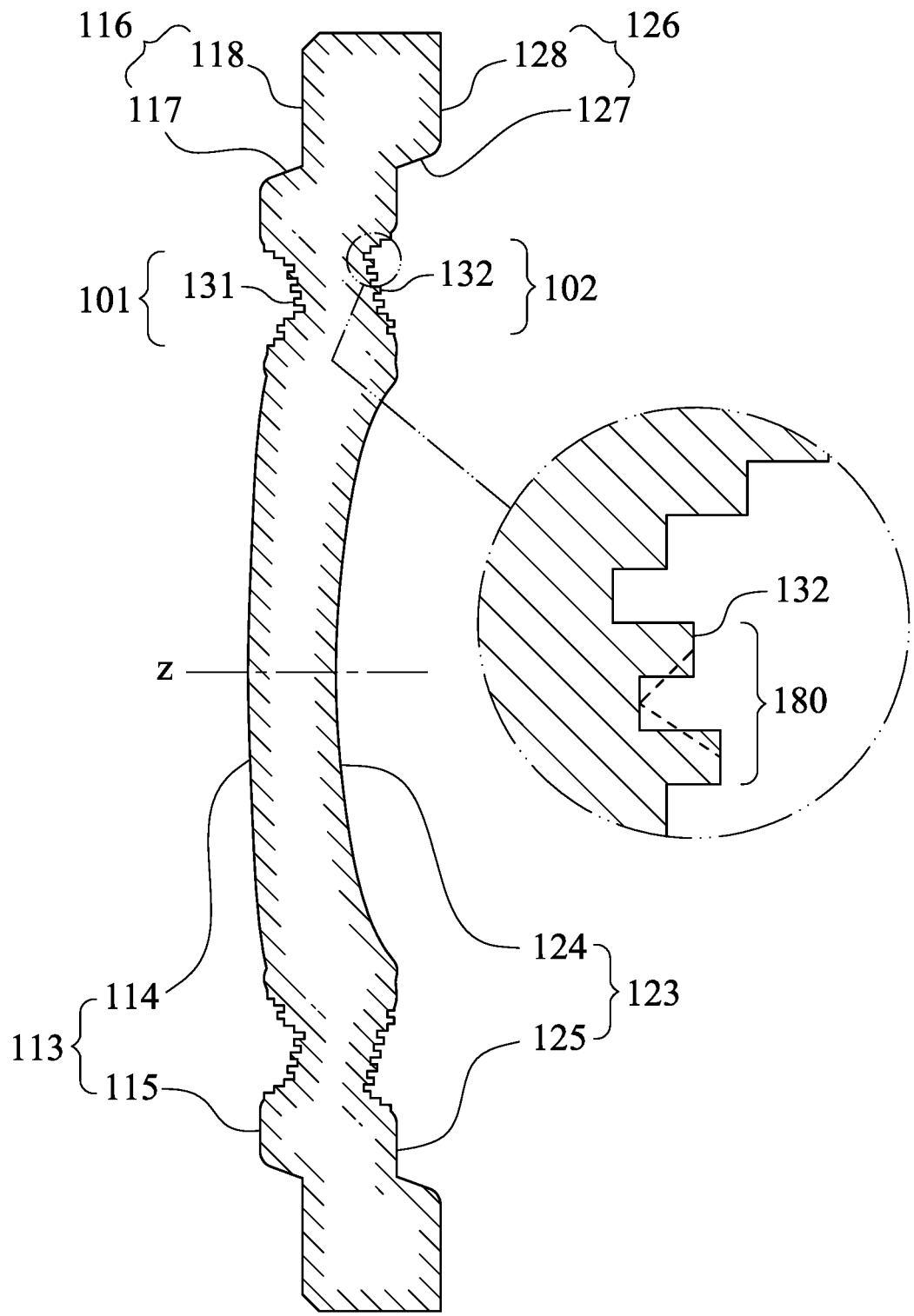
FIG. 1B is a schematic view of a plastic lens element according to FIG. 1A.
Figure 1C:
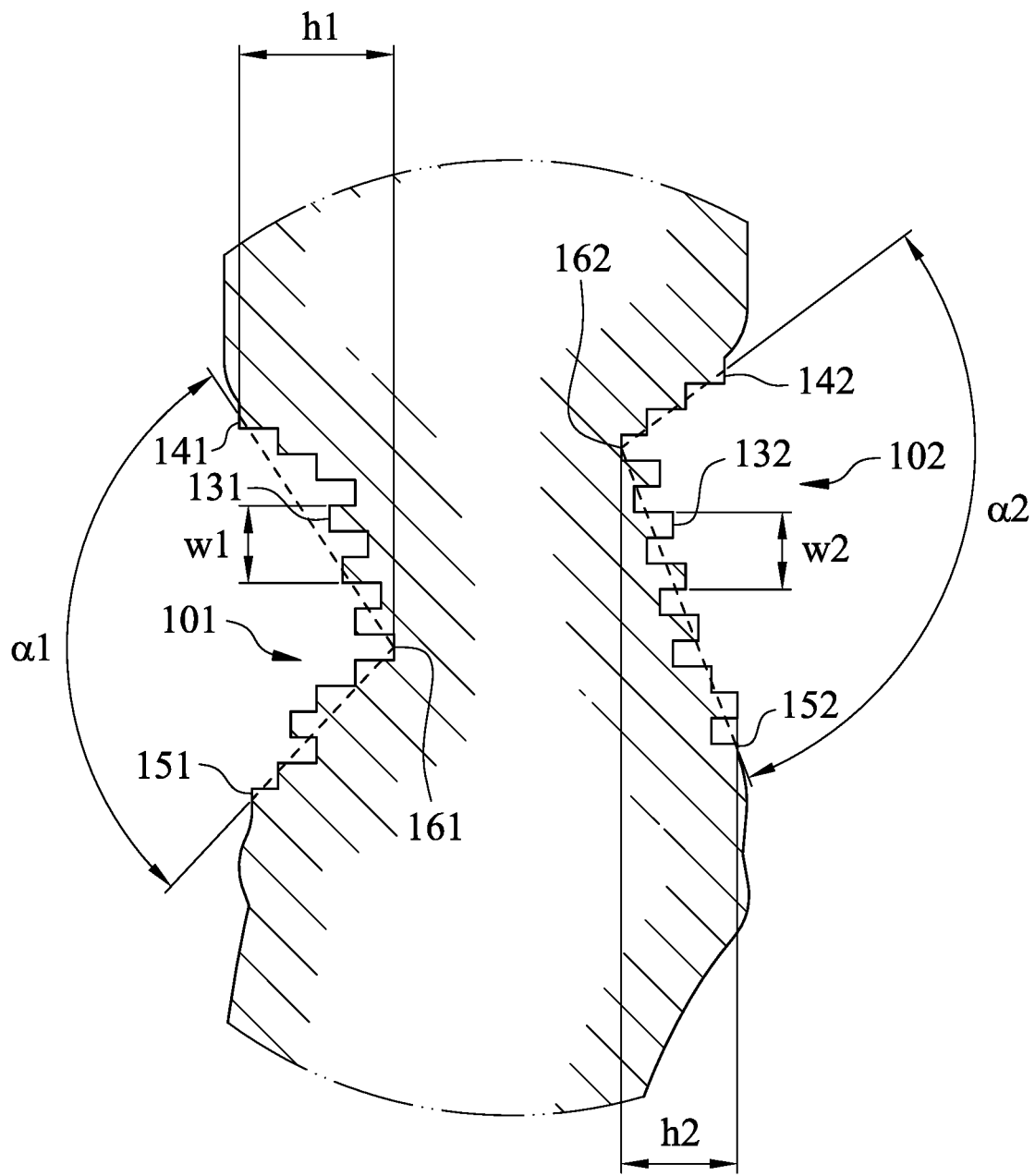
FIG. 1C is a schematic view of an annular groove structure according to FIG. 1B.

FIG. 1B is a schematic view of the plastic lens element 100 according to FIG. 1A, and FIG. 1C is a schematic view of an annular groove structure 101 according to FIG. 1B. In FIG. 1B and FIG. 1C, the plastic lens element 100 having a central axis z (i.e. an optical axis of the imaging lens set) includes an object-side surface 113 and an image-side surface 123, wherein the image-side surface 123 is located opposite to the object-side surface 113. The object-side surface 113 includes an effective optical section 114 and a lens peripheral section 115 in order from the central axis z to an edge of the plastic lens element 100. The effective optical section 114 is for being passed through by an imaging light and aspheric. The lens peripheral section 115 surrounds the effective optical section 114. The image-side surface 123 includes an effective optical section 124 and a lens peripheral section 125 in order from the central axis z to the edge of the plastic lens element 100. The effective optical section 124 is for being passed through by the imaging light and aspheric. The lens peripheral section 125 surrounds the effective optical section 124.

At least one of the lens peripheral section 115 of the object-side surface 113 and the lens peripheral section 125 of the image-side surface 123 (at least the lens peripheral section 115) includes at least one annular groove structure 101, wherein the annular groove structure 101 includes a plurality of stepped surfaces 131. In the conventional techniques, a lens peripheral section of a plastic lens element is mostly an annular surface being smooth and bright, which results in more reflection of the stray light in the plastic lens element. According to the present disclosure, the plurality of stepped surfaces 131 at least are added on the annular groove structure 101, so that smaller surface areas of the annular groove structure 101 are greatly increased, the obstructions of the stray light reflection in the plastic lens element 100 are increased, the probability of the stray light reflected from the lens peripheral section 115 is reduced, the reflection intensity is damaged and attenuated by the stepped surfaces 131 being predetermined, and thereby the flare problems are effectively decreased so as to enhance the image quality of the imaging lens module.

In FIG. 1A, the annular groove structure 101 is not in contact with other optical elements of the imaging lens set. Therefore, it is favorable for the annular groove structure 101 not to be damaged after assembling the imaging lens set, so that the effects of reducing the stray light of the plastic lens element 100 are maintained.

Specifically, the imaging lens set includes the plurality of optical elements. The optical elements are a lens element 105, the plastic lens element 100, a light blocking sheet 103 and a lens element 106 in order from an object side to an image side of the imaging lens set, wherein at least one of the lens elements (i.e. the lens element 105, the plastic lens element 100 and the lens element 106) is the plastic lens element 100, and the plastic lens element 100 and the lens element 105 are cemented by a cementing glue 190. Furthermore, the imaging lens set may include additional optical elements in an object side of the lens element 105 and an image side of the lens element 106. In general, an optical element may be a lens element, an imaging compensating element, a light blocking sheet, a spacer, a retainer, or etc.

In the 1st embodiment, FIG. 1B is the schematic view of the plastic lens element 100 according to FIG. 1A. FIG. 1B is also a view of a cross-sectional plane of the plastic lens element 100, wherein the cross-sectional plane passes through the central axis z and a normal direction of the cross-sectional plane is vertical to the central axis z, and all the cross-sectional planes of the plastic lens element 100 satisfying the aforementioned conditions are the same. In FIG. 1B and FIG. 1C, the lens peripheral section 115 includes the annular groove structure 101, wherein the annular groove structure 101 includes the stepped surfaces 131. The lens peripheral section 125 includes an annular groove structure 102, wherein the annular groove structure 102 includes a plurality of stepped surfaces 132. From view in FIG. 1B, each of the annular groove structures 101 and 102 according to the present disclosure may be similar a U-shaped or a V-shaped annular groove. In other embodiments (not shown in drawings) according to the present disclosure, an appearance of an annular groove structure of a plastic lens element has the characteristics of an annular groove, wherein all cross-sectional planes of the plastic lens element, which pass through a central axis thereof and have normal directions vertical to the central axis, may be different.

More specifically, each of the annular groove structures 101 and 102 is a closed annular groove along a circumferential direction of the central axis z. In other embodiments according to the present disclosure, an annular groove structure may include a plurality of arc-shaped grooves. That is, a groove spacing is between each two of the arc-shaped grooves adjacent to each other, and the annular groove structure as a whole, which includes the plurality of arc-shaped grooves, still has an appearance of an annular groove.

In FIG. 1A, both of the annular groove structures 101 and 102 are not in contact with the optical elements except the plastic lens element 100 itself of the imaging lens set (i.e. not in contact with the lens element 105, the light blocking sheet 103 and the lens element 106).

In FIG. 1B and FIG. 1C, the plastic lens element 100 with the annular groove structures 101 and 102 may be formed integrally and made by an injection molding method. Therefore, it is favorable for the mass production of the plastic lens element 100 and reducing the manufacturing cost. In other embodiments (not shown in drawings) according to the present disclosure, plastic lens elements with annular groove structures may be made by other methods, such as machining, 3D printing or other molding methods, but not limited thereto.

For easily understanding and interpreting the characteristics of the 1st embodiment according to the present disclosure, the stepped surfaces 131 indicate annular surfaces having normal directions parallel to the central axis z of the annular groove structure 101, wherein an annular surface (its reference numeral is omitted) between two of the stepped surfaces 131 adjacent to each other may have a normal direction vertical to the central axis z. The stepped surfaces 132 indicate annular surfaces having normal directions parallel to the central axis z of the annular groove structure 102, wherein an annular surface (its reference numeral is omitted) between two of the stepped surfaces 132 adjacent to each other may have a normal direction vertical to the central axis z. It can be said that the stepped surfaces 131 and 132 are extended from the central axis z to the edge of the plastic lens element 100. In other embodiments (not shown in drawings) according to the present disclosure, stepped surfaces are featured with stepped appearances, and normal directions of the stepped surfaces may be neither parallel to nor vertical to central axes.

The surface properties of the stepped surfaces according to the present disclosure are not limited to be smooth. The surface properties of the stepped surfaces may be similar to stone steps, that is, the stepped surfaces have stepped appearances being observed, while the surface properties of the stepped surfaces are featured with a certain roughness. In general, a surface roughness of a plastic lens element made by an injection molding method can be adjusted depending on different demands, wherein the surface roughness (Ra) thereof is typically within a range of 0.12 μm<Ra<3.5 μm, but not limited thereto. Moreover, stepped surfaces being flat ideally may have a few imperfections resulted from deviations of real conditions in an injection molding process, but stepped characteristics of the stepped surfaces are still observed.

In FIG. 1C, a range of the annular groove structure 101 is defined by two groove ends 141 and 151, which are respectively two of the stepped surfaces 131 located on two ends of the annular groove structure 101. Each of the groove ends 141 and 151 is closer to the object side than another one of the stepped surfaces 131 which is adjacent thereto. That is, the groove end 141 is the one of the stepped surfaces 131 farthest from the central axis z of the annular groove structure 101, the groove end 151 is the one of the stepped surfaces 131 closest to the central axis z of the annular groove structure 101, and one of the stepped surfaces 131 closest to the image side is a groove bottom 161.

A range of the annular groove structure 102 is defined by two groove ends 142 and 152, which are respectively two of the stepped surfaces 132 located on two ends of the annular groove structure 102. Each of the groove ends 142 and 152 may be closer to the image side than another one of the stepped surfaces 132 which is adjacent thereto. That is, the groove end 142 is the one of the stepped surfaces 132 farthest from the central axis z of the annular groove structure 102, the groove end 152 is the one of the stepped surfaces 132 closest to the central axis z of the annular groove structure 102, and one of the stepped surfaces 132 closest to the object side is a groove bottom 162.

In addition, the groove end 152 is for ending the annular groove structure 102, so that the groove end 152 is not closer to the image side than the another one of the stepped surfaces 132 which is adjacent thereto. The groove end 152, which is the one of the stepped surfaces 132 closest to the central axis z, contributes to the overall effect of the annular groove structure 102, thus the groove end 152 as shown in FIG. 1C is also included in the annular groove structure 102. Furthermore, it can be understood that some other embodiments described in the present disclosure have the same characteristics as mentioned in this paragraph, and the same characteristics will not be stated again in those embodiments.

A number of the annular groove structure 101 of the lens peripheral section 115 of the object-side surface 113 may be only one, and a number of the annular groove structure 102 of the lens peripheral section 125 of the image-side surface 123 may be only one. Therefore, the only one annular groove structure 101 and the only one annular groove structure 102 respectively arranged on the object-side surface 113 and the image-side surface 123 are favorable for the continuations of the stepped surfaces 131 and 132 respectively, as well as reducing the complexities of the design drawing, simplifying the molding process, and reducing the differences between the manufacturing results and the expectations. In the 1st embodiment, the number of the annular groove structure 101 is only one, and the number of the annular groove structure 102 is only one. In other embodiments (not shown in drawings) according to the present disclosure, a number of annular groove structures of an object-side surface may be equal to or greater than two, and a number of annular groove structures of an image-side surface may be equal to or greater than two.

In FIG. 1C, when a greatest depth parallel to the central axis z of the annular groove structure 101 is h1, and a length in a radial direction of the central axis z of successive three of the stepped surfaces 131 of the annular groove structure 101 is w1, the following condition may be satisfied: 0.5<h1/w1<4.5. When a greatest depth parallel to the central axis z of the annular groove structure 102 is h2, and a length in a radial direction of the central axis z of successive three of the stepped surfaces 132 of the annular groove structure 102 is w2, the following condition may be satisfied: 0.5<h2/w2<4.5. Furthermore, parameters h1 and h2 in every embodiment described are consistent with the definition of the parameter h in the claims of the present disclosure, parameters w1 and w2 in every embodiment described are consistent with the definition of the parameter w in the claims of the present disclosure, and parameters h1/w1 and h2/w2 in every embodiment described are consistent with the definition of the parameter h/w in the claims of the present disclosure. It is favorable for designing the annular groove structures 101 and 102 featured with proper depth-width ratios and respectively including the stepped surfaces 131 and 132 via cooperations between the greatest depths and the respective lengths in the radial direction, so as to be beneficial for the injection molding process and the production smoothness of the plastic lens element 100.

In the 1st embodiment, the groove end 141 is closer to the object side than the groove end 151 is to the object side, and the parameter h1 is taken as a distance parallel to the central axis z between the groove end 141 and the groove bottom 161. The parameter w1 shown in FIG. 1C indicates the length in the radial direction of the central axis z of successive three of the stepped surfaces 131, for example, which are counted from one of the stepped surfaces 131 labeled in FIG. 1C through another two of the stepped surfaces 131 successively following thereof towards the central axis z. The parameter w1 of every successive three of the stepped surfaces 131 in the 1st embodiment is the same value. Moreover, every one of the stepped surfaces 131 has the same length in the radial direction. The same value and the same length described in this paragraph are intended to be the same in the design and the parts drawing of the stepped surfaces 131, while the inevitable differences in real manufacturing omitted herein.

In the 1st embodiment, the groove end 152 is closer to the image side than the groove end 142 is to the image side, and the parameter h2 is taken as a distance parallel to the central axis z between the groove end 152 and the groove bottom 162. The parameter w2 shown in FIG. 1C indicates the length in the radial direction of the central axis z of successive three of the stepped surfaces 132, for example, which are counted from one of the stepped surfaces 132 labeled in FIG. 1C through another two of the stepped surfaces 132 successively following thereof towards the central axis z. The parameter w2 of every successive three of the stepped surfaces 132 in the 1st embodiment is the same value. Moreover, every one of the stepped surfaces 132 has the same length in the radial direction. The same value and the same length described in this paragraph are intended to be the same in the design and the parts drawing of the stepped surfaces 132, while the inevitable differences in real manufacturing omitted herein.

In addition, the groove ends 151 and 152 are respectively for ending the annular groove structures 101 and 102 in the 1st embodiment, thus it is inevitable that the length in the radial direction of the groove end 151 is smaller than the lengths in the radial direction of others of the stepped surfaces 131, and the length in the radial direction of the groove end 152 is smaller than the lengths in the radial direction of others of the stepped surfaces 132. In embodiments described in the present disclosure, when the parameter w1 being with the same value, the parameter w2 being with the same value, or stepped surfaces having the same lengths in the radial direction are mentioned, it indicates a condition that a corresponding value of a groove end for ending a annular groove structure is excluded. In other embodiments (not shown in drawings) according to the present disclosure, a length in a radial direction of a central axis of every successive three of stepped surfaces of an annular groove structure (i.e. the parameter w) may not be the same value, that is, the parameter w may not be the same value after excluding values of the parameter w related a groove end for ending the annular groove structure.

In FIG. 1C, when the greatest depth parallel to the central axis z of the annular groove structure 101 is h1, the following condition may be satisfied: 0.02 mm<h1<0.21 mm. When the greatest depth parallel to the central axis z of the annular groove structure 102 is h2, the following condition may be satisfied: 0.02 mm<h2<0.21 mm. Furthermore, parameters h1 and h2 in every embodiment described are consistent with the definition of the parameter h in the claims of the present disclosure. Therefore, it is favorable for an annular groove structure to be applied to a thin lens element, wherein the thin lens element can indicate the thinnest lens element in an imaging lens set.

In FIG. 1C, the one of the stepped surfaces 131 farthest from the central axis z and the one of the stepped surfaces 131 closest to the central axis z are respectively the two groove ends 141 and 151. When an angle defined by the two groove ends 141 and 151 of the annular groove structure 101 is α1, the following condition may be satisfied: 35 degrees<α1<150 degrees. The one of the stepped surfaces 132 farthest from the central axis z and the one of the stepped surfaces 132 closest to the central axis z are respectively the two groove ends 142 and 152. When an angle defined by the two groove ends 142 and 152 of the annular groove structure 102 is α2, the following condition may be satisfied: 35 degrees<α2<150 degrees. Furthermore, parameters α1 and α2 in every embodiment described are consistent with the definition of the parameter α in the claims of the present disclosure. In practice, a thickness difference being too large between an effective optical section and a lens peripheral section easily results in manufacturing problems and defects on a plastic lens element after molding. The annular groove structures 101 and 102 of the plastic lens element 100, which are respectively satisfying the aforementioned conditions in this paragraph, have the angles α1 and α2 within the ranges. It is favorable for controlling thicknesses of the lens peripheral sections 115 and 125 not to be overly large, so that the manufacturing and molding problems of the plastic lens element 100 can be reduced.

More specifically, in the 1st embodiment, the angle α1 is between a line connecting a middle point of the groove end 141 with a middle point of the groove bottom 161, and a line connecting a middle point of the groove end 151 with a middle point of the groove bottom 161 in FIG. 1C. The angle α2 is between a line connecting a middle point of the groove end 142 with a middle point of the groove bottom 162, and a line connecting a middle point of the groove end 152 with a middle point of the groove bottom 162 in FIG. 1C.

Figure 1D:
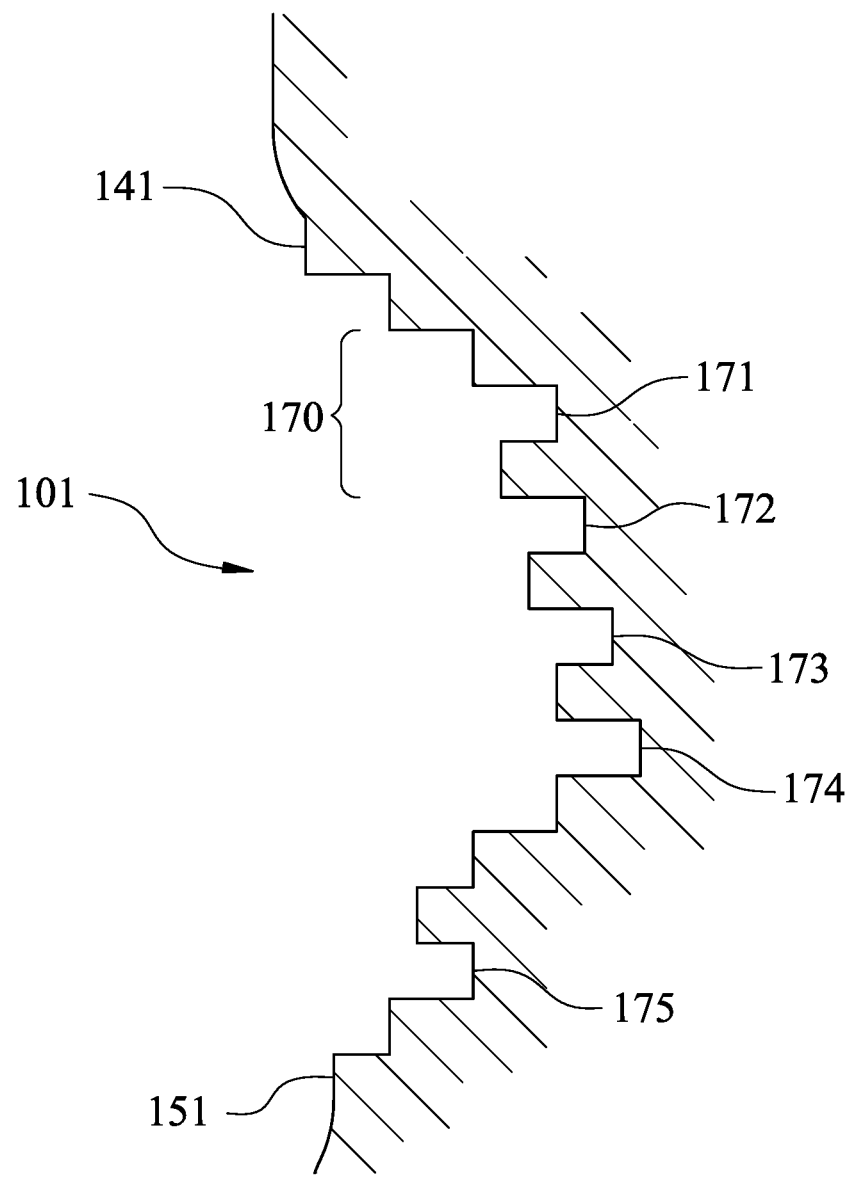
FIG. 1D is a schematic view of the annular groove structure according to FIG. 1C.
Figure 1E:
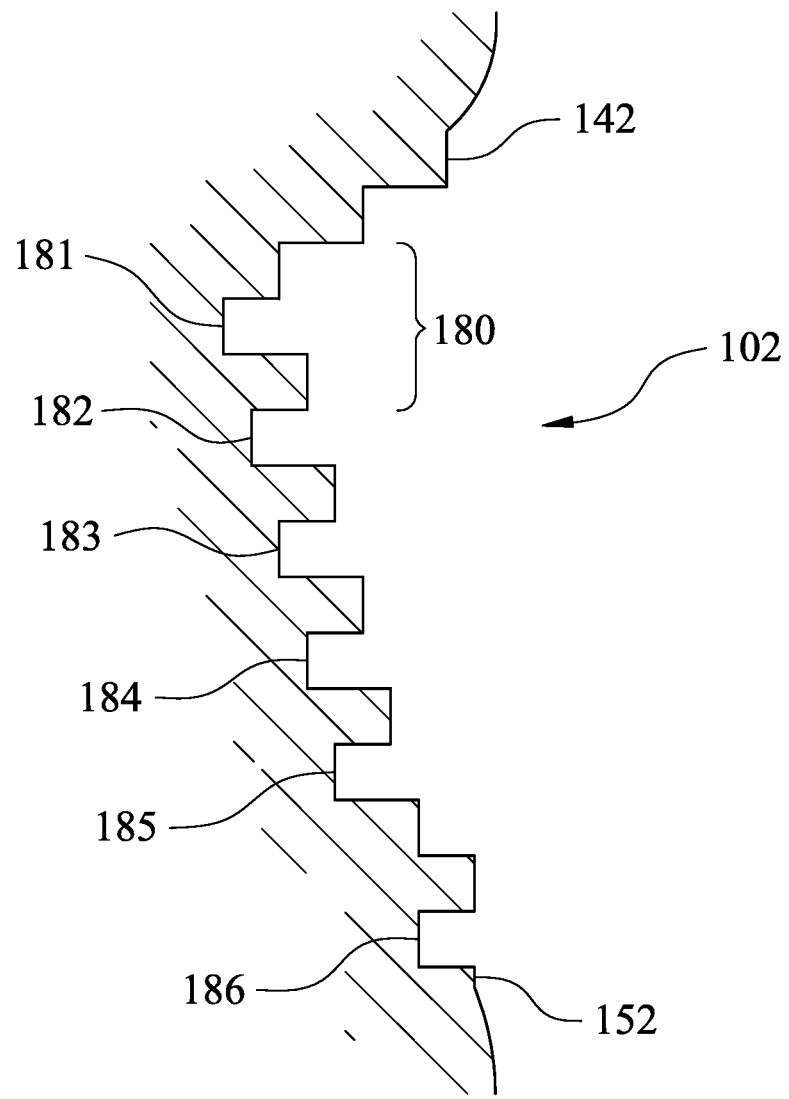
FIG. 1E is a schematic view of another annular groove structure according to FIG. 1C.
Figure 1F:
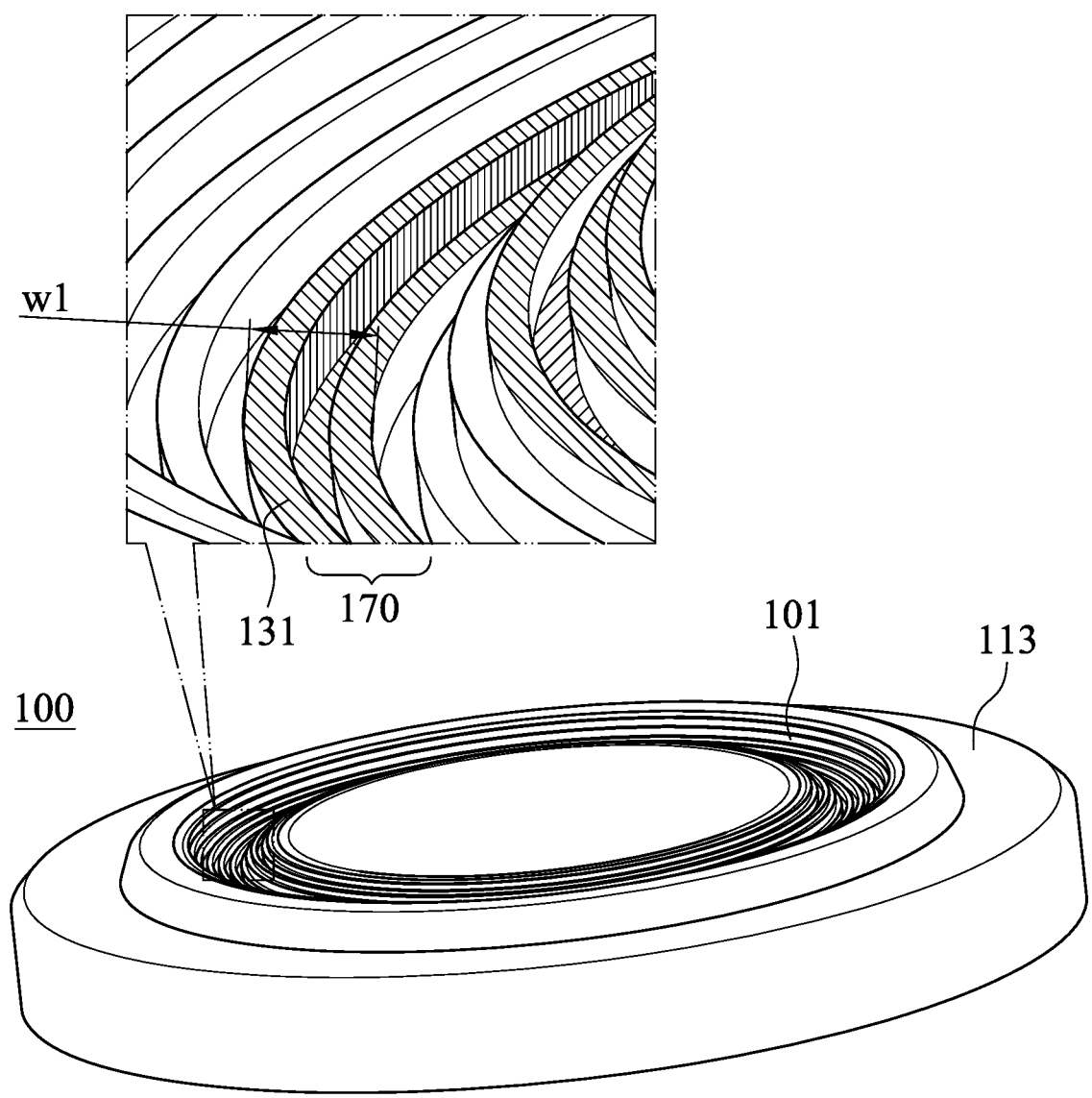
FIG. 1F is a three-dimensional view of the plastic lens element according to FIG. 1B.
Figure 1G:
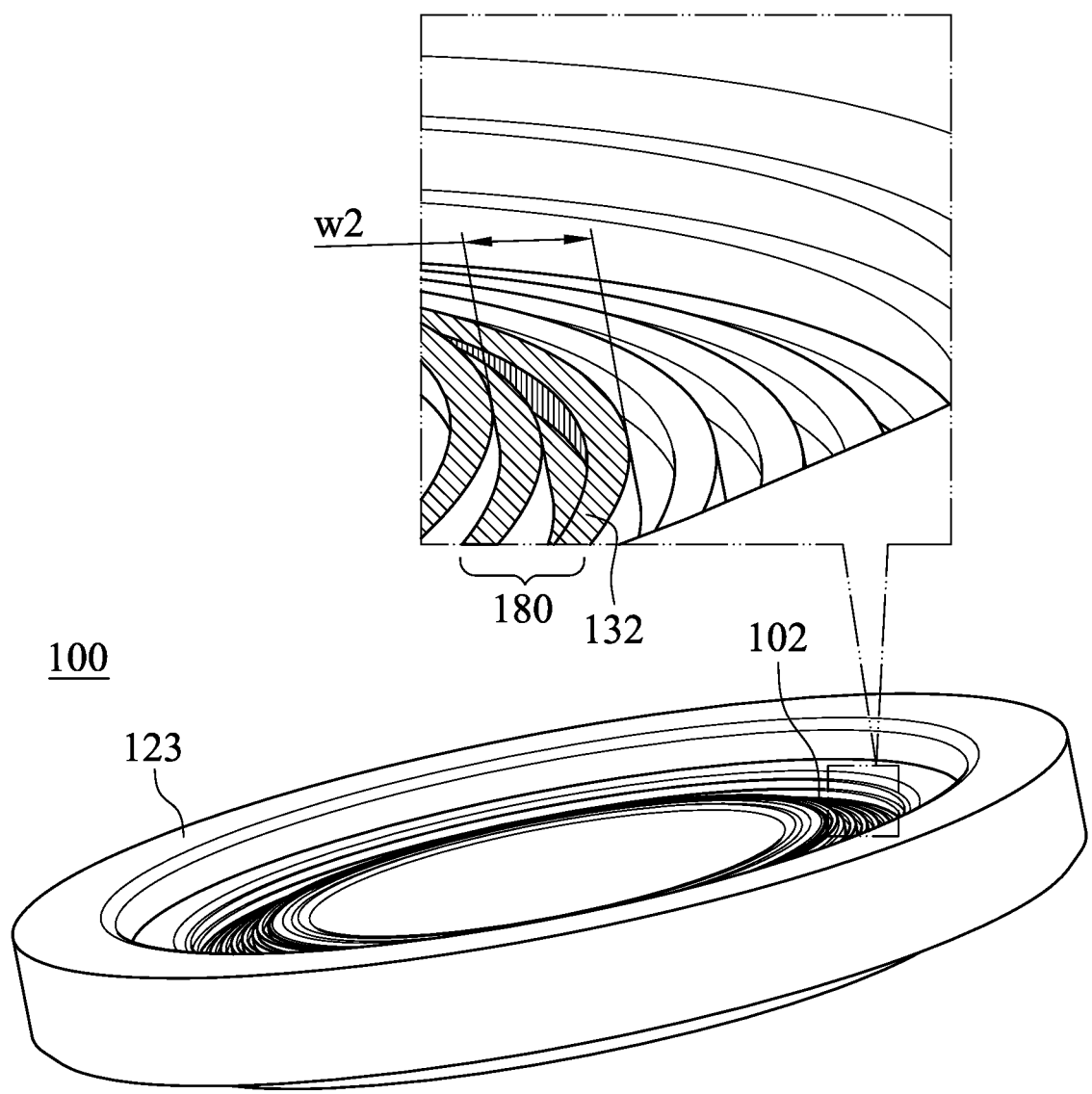
FIG. 1G is another three-dimensional view of the plastic lens element according to FIG. 1B.

FIG. 1D is a schematic view of the annular groove structure 101 according to FIG. 1C, FIG. 1E is a schematic view of the annular groove structure 102 according to FIG. 1C, FIG. 1F is a three-dimensional view of the plastic lens element 100 according to FIG. 1B, and FIG. 1G is another three-dimensional view of the plastic lens element 100 according to FIG. 1B. In FIG. 1B and FIG. 1D to FIG. 1G, a sub-groove 170 is formed by successive three of the stepped surfaces 131 of the annular groove structure 101 of the object-side surface 113, and a sub-groove 180 is formed by successive three of the stepped surfaces 132 of the annular groove structure 102 of the image-side surface 123. When a sum of a number of the sub-grooves 170 of the object-side surface 113 and a number of the sub-grooves 180 of the image-side surface 123 of the plastic lens element 100 is Ns, the following condition may be satisfied: 1≤Ns<25. Therefore, the sub-grooves 170 and 180 satisfying the aforementioned range of the sum Ns could form an apparent appearance of the plastic lens element 100, as shown in FIG. 1F and FIG. 1G, a shape of every one of the sub-grooves 170 and 180 is like an annular indentation or an annular cavity. More preferably, the following condition may be satisfied: 2≤Ns<16. It is favorable for the plastic lens element 100 satisfying the aforementioned preferable range of the sum Ns to reduce the problems, such as the unsmoothness of the injection molding process resulted from too many sub-grooves, or failing to form effective stepped surfaces because of too few sub-grooves. More specifically, each of the sub-grooves 170 and 180 has a U-shape or a V-shape viewed in FIG. 1D and FIG. 1E, also in FIG. 1B.

In FIG. 1D, a sub-groove 170 is formed by successive three of the stepped surfaces 131 of the annular groove structure 101, wherein the middle one of the successive three of the stepped surfaces 131 is closer to the image side than the other two locating on ends of the successive three of the stepped surfaces 131. The middle one of the sub-groove 170 labeled in FIG. 1D is a sub-groove bottom 171. By analogy, on the annular groove structure 101, there are five sub-grooves 170 respectively corresponding to sub-groove bottoms 171, 172, 173, 174 and 175 in order from the edge of the plastic lens element 100 to the central axis z, wherein one locating on one end of successive three of the stepped surfaces 131 may be shared by two of the sub-grooves 170 adjacent to each other.

In FIG. 1E, a sub-groove 180 is formed by successive three of the stepped surfaces 132 of the annular groove structure 102, wherein the middle one of the successive three of the stepped surfaces 132 is closer to the object side than the other two locating on ends of the successive three of the stepped surfaces 132. The middle one of the sub-groove 180 labeled in FIG. 1E is a sub-groove bottom 181. By analogy, on the annular groove structure 102, there are six sub-grooves 180 respectively corresponding to sub-groove bottoms 181, 182, 183, 184, 185 and 186 in order from the edge of the plastic lens element 100 to the central axis z, wherein one locating on one end of successive three of the stepped surfaces 132 may be shared by two of the sub-grooves 180 adjacent to each other. According to the above, a number of the sub-grooves 170 of the annular groove structure 101 of the object-side surface 113 is Ns1 (Ns1=5 in the 1st embodiment), a number of the sub-grooves 180 of the annular groove structure 102 of the image-side surface 123 is Ns2 (Ns2=6 in the 1st embodiment), a sum of Ns1 and Ns2 of the plastic lens element 100 is Ns, and that is "Ns=Ns1+Ns2".

In FIG. 1C, FIG. 1F and FIG. 1G, when the length in the radial direction of the central axis z of successive three of the stepped surfaces 131 of the annular groove structure 101 is w1, the following condition may be satisfied: 0.02 mm<w1<0.19 mm. When the length in the radial direction of the central axis z of successive three of the stepped surfaces 132 of the annular groove structure 102 is w2, the following condition may be satisfied: 0.02 mm<w2<0.19 mm. Furthermore, parameters w1 and w2 in every embodiment described are consistent with the definition of the parameter w in the claims of the present disclosure. Therefore, more densely arranging the stepped surfaces 131 and 132 is advantageous in achieving a height contrast being more obvious than sandblasting effects. In addition, the values of the parameters w1 and w2 being overly small is not beneficial for the molds machining, and the values of the parameters w1 and w2 being overly large would result in a height contrast being unobvious so as not to contribute for reducing the reflection in the plastic lens element 100.

In FIG. 1D and FIG. 1E, a number of the stepped surfaces 131 of the annular groove structure 101 of the object-side surface 113 is N1, a number of the stepped surfaces 132 of the annular groove structure 102 of the image-side surface 123 is N2, a sum of N1 and N2 of the plastic lens element 100 is N, and that is "N=N1+N2". The sum N of N1 and N2 may be greater than or equal to 4, and smaller than or equal to 48. Therefore, it is favorable for the plastic lens element 100 to achieve a balance between the manufacturing quality and reducing the surface reflection. More preferably, the sum N of N1 and N2 may be greater than or equal to 6, and smaller than or equal to 38. Therefore, it is favorable for the plastic lens element 100 to further achieve the balance between the manufacturing quality and reducing the surface reflection. Moreover, the value of the parameter N1 is the number of the stepped surfaces 131 counted from the groove end 141 to the groove end 151, and the value of the parameter N2 is the number of the stepped surfaces 132 counted from the groove end 142 to the groove end 152.

In FIG. 1A, the lens peripheral section 115 of the object-side surface 113 may include a receiving surface 118, which is a flat surface, and a normal direction of the receiving surface 118 is parallel to the central axis z. The lens peripheral section 125 of the image-side surface 123 may include a receiving surface 128, which is a flat surface, and a normal direction of the receiving surface 128 is parallel to the central axis z. Therefore, it is favorable for stacking the optical elements of the imaging lens set so as to increase the assembly conveniences. Specifically, the receiving surface 118 of the plastic lens element 100 is received with a receiving surface 158 of the lens element 105, and the receiving surface 128 of the plastic lens element 100 is received with a receiving surface 168 of the lens element 106.

A number of the lens elements of the imaging lens set may be at least two (specifically at least the lens element 105, the plastic lens element 100 and the lens element 106 in the 1st embodiment). The lens element 105, the lens element 106, which are adjacent to the plastic lens element 100, and the plastic lens element 100 are arranged along the central axis z. The plastic lens element 100 and the lens element 105 may respectively include axial connecting structures 116 and 156 for being assembled with each other and aligned with the central axis z. Therefore, the axial connecting structures 116 and 156 are advantageous in maintaining the image quality of the imaging lens set, ensuring the plastic lens element 100 and the lens element 105 both having the alignment accuracy with the central axis z, and thereby facilitating the imaging lens set to be applicable to the imaging lens modules with the demanding MTF (Modulation Transfer Function) requirements. In other embodiments (not shown in drawings) according to the present disclosure, an axial connecting structure may be located on an object-side surface or an image-side surface which does not include an annular groove structure.

The axial connecting structure 116 of the plastic lens element 100 may include the receiving surface 118 and a conical surface 117, wherein a normal direction of the receiving surface 118 is parallel to the central axis z, the conical surface 117 is a conically annular surface with respect to the central axis z, and the receiving surface 118 is farther from the effective optical section 114 than the conical surface 117 is from the effective optical section 114. The axial connecting structure 156 of the lens element 105 may include the receiving surface 158 and a conical surface 157, wherein a normal direction of the receiving surface 158 is parallel to the central axis z, the conical surface 157 is a conically annular surface with respect to the central axis z, and the receiving surface 158 is farther from an effective optical section 154 of an image-side surface of the lens element 105 than the conical surface 157 is from the effective optical section 154 thereof. Therefore, it is favorable for manufacturing the axial connecting structures 116 and 156.

In the 1st embodiment, the plastic lens element 100 and the lens element 105 adjacent thereto respectively include the axial connecting structures 116 and 156 for the plastic lens element 100 and the lens element 105 to be assembled with each other and aligned with the central axis z. The axial connecting structure 116 of the plastic lens element 100 includes the receiving surface 118 and the conical surface 117, wherein the normal direction of the receiving surface 118 is parallel to the central axis z, and the receiving surface 118 is farther from the effective optical section 114 than the conical surface 117 is from the effective optical section 114. Furthermore, the conical surface 117 is farther from the effective optical section 114 than the annular groove structure 101 is from the effective optical section 114. That is, the conical surface 117 is farther from the effective optical section 114 than the stepped surfaces 131 is from the effective optical section 114. The axial connecting structure 156 of the lens element 105 includes the receiving surface 158 and the conical surface 157, wherein the normal direction of the receiving surface 158 is parallel to the central axis z, and the receiving surface 158 is farther from the effective optical section 154 of the image-side surface of the lens element 105 than the conical surface 157 is from the effective optical section 154 thereof. More specifically, the receiving surfaces 118 and 158 are corresponding and connected to each other, and the conical surfaces 117 and 157 are corresponding and connected to each other, so that the axial connecting structures 116 and 156 could be for the plastic lens element 100 and the lens element 105 to be assembled with each other and aligned with the central axis z.

The plastic lens element 100 and the lens element 106 adjacent thereto respectively include the axial connecting structures 126 and 166 for the plastic lens element 100 and the lens element 106 to be assembled with each other and aligned with the central axis z. The axial connecting structure 126 of the plastic lens element 100 includes the receiving surface 128 and a conical surface 127, wherein the normal direction of the receiving surface 128 is parallel to the central axis z, and the receiving surface 128 is farther from the effective optical section 124 than the conical surface 127 is from the effective optical section 124. Furthermore, the conical surface 127 is farther from the effective optical section 124 than the annular groove structure 102 is from the effective optical section 124. That is, the conical surface 127 is farther from the effective optical section 124 than the stepped surfaces 132 is from the effective optical section 124. The axial connecting structure 166 of the lens element 106 includes the receiving surface 168 and a conical surface 167, wherein a normal direction of the receiving surface 168 is parallel to the central axis z, and the receiving surface 168 is farther from an effective optical section (its reference numeral is omitted) of an object-side surface of the lens element 106 than the conical surface 167 is from the effective optical section thereof. More specifically, the receiving surfaces 128 and 168 are corresponding and connected to each other, and the conical surfaces 127 and 167 are corresponding and connected to each other, so that the axial connecting structures 126 and 166 could be for the plastic lens element 100 and the lens element 106 to be assembled with each other and aligned with the central axis z. In general, axial connecting structures are for two individual optical elements to connect with each other and be aligned with the central axis. The axial connecting structures may be implemented by receiving surfaces corresponding to each other and conical surfaces corresponding to each other, which are all located in a circumferential direction of the central axis, such as the 1st embodiment, but not limited thereto.

The effective optical section 114 of the plastic lens element 100 and the effective optical section 154 of the lens element 105, which is adjacent to the plastic lens element 100, may be cemented by the cementing glue 190. Therefore, the plastic lens element can be applicable to cemented lens elements. In general, cemented lens elements formed by two individual lens elements are for reducing an axial distance between the two lens elements. Surfaces of the cemented lens elements are usually not coated with anti-reflection coatings so as to cause higher reflectivity of the surfaces and surface reflection concerns. However, the plastic lens element 100 according to the present disclosure is simultaneously advantageous to be applicable to the imaging lens modules required with short total track lengths and achieve the effects of suppressing the stray light.

Figure 1H:
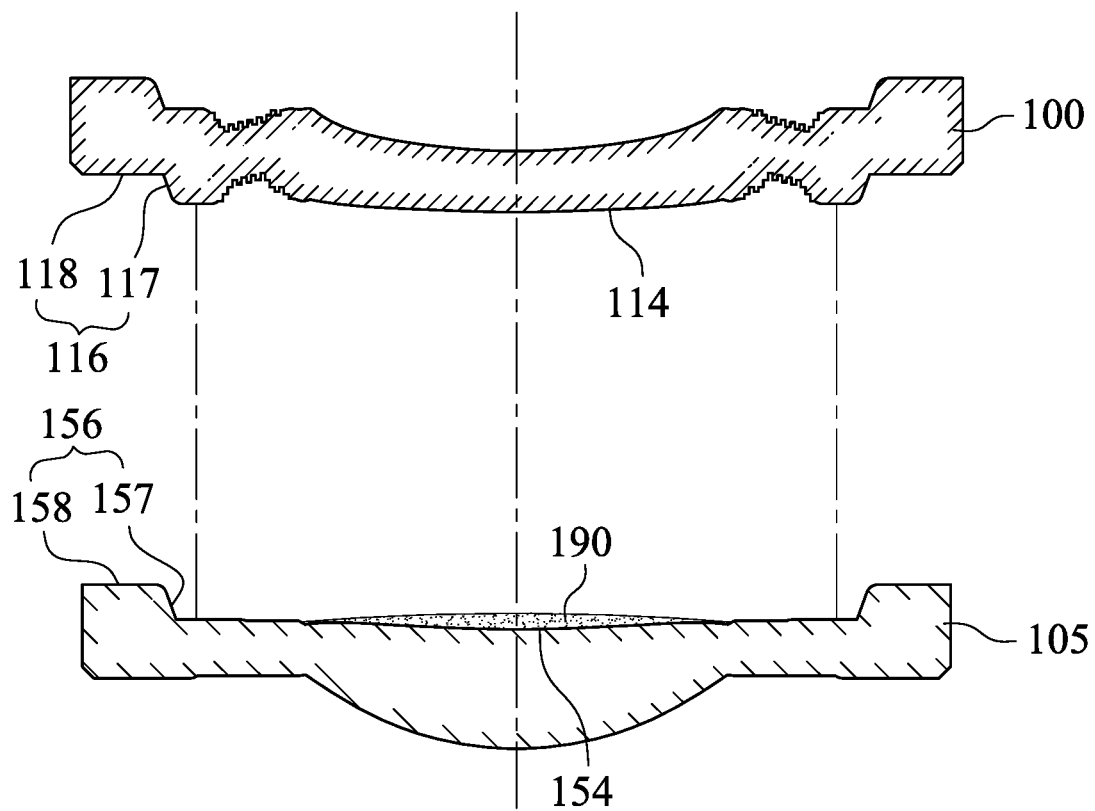
FIG. 1H is an assembling schematic view of the plastic lens element and a lens element according to the 1st embodiment.

FIG. 1H is an assembling schematic view of the plastic lens element 100 and the lens element 105 according to the 1st embodiment. In an assembly process for cementing the plastic lens element 100 and the lens element 105 by the cementing glue 190, first the lens element 105 is placed with the image-side surface (its reference numeral is omitted) facing upwards on a lens element platform (not shown in drawings), then the cementing glue 190 with an estimated volume in a non-solid state is applied on a single point of a center of the effective optical section 154, the plastic lens element 100 is moved with the object-side 113 facing downwards for the cementing glue 190 to be pressed by the plastic lens element 100 and the lens element 105 via connecting the axial connecting structures 116 and 156, and the cementing glue 190 is radially spread out from centers of the effective optical sections 114 and 154. While the cementing glue 190 is cured to cement the plastic lens element 100 and the lens element 105, the plastic lens element 100 and the lens element 105 are cemented by each other to form a cemented lens element, and the effective optical sections 114 and 154 are aligned with the central axis z. Furthermore, the cementing glue 190 in the non-solid state applied on the single point of the center of the effective optical section 154 in the 1st embodiment is advantageous in reducing the voids in the cementing glue 190 after curing, and further increasing the adhesion and the alignment accuracy of the cemented to lens element. In other embodiments (not shown in drawings) according to the present disclosure, a cementing glue in a non-solid state may be applied on multiple points of an effective optical section, but not limited thereto. In addition, the cementing glue 190 is a kind of adhesives without material limitations, and a viscosity of the cementing glue 190 in the non-solid state can be adjusted in accordance with the structure of the cemented lens element and the requirements of the assembly process.

The data of the aforementioned parameters of the imaging lens set and the plastic lens element 100 thereof according to the 1st embodiment of the present disclosure are listed in the following Table 1, wherein the parameters are also shown as FIG. 1C.

TABLE 1

1st Embodiment

| h1 (mm) | 0.12 | α2 (deg.) | 105.8 |
|---|---|---|---|
| w1 (mm) | 0.06 | Ns1 | 5 |
| h1/w1 | 2.00 | Ns2 | 6 |
| h2 (mm) | 0.09 | Ns | 11 |
| w2 (mm) | 0.06 | N1 | 16 |
| h2/w2 | 1.50 | N2 | 16 |
| α1 (deg.) | 103.4 | N | 32 |

2nd Embodiment

Figure 2A:
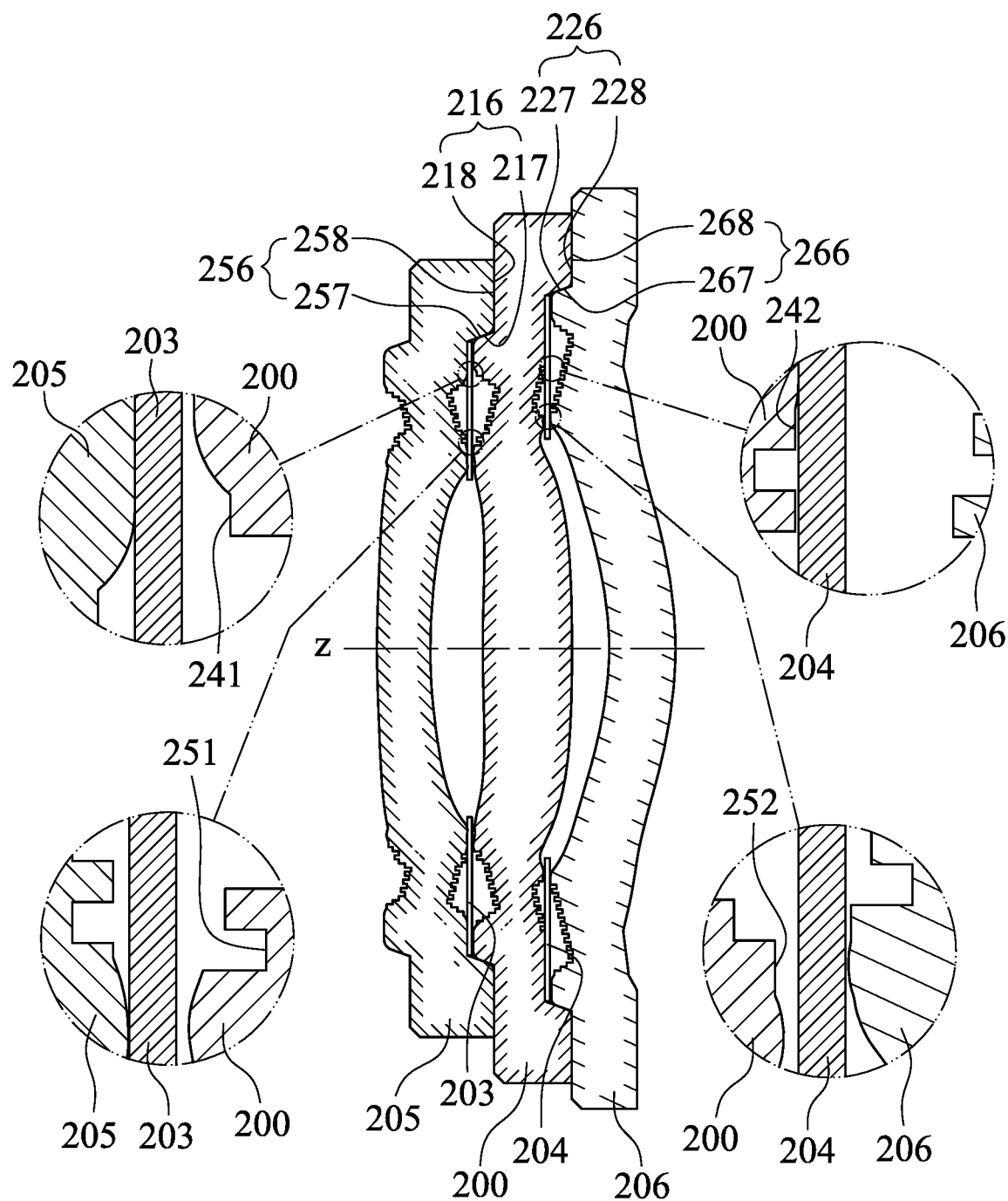
FIG. 2A is a schematic view of an imaging lens set according to the 2nd embodiment of the present disclosure.

FIG. 2A is a schematic view of an imaging lens set according to the 2nd embodiment of the present disclosure. In FIG. 2A, the imaging lens set (its reference numeral is omitted) includes a plurality of optical elements. The optical elements are a lens element 205, a light blocking sheet 203, a plastic lens element 200, a light blocking sheet 204 and a lens element 206 in order from an object side to an image side of the imaging lens set, wherein at least one of the lens elements (i.e. the lens element 205, the plastic lens element 200 and the lens element 206) is the plastic lens element 200. Furthermore, the imaging lens set may include additional optical elements in an object side of the lens element 205 and an image side of the lens element 206.

Figure 2B:
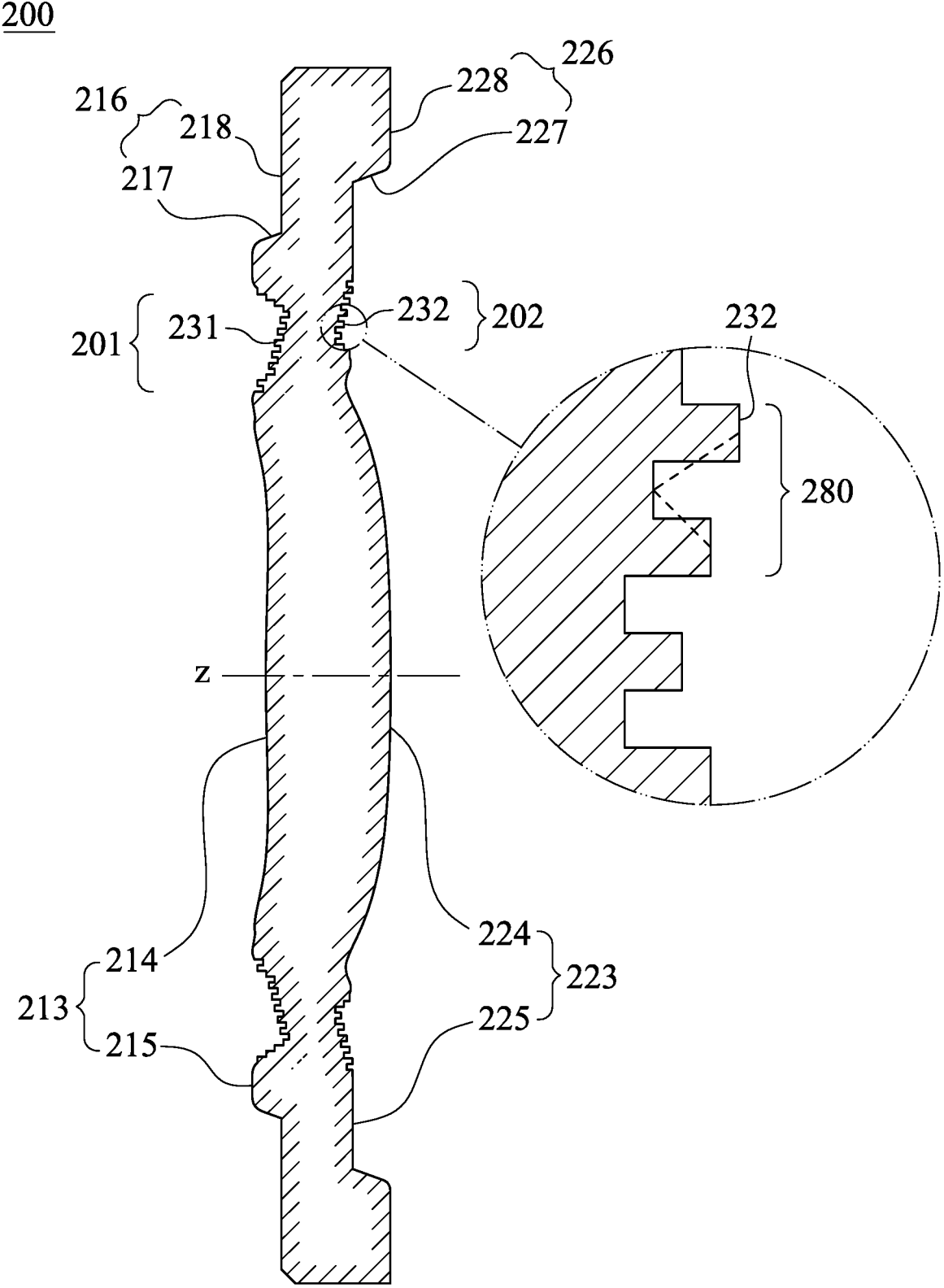
FIG. 2B is a schematic view of a plastic lens element according to FIG. 2A.
Figure 2C:
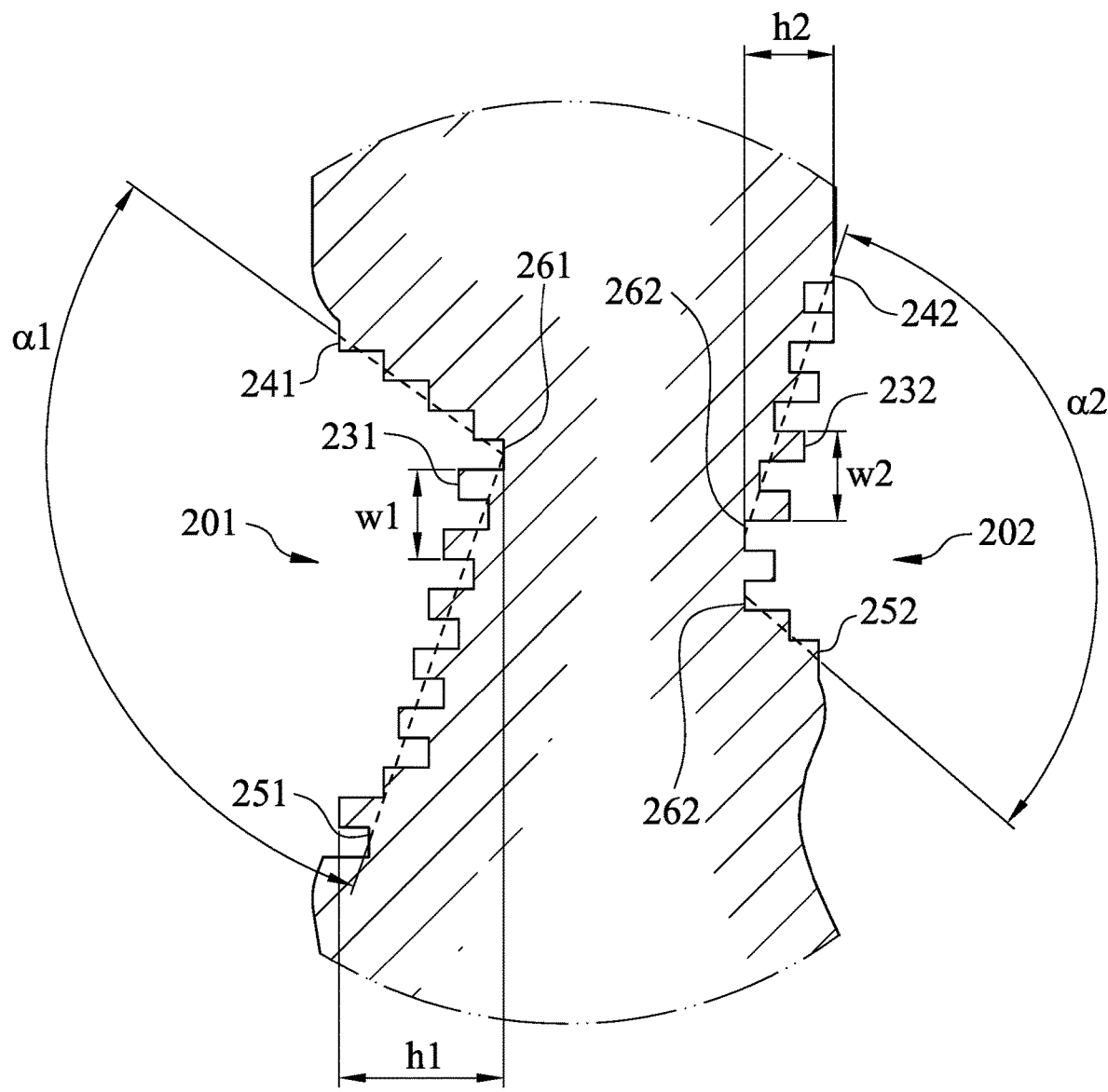
FIG. 2C is a schematic view of an annular groove structure according to FIG. 2B.

FIG. 2B is a schematic view of the plastic lens element 200 according to FIG. 2A, and FIG. 2C is a schematic view of annular groove structures 201 and 202 according to FIG. 2B. In FIG. 2B and FIG. 2C, the plastic lens element 200 having a central axis z (i.e. an optical axis of the imaging lens set) includes an object-side surface 213 and an image-side surface 223, wherein the image-side surface 223 is located opposite to the object-side surface 213. The object-side surface 213 includes an effective optical section 214 and a lens peripheral section 215 in order from the central axis z to an edge of the plastic lens element 200. The effective optical section 214 is for being passed through by an imaging light and aspheric. The lens peripheral section 215 surrounds the effective optical section 214. The image-side surface 223 includes an effective optical section 224 and a lens peripheral section 225 in order from the central axis z to the edge of the plastic lens element 200. The effective optical section 224 is for being passed through by the imaging light and aspheric. The lens peripheral section 225 surrounds the effective optical section 224.

In the 2nd embodiment, FIG. 2B is also a view of a cross-sectional plane of the plastic lens element 200, wherein the cross-sectional plane passes through the central axis z and a normal direction of the cross-sectional plane is vertical to the central axis z, and all the cross-sectional planes of the plastic lens element 200 satisfying the aforementioned conditions are the same. In FIG. 2B and FIG. 2C, the lens peripheral section 215 of the object-side surface 213 includes the annular groove structure 201, wherein the annular groove structure 201 includes a plurality of stepped surfaces 231. The lens peripheral section 225 of the image-side surface 223 includes the annular groove structure 202, wherein the annular groove structure 202 includes a plurality of stepped surfaces 232.

In FIG. 2A, both of the annular groove structures 201 and 202 are not in contact with the optical elements except the plastic lens element 200 itself of the imaging lens set (i.e. not in contact with the lens element 205, the light blocking sheets 203, 204 and the lens element 206).

In FIG. 2B and FIG. 2C, the plastic lens element 200 with the annular groove structures 201 and 202 is formed integrally and made by an injection molding method. For easily understanding and interpreting the characteristics of the 2nd embodiment according to the present disclosure, the stepped surfaces 231 indicate annular surfaces having normal directions parallel to the central axis z of the annular groove structure 201, wherein an annular surface (its reference numeral is omitted) between two of the stepped surfaces 231 adjacent to each other may have a normal direction vertical to the central axis z. The stepped surfaces 232 indicate annular surfaces having normal directions parallel to the central axis z of the annular groove structure 202, wherein an annular surface (its reference numeral is omitted) between two of the stepped surfaces 232 adjacent to each other may have a normal direction vertical to the central axis z. It can be said that the stepped surfaces 231 and 232 are extended from the central axis z to the edge of the plastic lens element 200.

In FIG. 2C, a range of the annular groove structure 201 is defined by two groove ends 241 and 251, which are respectively two of the stepped surfaces 231 located on two ends of the annular groove structure 201. Each of the groove ends 241 and 251 is closer to the object side than another one of the stepped surfaces 231 which is adjacent thereto. That is, the groove end 241 is the one of the stepped surfaces 231 farthest from the central axis z of the annular groove structure 201, the groove end 251 is the one of the stepped surfaces 231 closest to the central axis z of the annular groove structure 201, and one of the stepped surfaces 231 closest to the image side is a groove bottom 261. A range of the annular groove structure 202 is defined by two groove ends 242 and 252, which are respectively two of the stepped surfaces 232 located on two ends of the annular groove structure 202. Each of the groove ends 242 and 252 is closer to the image side than another one of the stepped surfaces 232 which is adjacent thereto. That is, the groove end 242 is the one of the stepped surfaces 232 farthest from the central axis z of the annular groove structure 202, the groove end 252 is the one of the stepped surfaces 232 closest to the central axis z of the annular groove structure 202, one of the stepped surfaces 232 closest to the object side is a groove bottom 262, and a number of the groove bottom 262 is two. According to the above, a number of the annular groove structure 201 is only one, and a number of the annular groove structure 202 is only one.

In FIG. 2C, a greatest depth parallel to the central axis z of the annular groove structure 201 is h1, and a length in a radial direction of the central axis z of successive three of the stepped surfaces 231 of the annular groove structure 201 is w1. In the 2nd embodiment, the groove ends 241 and 251 are the same close to the object side, and the parameter h1 is taken as a distance parallel to the central axis z between the groove end 241 (or the groove end 251) and the groove bottom 261. The parameter w1 shown in FIG. 2C indicates the length in the radial direction of the central axis z of successive three of the stepped surfaces 231, for example, which are counted from one of the stepped surfaces 231 labeled in FIG. 2C through another two of the stepped surfaces 231 successively following thereof towards the central axis z. The parameter w1 of every successive three of the stepped surfaces 231 in the 2nd embodiment is the same value. Moreover, every one of the stepped surfaces 231 has the same length in the radial direction.

A greatest depth parallel to the central axis z of the annular groove structure 202 is h2, and a length in a radial direction of the central axis z of successive three of the stepped surfaces 232 of the annular groove structure 202 is w2. In the 2nd embodiment, the groove end 242 is closer to the image side than the groove end 252 is to the image side, and the parameter h2 is taken as a distance parallel to the central axis z between the groove end 242 and the groove bottom 262. The parameter w2 shown in FIG. 2C indicates the length in the radial direction of the central axis z of successive three of the stepped surfaces 232, for example, which are counted from one of the stepped surfaces 232 labeled in FIG. 2C through another two of the stepped surfaces 232 successively following thereof towards the central axis z. The parameter w2 of every successive three of the stepped surfaces 232 in the 2nd embodiment is the same value. Moreover, every one of the stepped surfaces 232 has the same length in the radial direction.

In FIG. 2C, the one of the stepped surfaces 231 farthest from the central axis z and the one of the stepped surfaces 231 closest to the central axis z are respectively the two groove ends 241 and 251, and an angle defined by the two groove ends 241 and 251 of the annular groove structure 201 is α1. The one of the stepped surfaces 232 farthest from the central axis z and the one of the stepped surfaces 232 closest to the central axis z are respectively the two groove ends 242 and 252, and an angle defined by the two groove ends 242 and 252 of the annular groove structure 202 is α2.

More specifically, in the 2nd embodiment, the angle α1 is between a line connecting a middle point of the groove end 241 with a middle point of the groove bottom 261, and a line connecting a middle point of the groove end 251 with a middle point of the groove bottom 261 in FIG. 2C. The angle α2 is between a line connecting a middle point of the groove end 242 with a middle point of one of the groove bottoms 262, and a line connecting a middle point of the groove end 252 with a middle point of the other one of the groove bottoms 262 in FIG. 2C. In addition, when a number of groove bottom is at least two (such as the number of the groove bottoms 262 is two in the 2nd embodiment) in the embodiments described in the present disclosure, each of two lines connects one of the groove ends with one of the groove bottoms closest thereto, and an angle between the two lines is a parameter α1 or α2 according to the present disclosure.

Figure 2D:
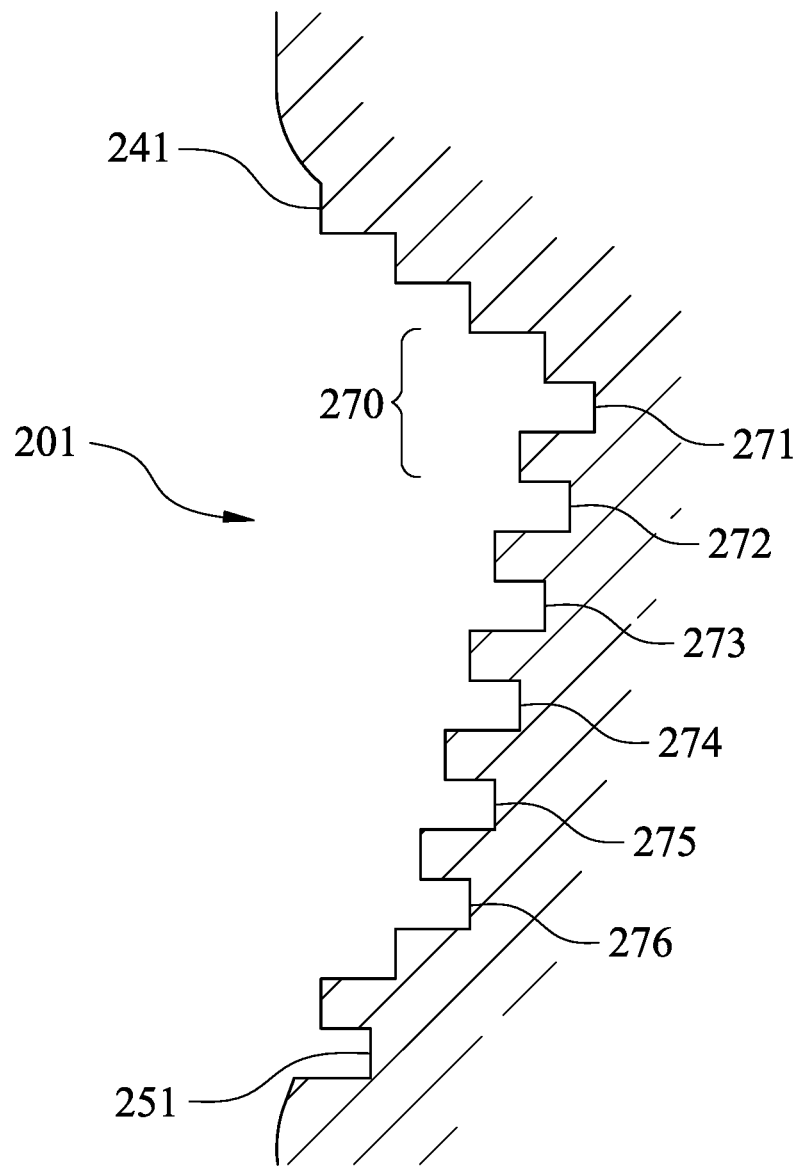
FIG. 2D is a schematic view of the annular groove structure according to FIG. 2C.

FIG. 2D is a schematic view of the annular groove structure 201 according to FIG. 2C. In FIG. 2D, a sub-groove 270 is formed by successive three of the stepped surfaces 231 of the annular groove structure 201 of the object-side surface 213, wherein the middle one of the successive three of the stepped surfaces 231 is closer to the image side than the other two locating on ends of the successive three of the stepped surfaces 231. The middle one of the sub-groove 270 labeled in FIG. 2D is a sub-groove bottom 271. By analogy, on the annular groove structure 201, there are six sub-grooves 270 respectively corresponding to sub-groove bottoms 271, 272, 273, 274, 275 and 276 in order from the edge of the plastic lens element 200 to the central axis z, wherein one locating on one end of successive three of the stepped surfaces 231 may be shared by two of the sub-grooves 270 adjacent to each other.

Figure 2E:
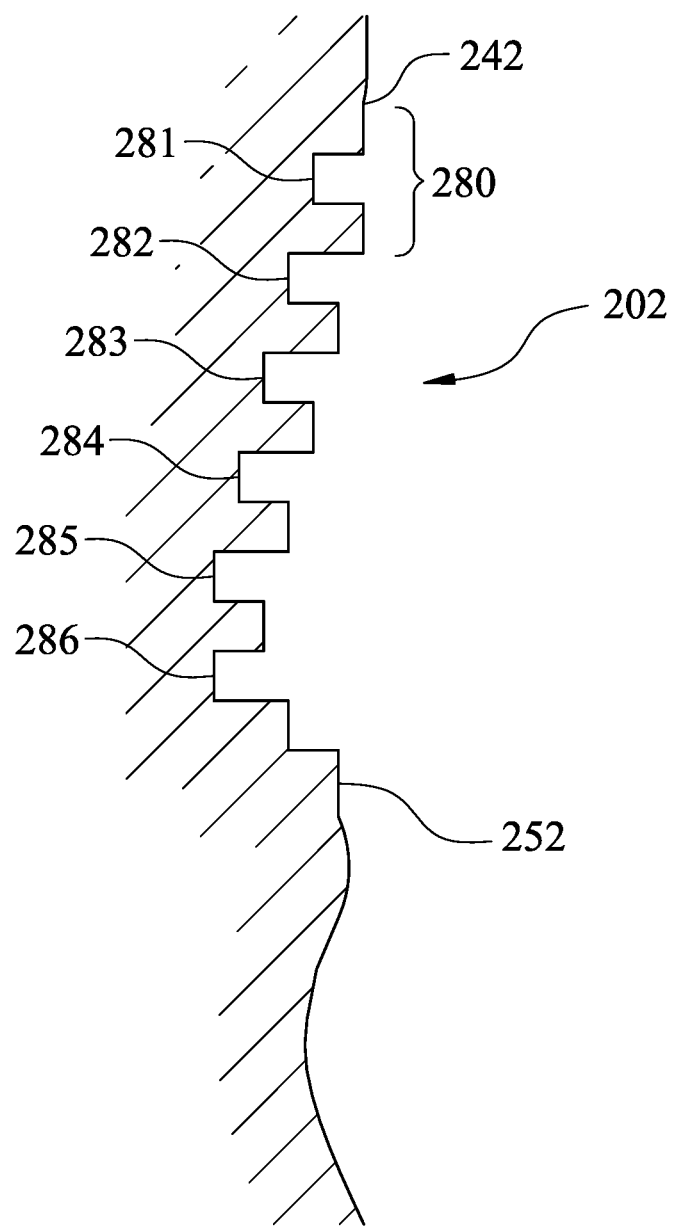
FIG. 2E is a schematic view of another annular groove structure according to FIG. 2C.

FIG. 2E is a schematic view of the annular groove structure 202 according to FIG. 2C. In FIG. 2E, a sub-groove 280 is formed by successive three of the stepped surfaces 232 of the annular groove structure 202 of the image-side surface 223, wherein the middle one of the successive three of the stepped surfaces 232 is closer to the object side than the other two locating on ends of the successive three of the stepped surfaces 232. The middle one of the sub-groove 280 labeled in FIG. 2E is a sub-groove bottom 281. By analogy, on the annular groove structure 202, there are six sub-grooves 280 respectively corresponding to sub-groove bottoms 281, 282, 283, 284, 285 and 286 in order from the edge of the plastic lens element 200 to the central axis z, wherein one locating on one end of successive three of the stepped surfaces 232 may be shared by two of the sub-grooves 280 adjacent to each other.

In FIG. 2A, the lens peripheral section 215 of the object-side surface 213 includes a receiving surface 218, which is a flat surface, and a normal direction of the receiving surface 218 is parallel to the central axis z. The lens peripheral section 225 of the image-side surface 223 includes a receiving surface 228, which is a flat surface, and a normal direction of the receiving surface 228 is parallel to the central axis z. Specifically, the receiving surface 218 of the plastic lens element 200 is received with a receiving surface 258 of the lens element 205, and the receiving surface 228 of the plastic lens element 200 is received with a receiving surface 268 of the lens element 206.

The lens element 205, the lens element 206, which are adjacent to the plastic lens element 200, and the plastic lens element 200 are arranged along the central axis z. The plastic lens element 200 and the lens element 205 respectively include axial connecting structures 216 and 256 for the plastic lens element 200 and the lens element 205 to be assembled with each other and aligned with the central axis z. The axial connecting structure 216 of the plastic lens element 200 includes the receiving surface 218 and a conical surface 217, wherein a normal direction of the receiving surface 218 is parallel to the central axis z, and the receiving surface 218 is farther from the effective optical section 214 than the conical surface 217 is from the effective optical section 214. Furthermore, the conical surface 217 is farther from the effective optical section 214 than the annular groove structure 201 is from the effective optical section 214. That is, the conical surface 217 is farther from the effective optical section 214 than the stepped surfaces 231 is from the effective optical section 214. The axial connecting structure 256 of the lens element 205 includes the receiving surface 258 and a conical surface 257, wherein a normal direction of the receiving surface 258 is parallel to the central axis z, and the receiving surface 258 is farther from an effective optical section (its reference numeral is omitted) of an image-side surface of the lens element 205 than the conical surface 257 is from the effective optical section thereof. More specifically, the receiving surfaces 218 and 258 are corresponding and connected to each other, and the conical surfaces 217 and 257 are corresponding and connected to each other, so that the axial connecting structures 216 and 256 could be for the plastic lens element 200 and the lens element 205 to be assembled with each other and aligned with the central axis z.

The plastic lens element 200 and the lens element 206 respectively include axial connecting structures 226 and 266 for the plastic lens element 200 and the lens element 206 to be assembled with each other and aligned with the central axis z. The axial connecting structure 226 of the plastic lens element 200 includes the receiving surface 228 and a conical surface 227, wherein a normal direction of the receiving surface 228 is parallel to the central axis z, and the receiving surface 228 is farther from the effective optical section 224 than the conical surface 227 is from the effective optical section 224. Furthermore, the conical surface 227 is farther from the effective optical section 224 than the annular groove structure 202 is from the effective optical section 224. That is, the conical surface 227 is farther from the effective optical section 224 than the stepped surfaces 232 is from the effective optical section 224. The axial connecting structure 266 of the lens element 206 includes the receiving surface 268 and a conical surface 267, wherein a normal direction of the receiving surface 268 is parallel to the central axis z, and the receiving surface 268 is farther from an effective optical section (its reference numeral is omitted) of an object-side surface of the lens element 206 than the conical surface 267 is from the effective optical section thereof. More specifically, the receiving surfaces 228 and 268 are corresponding and connected to each other, and the conical surfaces 227 and 267 are corresponding and connected to each other, so that the axial connecting structures 226 and 266 could be for the plastic lens element 200 and the lens element 206 to be assembled with each other and aligned with the central axis z.

The data of the parameters of the imaging lens set and the plastic lens element 200 thereof according to the 2nd embodiment of the present disclosure are listed in the following Table 2, wherein the parameters are also shown in FIG. 2C. The definitions of these parameters shown in Table 2 are the same as those stated in the imaging lens set of the 1st embodiment with corresponding values for the imaging lens set in the 2nd embodiment.

TABLE 2

| 2nd Embodiment | | | |
|---|---|---|---|
| h1 (mm) | 0.11 | α2 (deg.) | 112.5 |
| w1 (mm) | 0.06 | Ns1 | 6 |
| h1/w1 | 1.83 | Ns2 | 6 |
| h2 (mm) | 0.06 | Ns | 12 |
| w2 (mm) | 0.06 | N1 | 18 |
| h2/w2 | 1.00 | N2 | 14 |
| α1 (deg.) | 106.9 | N | 32 |

3rd Embodiment

Figure 3A:
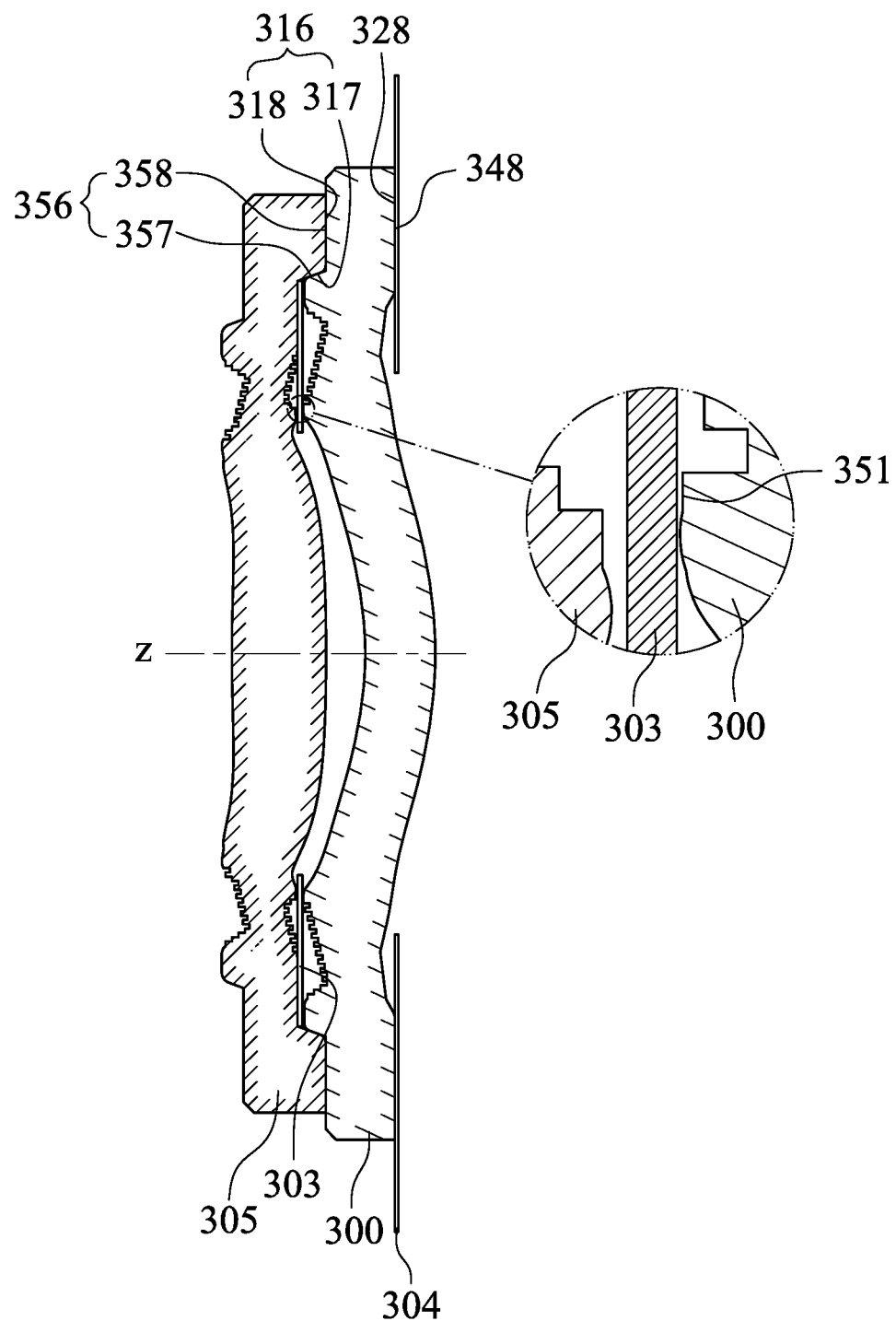
FIG. 3A is a schematic view of an imaging lens set according to the 3rd embodiment of the present disclosure.

FIG. 3A is a schematic view of an imaging lens set according to the 3rd embodiment of the present disclosure. In FIG. 3A, the imaging lens set (its reference numeral is omitted) includes a plurality of optical elements. The optical elements are a lens element 305, a light blocking sheet 303, a plastic lens element 300 and a light blocking sheet 304 in order from an object side to an image side of the imaging lens set, wherein at least one of the lens elements (i.e. the lens element 305 and the plastic lens element 300) is the plastic lens element 300. Furthermore, the imaging lens set may include additional optical elements in an object side of the lens element 305 and an image side of the light blocking sheet 304.

Figure 3B:
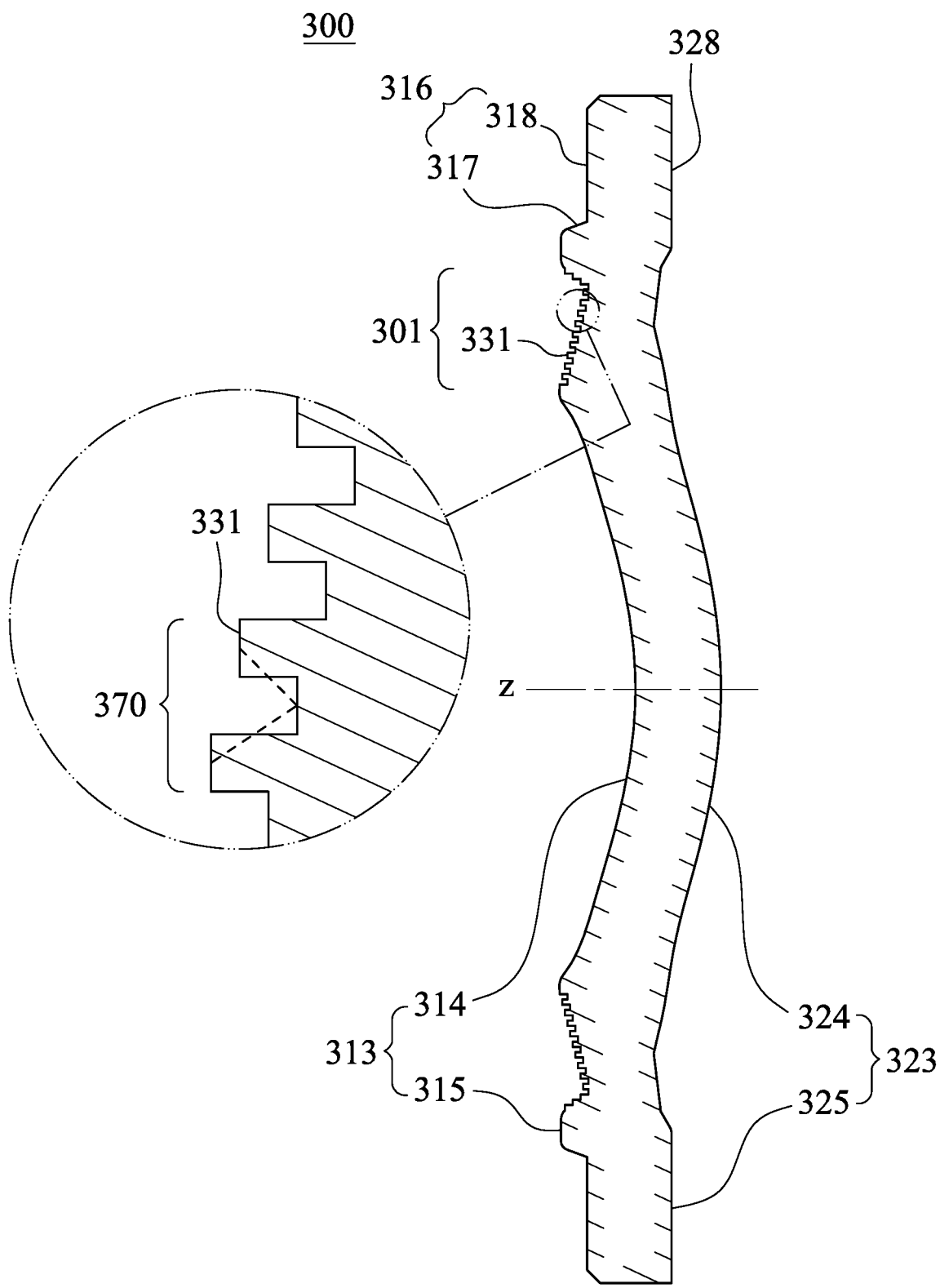
FIG. 3B is a schematic view of a plastic lens element according to FIG. 3A.
Figure 3C:
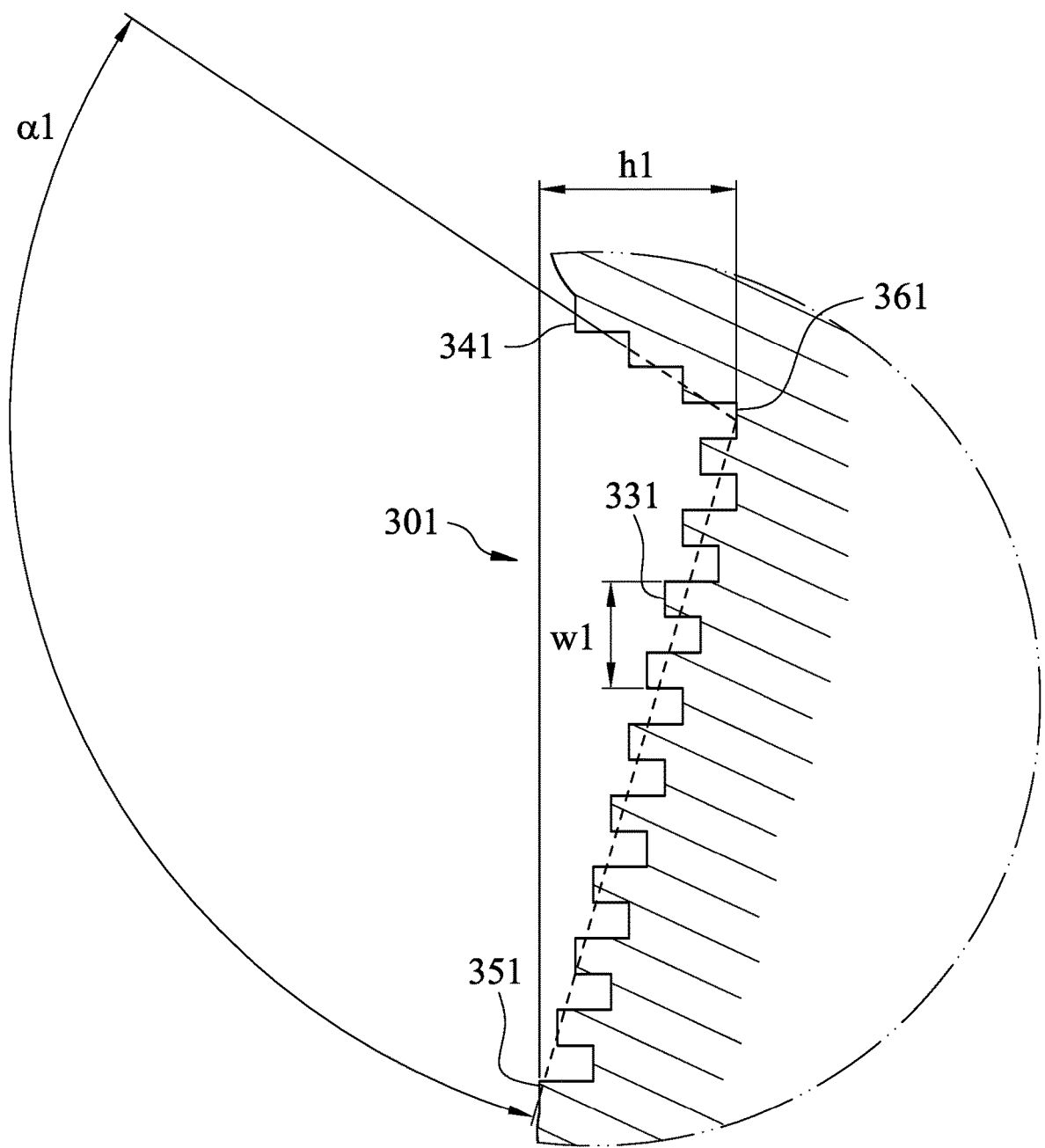
FIG. 3C is a schematic view of an annular groove structure according to FIG. 3B.

FIG. 3B is a schematic view of the plastic lens element 300 according to FIG. 3A, and FIG. 3C is a schematic view of an annular groove structure 301 according to FIG. 3B. In FIG. 3B and FIG. 3C, the plastic lens element 300 having a central axis z (i.e. an optical axis of the imaging lens set) includes an object-side surface 313 and an image-side surface 323, wherein the image-side surface 323 is located opposite to the object-side surface 313. The object-side surface 313 includes an effective optical section 314 and a lens peripheral section 315 in order from the central axis z to an edge of the plastic lens element 300. The effective optical section 314 is for being passed through by an imaging light and aspheric. The lens peripheral section 315 surrounds the effective optical section 314. The image-side surface 323 includes an effective optical section 324 and a lens peripheral section 325 in order from the central axis z to the edge of the plastic lens element 300. The effective optical section 324 is for being passed through by the imaging light and aspheric. The lens peripheral section 325 surrounds the effective optical section 324.

In the 3rd embodiment, FIG. 3B is also a view of a cross-sectional plane of the plastic lens element 300, wherein the cross-sectional plane passes through the central axis z and a normal direction of the cross-sectional plane is vertical to the central axis z, and all the cross-sectional planes of the plastic lens element 300 satisfying the aforementioned conditions are the same. In FIG. 3B and FIG. 3C, the lens peripheral section 315 of the object-side surface 313 includes the annular groove structure 301, wherein the annular groove structure 301 includes a plurality of stepped surfaces 331.

In FIG. 3A, the annular groove structure 301 is not in contact with the optical elements except the plastic lens element 300 itself of the imaging lens set (i.e. not in contact with the lens element 305, the light blocking sheets 303 and 304).

In FIG. 3B and FIG. 3C, the plastic lens element 300 with the annular groove structures 301 is formed integrally and made by an injection molding method. For easily understanding and interpreting the characteristics of the 3rd embodiment according to the present disclosure, the stepped surfaces 331 indicate annular surfaces having normal directions parallel to the central axis z of the annular groove structure 301, wherein an annular surface (its reference numeral is omitted) between two of the stepped surfaces 331 adjacent to each other may have a normal direction vertical to the central axis z. It can be said that the stepped surfaces 331 are extended from the central axis z to the edge of the plastic lens element 300.

In FIG. 3C, a range of the annular groove structure 301 is defined by two groove ends 341 and 351, which are respectively two of the stepped surfaces 331 located on two ends of the annular groove structure 301. Each of the groove ends 341 and 351 is closer to the object side than another one of the stepped surfaces 331 which is adjacent thereto. That is, the groove end 341 is the one of the stepped surfaces 331 farthest from the central axis z of the annular groove structure 301, the groove end 351 is the one of the stepped surfaces 331 closest to the central axis z of the annular groove structure 301, and one of the stepped surfaces 331 closest to the image side is a groove bottom 361. According to the above, a number of the annular groove structure 301 is only one.

In FIG. 3C, a greatest depth parallel to the central axis z of the annular groove structure 301 is h1, and a length in a radial direction of the central axis z of successive three of the stepped surfaces 331 of the annular groove structure 301 is w1. In the 3rd embodiment, the groove end 351 is closer to the object side than the groove end 341 is to the object side, and the parameter h1 is taken as a distance parallel to the central axis z between the groove end 351 and the groove bottom 361. The parameter w1 shown in FIG. 3C indicates the length in the radial direction of the central axis z of successive three of the stepped surfaces 331, for example, which are counted from one of the stepped surfaces 331 labeled in FIG. 3C through another two of the stepped surfaces 331 successively following thereof towards the central axis z. The parameter w1 of every successive three of the stepped surfaces 331 in the 3rd embodiment is the same value. Moreover, every one of the stepped surfaces 331 has the same length in the radial direction.

In FIG. 3C, the one of the stepped surfaces 331 farthest from the central axis z and the one of the stepped surfaces 331 closest to the central axis z are respectively the two groove ends 341 and 351, and an angle defined by the two groove ends 341 and 351 of the annular groove structure 301 is α1. More specifically, in the 3rd embodiment, the angle α1 is between a line connecting a middle point of the groove end 341 with a middle point of the groove bottom 361, and a line connecting a middle point of the groove end 351 with a middle point of the groove bottom 361 in FIG. 3C.

Figure 3D:
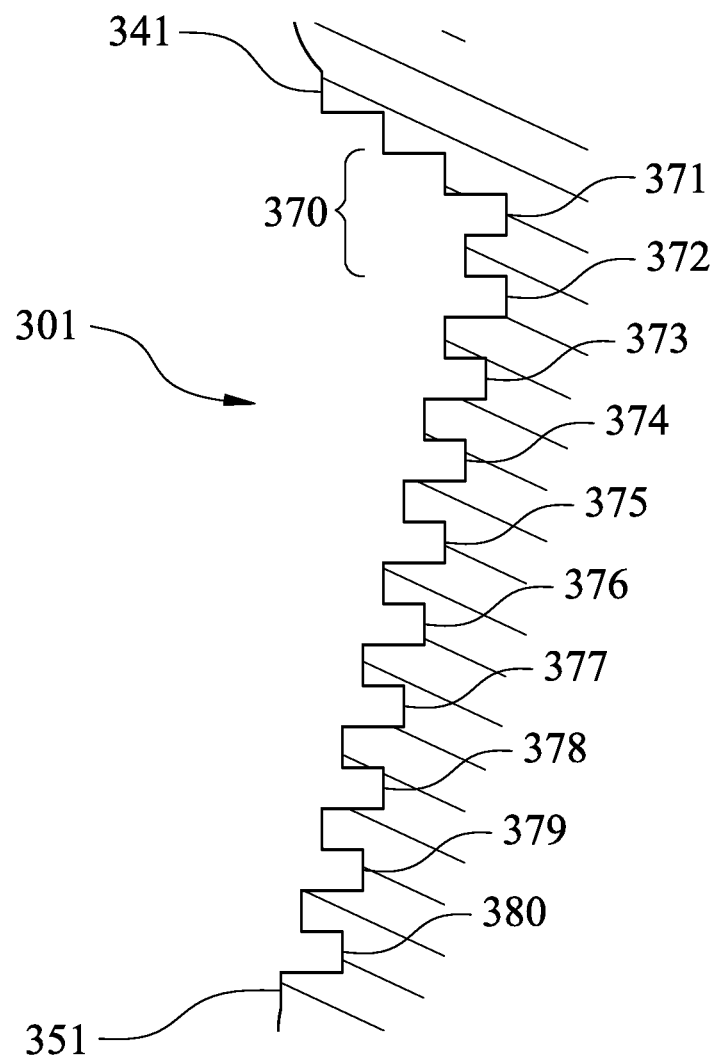
FIG. 3D is another schematic view of the annular groove structure according to FIG. 3B.

FIG. 3D is another schematic view of the annular groove structure 301 according to FIG. 3B. In FIG. 3D, a sub-groove 370 is formed by successive three of the stepped surfaces 331 of the annular groove structure 301 of the object-side surface 313, wherein the middle one of the successive three of the stepped surfaces 331 is closer to the image side than the other two locating on ends of the successive three of the stepped surfaces 331. The middle one of the sub-groove 370 labeled in FIG. 3D is a sub-groove bottom 371. By analogy, on the annular groove structure 301, there are ten sub-grooves 370 respectively corresponding to sub-groove bottoms 371, 372, 373, 374, 375, 376, 377, 378, 379 and 380 in order from the edge of the plastic lens element 300 to the central axis z, wherein one locating on one end of successive three of the stepped surfaces 331 may be shared by two of the sub-grooves 370 adjacent to each other.

In FIG. 3A, the lens peripheral section 315 of the object-side surface 313 includes a receiving surface 318, which is a flat surface, and a normal direction of the receiving surface 318 is parallel to the central axis z. The lens peripheral section 325 of the image-side surface 323 includes a receiving surface 328, which is a flat surface, and a normal direction of the receiving surface 328 is parallel to the central axis z. Specifically, the receiving surface 318 of the plastic lens element 300 is received with a receiving surface 358 of the lens element 305, and the receiving surface 328 of the plastic lens element 300 is received with a receiving surface 348 of the light blocking sheet 304.

The lens element 305, which is adjacent to the plastic lens element 300, and the plastic lens element 300 are arranged along the central axis z. The plastic lens element 300 and the lens element 305 respectively include axial connecting structures 316 and 356 for the plastic lens element 300 and the lens element 305 to be assembled with each other and aligned with the central axis z. The axial connecting structure 316 of the plastic lens element 300 includes the receiving surface 318 and a conical surface 317, wherein a normal direction of the receiving surface 318 is parallel to the central axis z, and the receiving surface 318 is farther from the effective optical section 314 than the conical surface 317 is from the effective optical section 314. Furthermore, the conical surface 317 is farther from the effective optical section 314 than the annular groove structure 301 is from the effective optical section 314. That is, the conical surface 317 is farther from the effective optical section 314 than the stepped surfaces 331 is from the effective optical section 314. The axial connecting structure 356 of the lens element 305 includes the receiving surface 358 and a conical surface 357, wherein a normal direction of the receiving surface 358 is parallel to the central axis z, and the receiving surface 358 is farther from an effective optical section (its reference numeral is omitted) of an image-side surface of the lens element 305 than the conical surface 357 is from the effective optical section thereof. More specifically, the receiving surfaces 318 and 358 are corresponding and connected to each other, and the conical surfaces 317 and 357 are corresponding and connected to each other, so that the axial connecting structures 316 and 356 could be for the plastic lens element 300 and the lens element 305 to be assembled with each other and aligned with the central axis z.

The data of the parameters of the imaging lens set and the plastic lens element 300 thereof according to the 3rd embodiment of the present disclosure are listed in the following Table 3, wherein the parameters are also shown as FIG. 3C. The definitions of these parameters shown in Table 3 are the same as those stated in the imaging lens set of the 1st embodiment with corresponding values for the imaging lens set in the 3rd embodiment.

TABLE 3

| 3rd Embodiment | | | |
|---|---|---|---|
| h1 (mm) | 0.11 | Ns2 | 0 |
| w1 (mm) | 0.06 | Ns | 10 |
| h1/w1 | 1.83 | N1 | 23 |
| α1 (deg.) | 107.5 | N2 | 0 |
| Ns1 | 10 | N | 23 |

4th Embodiment

Figure 4A:
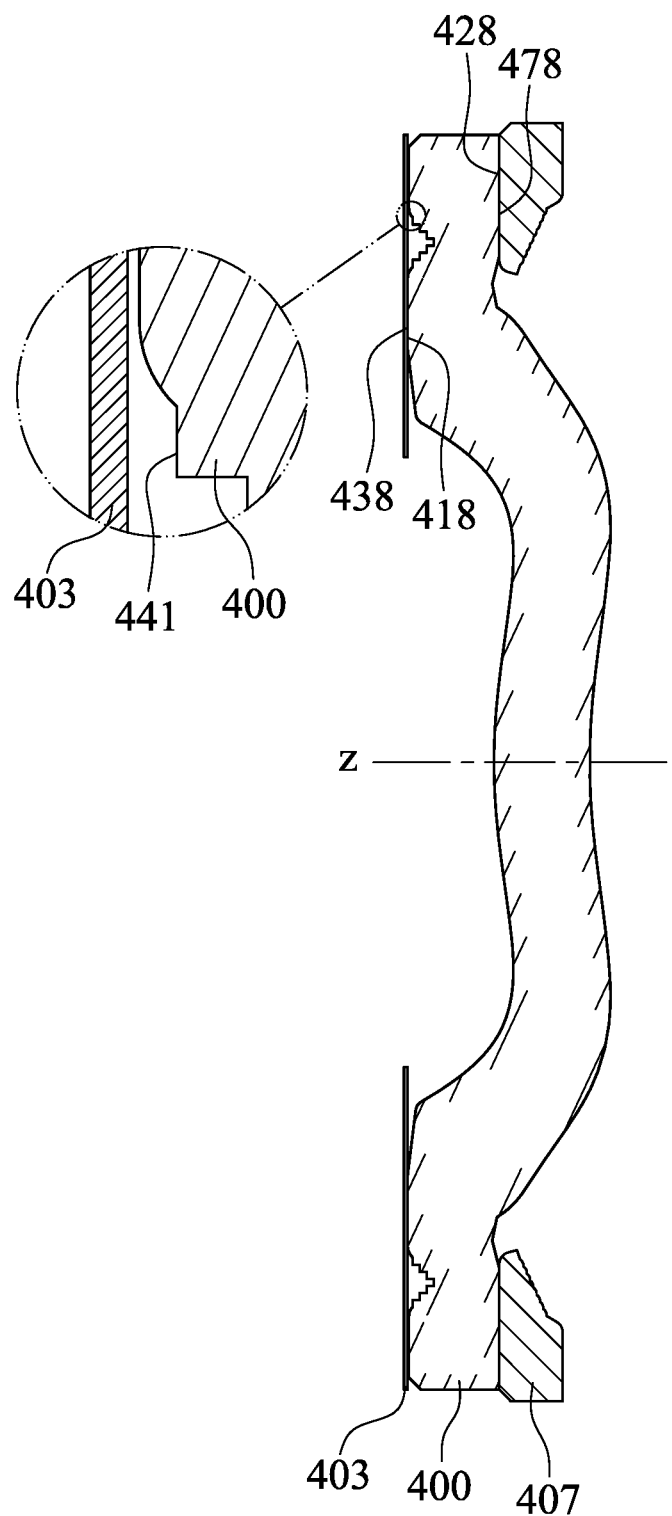
FIG. 4A is a schematic view of an imaging lens set according to the 4th embodiment of the present disclosure.

FIG. 4A is a schematic view of an imaging lens set according to the 4th embodiment of the present disclosure. In FIG. 4A, the imaging lens set (its reference numeral is omitted) includes a plurality of optical elements. The optical elements are a light blocking sheet 403, a plastic lens element 400 and a spacer 407 in order from an object side to an image side of the imaging lens set, wherein at least one of the lens element (i.e. the plastic lens element 400) is the plastic lens element 400. Furthermore, the imaging lens set may include additional optical elements in an object side of the light blocking sheet 403 and an image side of the spacer 407.

Figure 4B:
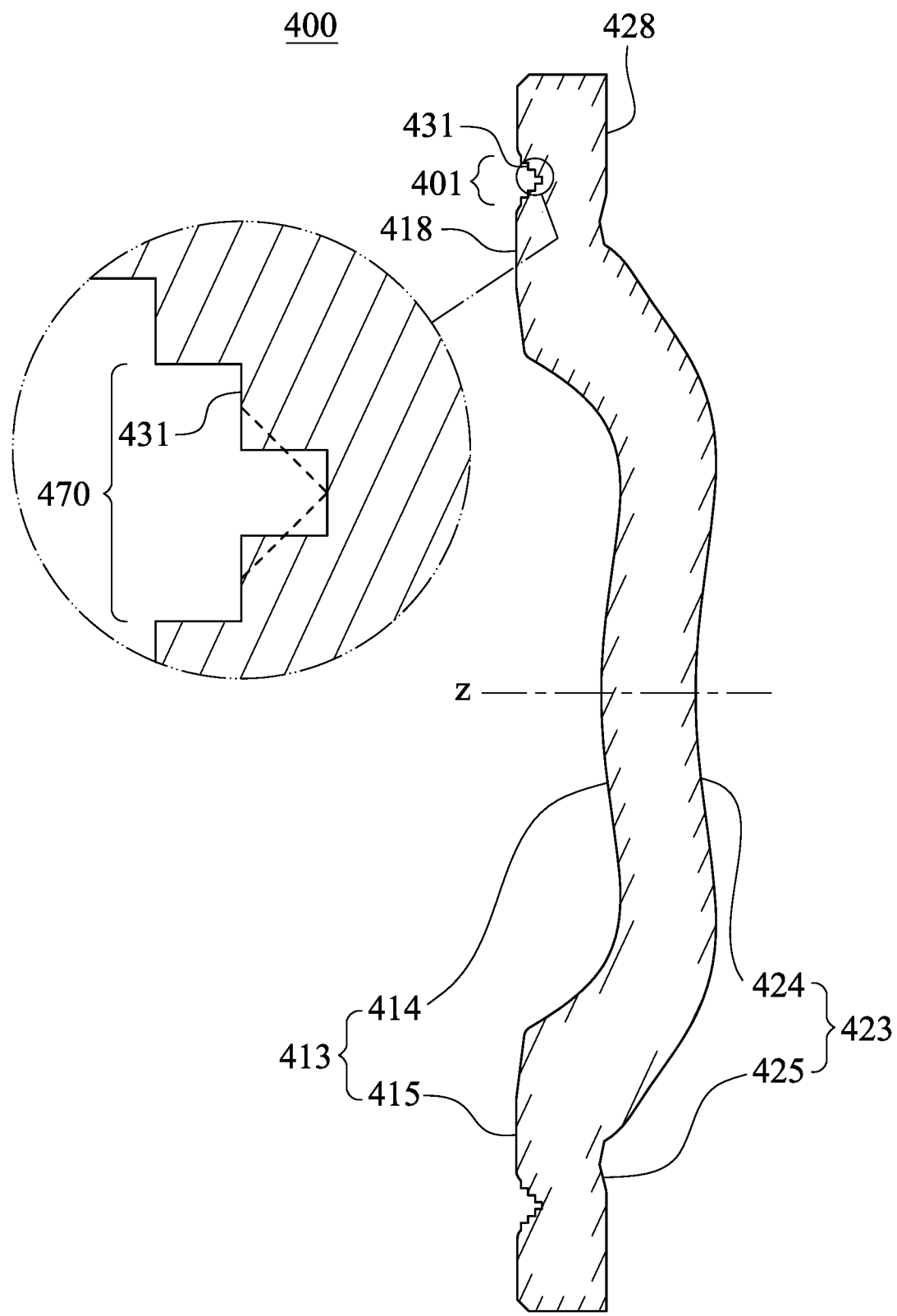
FIG. 4B is a schematic view of a plastic lens element according to FIG. 4A.
Figure 4C:
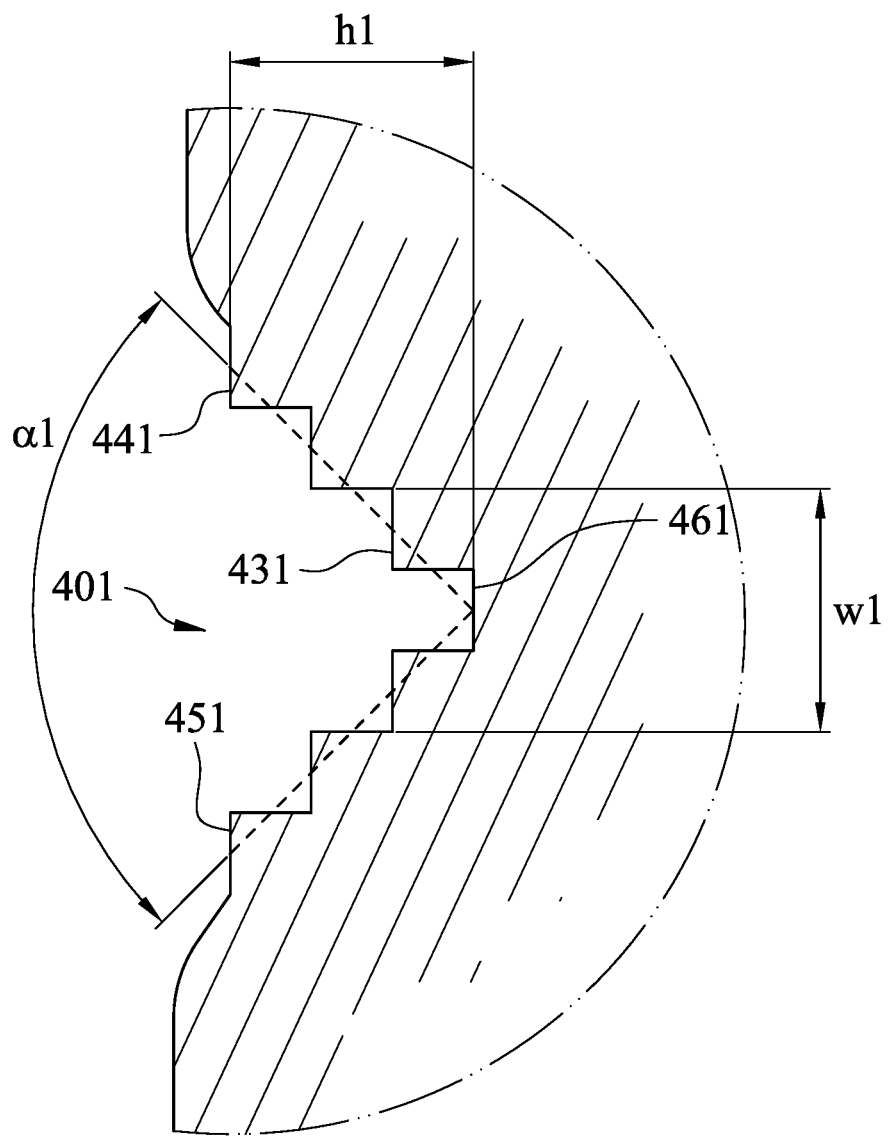
FIG. 4C is a schematic view of an annular groove structure according to FIG. 4B.

FIG. 4B is a schematic view of the plastic lens element 400 according to FIG. 4A, and FIG. 4C is a schematic view of an annular groove structure 401 according to FIG. 4B. In FIG. 4B and FIG. 4C, the plastic lens element 400 having a central axis z (i.e. an optical axis of the imaging lens set) includes an object-side surface 413 and an image-side surface 423, wherein the image-side surface 423 is located opposite to the object-side surface 413. The object-side surface 413 includes an effective optical section 414 and a lens peripheral section 415 in order from the central axis z to an edge of the plastic lens element 400. The effective optical section 414 is for being passed through by an imaging light and aspheric. The lens peripheral section 415 surrounds the effective optical section 414. The image-side surface 423 includes an effective optical section 424 and a lens peripheral section 425 in order from the central axis z to the edge of the plastic lens element 400. The effective optical section 424 is for being passed through by the imaging light and aspheric. The lens peripheral section 425 surrounds the effective optical section 424.

In the 4th embodiment, FIG. 4B is also a view of a cross-sectional plane of the plastic lens element 400, wherein the cross-sectional plane passes through the central axis z and a normal direction of the cross-sectional plane is vertical to the central axis z, and all the cross-sectional planes of the plastic lens element 400 satisfying the aforementioned conditions are the same. In FIG. 4B and FIG. 4C, the lens peripheral section 415 of the object-side surface 413 includes the annular groove structure 401, wherein the annular groove structure 401 includes a plurality of stepped surfaces 431.

In FIG. 4A, the annular groove structure 401 is not in contact with the optical elements except the plastic lens element 400 itself of the imaging lens set (i.e. not in contact with the light blocking sheets 403 and the spacer 407).

In FIG. 4B and FIG. 4C, the plastic lens element 400 with the annular groove structures 401 is formed integrally and made by an injection molding method. For easily understanding and interpreting the characteristics of the 4th embodiment according to the present disclosure, the stepped surfaces 431 indicate annular surfaces having normal directions parallel to the central axis z of the annular groove structure 401, wherein an annular surface (its reference numeral is omitted) between two of the stepped surfaces 431 adjacent to each other may have a normal direction vertical to the central axis z. It can be said that the stepped surfaces 431 are extended from the central axis z to the edge of the plastic lens element 400.

In FIG. 4C, a range of the annular groove structure 401 is defined by two groove ends 441 and 451, which are respectively two of the stepped surfaces 431 located on two ends of the annular groove structure 401. Each of the groove ends 441 and 451 is closer to the object side than another one of the stepped surfaces 431 which is adjacent thereto. That is, the groove end 441 is the one of the stepped surfaces 431 farthest from the central axis z of the annular groove structure 401, the groove end 451 is the one of the stepped surfaces 431 closest to the central axis z of the annular groove structure 401, and one of the stepped surfaces 431 closest to the image side is a groove bottom 461. According to the above, a number of the annular groove structure 401 is only one.

In FIG. 4C, a greatest depth parallel to the central axis z of the annular groove structure 401 is h1, and a length in a radial direction of the central axis z of successive three of the stepped surfaces 431 of the annular groove structure 401 is w1. In the 4th embodiment, the groove ends 441 and 451 are the same close to the object side, and the parameter h1 is taken as a distance parallel to the central axis z between the groove end 441 (or the groove end 451) and the groove bottom 461. The parameter w1 shown in FIG. 4C indicates the length in the radial direction of the central axis z of successive three of the stepped surfaces 431, for example, which are counted from one of the stepped surfaces 431 labeled in FIG. 4C through another two of the stepped surfaces 431 successively following thereof towards the central axis z. The parameter w1 of every successive three of the stepped surfaces 431 in the 4th embodiment is the same value. Moreover, every one of the stepped surfaces 431 has the same length in the radial direction.

In FIG. 4C, the one of the stepped surfaces 431 farthest from the central axis z and the one of the stepped surfaces 431 closest to the central axis z are respectively the two groove ends 441 and 451, and an angle defined by the two groove ends 441 and 451 of the annular groove structure 401 is α1. More specifically, in the 4th embodiment, the angle α1 is between a line connecting a middle point of the groove end 441 with a middle point of the groove bottom 461, and a line connecting a middle point of the groove end 451 with a middle point of the groove bottom 461 in FIG. 4C.

Figure 4D:
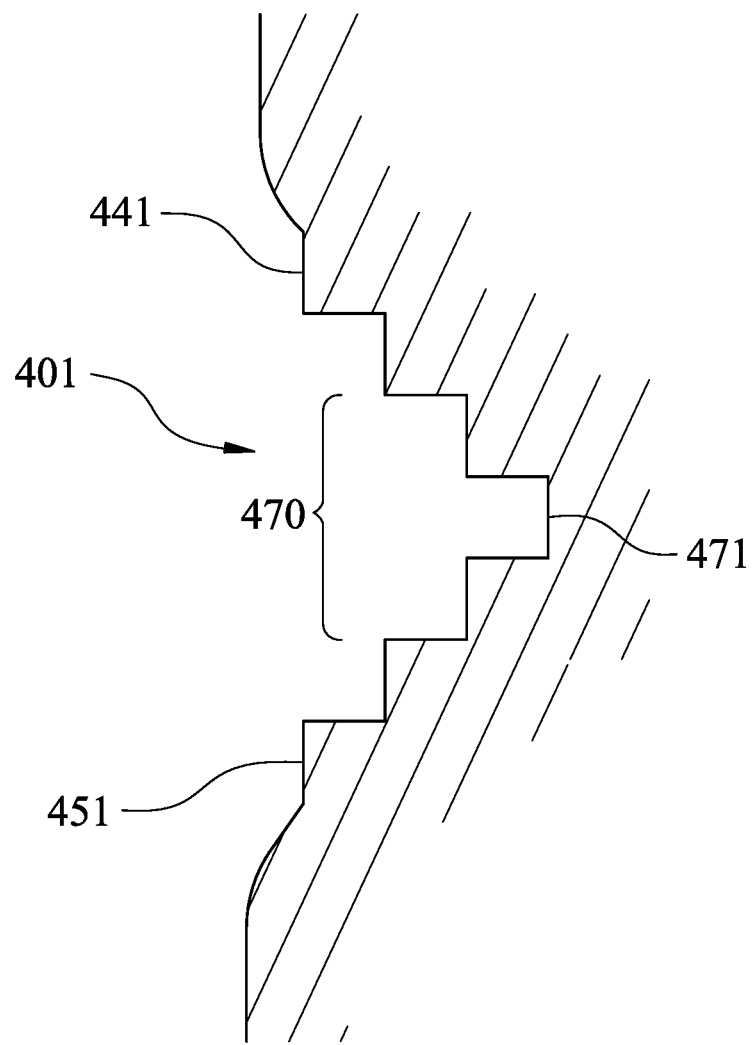
FIG. 4D is another schematic view of the annular groove structure according to FIG. 4B.

FIG. 4D is another schematic view of the annular groove structure 401 according to FIG. 4B. In FIG. 4D, a sub-groove 470 is formed by successive three of the stepped surfaces 431 of the annular groove structure 401 of the object-side surface 413, wherein the middle one of the successive three of the stepped surfaces 431 is closer to the image side than the other two locating on ends of the successive three of the stepped surfaces 431. The middle one of the sub-groove 470 labeled in FIG. 4D is a sub-groove bottom 471. There is only one sub-groove 470 corresponding to the sub-groove bottom 471 in order from the edge of the plastic lens element 400 to the central axis z.

In FIG. 4A, the lens peripheral section 415 of the object-side surface 413 includes a receiving surface 418, which is a flat surface, and a normal direction of the receiving surface 418 is parallel to the central axis z. The lens peripheral section 425 of the image-side surface 423 includes a receiving surface 428, which is a flat surface, and a normal direction of the receiving surface 428 is parallel to the central axis z. Specifically, the receiving surface 418 of the plastic lens element 400 is received with a receiving surface 438 of the light blocking sheet 403, and the receiving surface 428 of the plastic lens element 400 is received with a receiving surface 478 of the spacer 407.

The data of the parameters of the imaging lens set and the plastic lens element 400 thereof according to the 4th embodiment of the present disclosure are listed in the following Table 4, wherein the parameters are also shown as FIG. 4C. The definitions of these parameters shown in Table 4 are the same as those stated in the imaging lens set of the 1st embodiment with corresponding values for the imaging lens set in the 4th embodiment.

TABLE 4

| 4th Embodiment | | | |
|---|---|---|---|
| h1 (mm) | 0.09 | Ns2 | 0 |
| w1 (mm) | 0.09 | Ns | 1 |
| h1/w1 | 1.00 | N1 | 7 |
| α1 (deg.) | 90.1 | N2 | 0 |
| Ns1 | 1 | N | 7 |

5th Embodiment

Figure 5A:
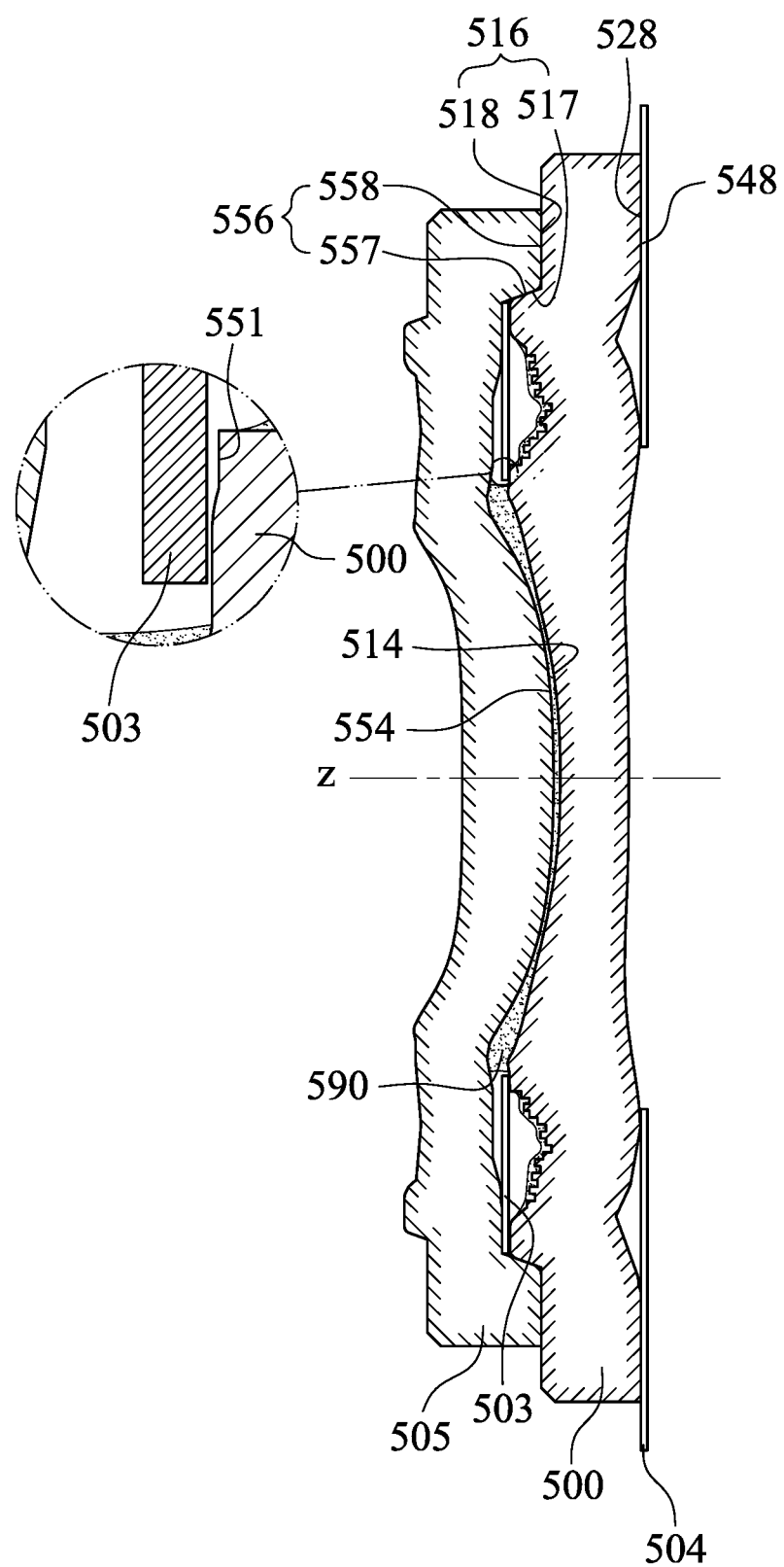
FIG. 5A is a schematic view of an imaging lens set according to the 5th embodiment of the present disclosure.

FIG. 5A is a schematic view of an imaging lens set according to the 5th embodiment of the present disclosure. In FIG. 5A, the imaging lens set (its reference numeral and some details about optical elements are omitted) includes a plurality of optical elements. The optical elements are a lens element 505, a light blocking sheet 503, a plastic lens element 500 and a light blocking sheet 504 in order from an object side to an image side of the imaging lens set, wherein at least one of the lens elements (i.e. the lens element 505 and the plastic lens element 500) is the plastic lens element 500, and the plastic lens element 500 and the lens element 505 are cemented by a cementing glue 590. Furthermore, the imaging lens set may include additional optical elements in an object side of the lens element 505 and an image side of the light blocking sheet 504.

Figure 5B:
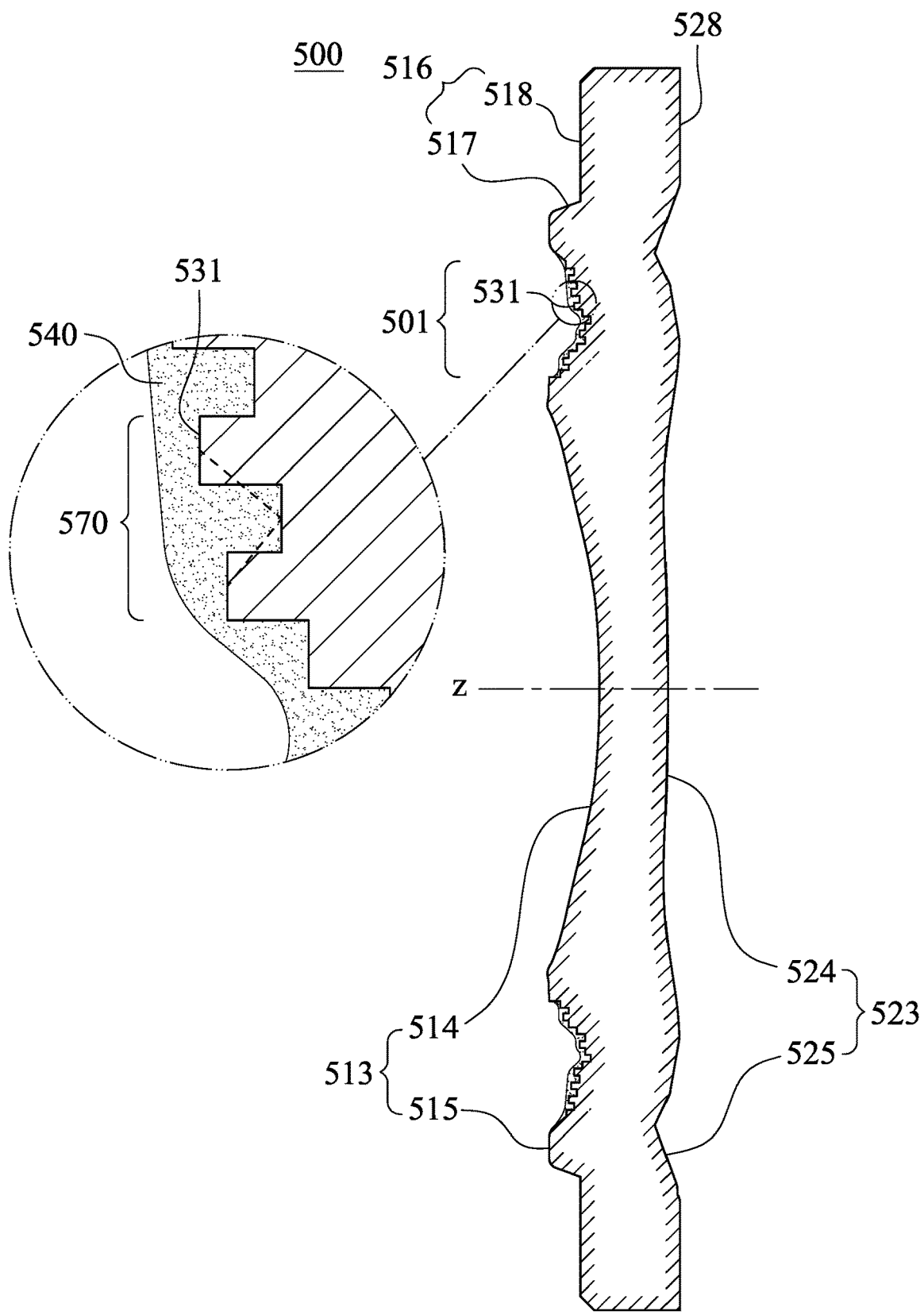
FIG. 5B is a schematic view of a plastic lens element according to FIG. 5A.
Figure 5C:
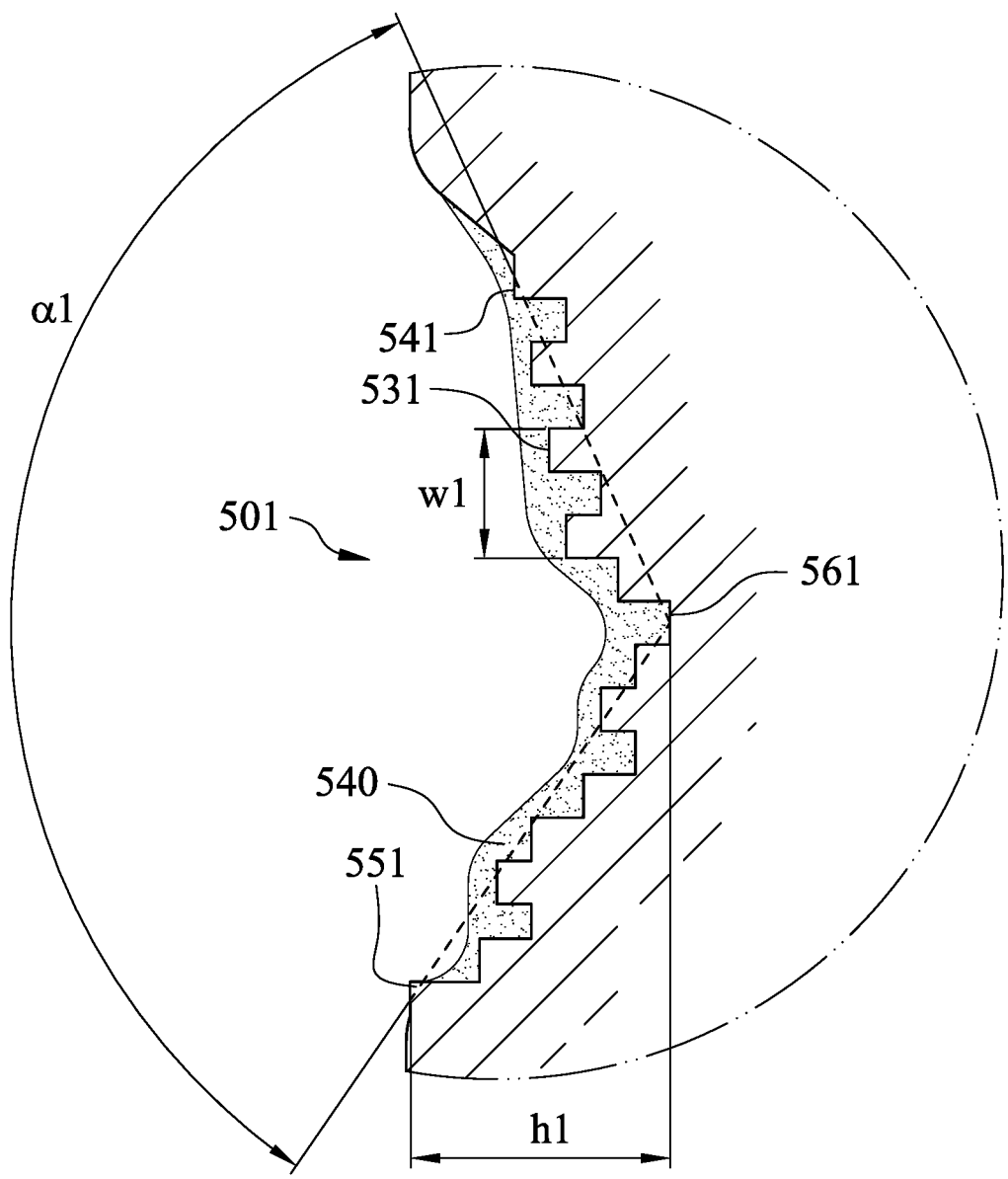
FIG. 5C is a schematic view of an annular groove structure according to FIG. 5B.

FIG. 5B is a schematic view of the plastic lens element 500 according to FIG. 5A, and FIG. 5C is a schematic view of an annular groove structure 501 according to FIG. 5B. In FIG. 5B and FIG. 5C, the plastic lens element 500 having a central axis z (i.e. an optical axis of the imaging lens set) includes an object-side surface 513 and an image-side surface 523, wherein the image-side surface 523 is located opposite to the object-side surface 513. The object-side surface 513 includes an effective optical section 514 and a lens peripheral section 515 in order from the central axis z to an edge of the plastic lens element 500. The effective optical section 514 is for being passed through by an imaging light and aspheric. The lens peripheral section 515 surrounds the effective optical section 514. The image-side surface 523 includes an effective optical section 524 and a lens peripheral section 525 in order from the central axis z to the edge of the plastic lens element 500. The effective optical section 524 is for being passed through by the imaging light and aspheric. The lens peripheral section 525 surrounds the effective optical section 524.

In the 5th embodiment, FIG. 5B is also a view of a cross-sectional plane of the plastic lens element 500, wherein the cross-sectional plane passes through the central axis z and a normal direction of the cross-sectional plane is vertical to the central axis z, and all the cross-sectional planes of the plastic lens element 500 satisfying the aforementioned conditions are the same. In FIG. 5B and FIG. 5C, the lens peripheral section 515 of the object-side surface 513 includes the annular groove structure 501, wherein the annular groove structure 501 includes a plurality of stepped surfaces 531, and a light absorbing coating portion 540 is disposed on at least part of the stepped surfaces 531. Therefore, the stepped surfaces 531 are favorable for the light absorbing coating portion 540 to stay thereon easily so as to provide the light absorbing coating portion 540 being thicker and thereby enhance the effects of blocking the stray light.

In FIG. 5A, the annular groove structure 501 is not in contact with the optical elements except the plastic lens element 500 itself of the imaging lens set (i.e. not in contact with the lens element 505, the light blocking sheets 503 and 504).

In FIG. 5B and FIG. 5C, the plastic lens element 500 with the annular groove structures 501 may be formed integrally and made by an injection molding method. For easily understanding and interpreting the characteristics of the 5th embodiment according to the present disclosure, the stepped surfaces 531 indicate annular surfaces having normal directions parallel to the central axis z of the annular groove structure 501, wherein an annular surface (its reference numeral is omitted) between two of the stepped surfaces 531 adjacent to each other may have a normal direction vertical to the central axis z. It can be said that the stepped surfaces 531 are extended from the central axis z to the edge of the plastic lens element 500.

In FIG. 5C, a range of the annular groove structure 501 is defined by two groove ends 541 and 551, which are respectively two of the stepped surfaces 531 located on two ends of the annular groove structure 501. Each of the groove ends 541 and 551 is closer to the object side than another one of the stepped surfaces 531 which is adjacent thereto. That is, the groove end 541 is the one of the stepped surfaces 531 farthest from the central axis z of the annular groove structure 501, the groove end 551 is the one of the stepped surfaces 531 closest to the central axis z of the annular groove structure 501, and one of the stepped surfaces 531 closest to the image side is a groove bottom 561. According to the above, a number of the annular groove structure 501 is only one.

In FIG. 5C, a greatest depth parallel to the central axis z of the annular groove structure 501 is h1. When a length in a radial direction of the central axis z of successive three of the stepped surfaces 531 of the annular groove structure 501 is w1, the following condition may be satisfied: 0.02 mm<w1<0.19 mm. In the 5th embodiment, the groove end 551 is closer to the object side than the groove end 541 is to the object side, and the parameter h1 is taken as a distance parallel to the central axis z between the groove end 551 and the groove bottom 561. The parameter w1 shown in FIG. 5C indicates the length in the radial direction of the central axis z of successive three of the stepped surfaces 531, for example, which are counted from one of the stepped surfaces 531 labeled in FIG. 5C through another two of the stepped surfaces 531 successively following thereof towards the central axis z. The parameter w1 of every successive three of the stepped surfaces 531 in the 5th embodiment is the same value. Moreover, every one of the stepped surfaces 531 has the same length in the radial direction.

In FIG. 5C, the one of the stepped surfaces 531 farthest from the central axis z and the one of the stepped surfaces 531 closest to the central axis z are respectively the two groove ends 541 and 551, and an angle defined by the two groove ends 541 and 551 of the annular groove structure 501 is α1. More specifically, in the 5th embodiment, the angle α1 is between a line connecting a middle point of the groove end 541 with a middle point of the groove bottom 561, and a line connecting a middle point of the groove end 551 with a middle point of the groove bottom 561 in FIG. 5C.

Figure 5D:
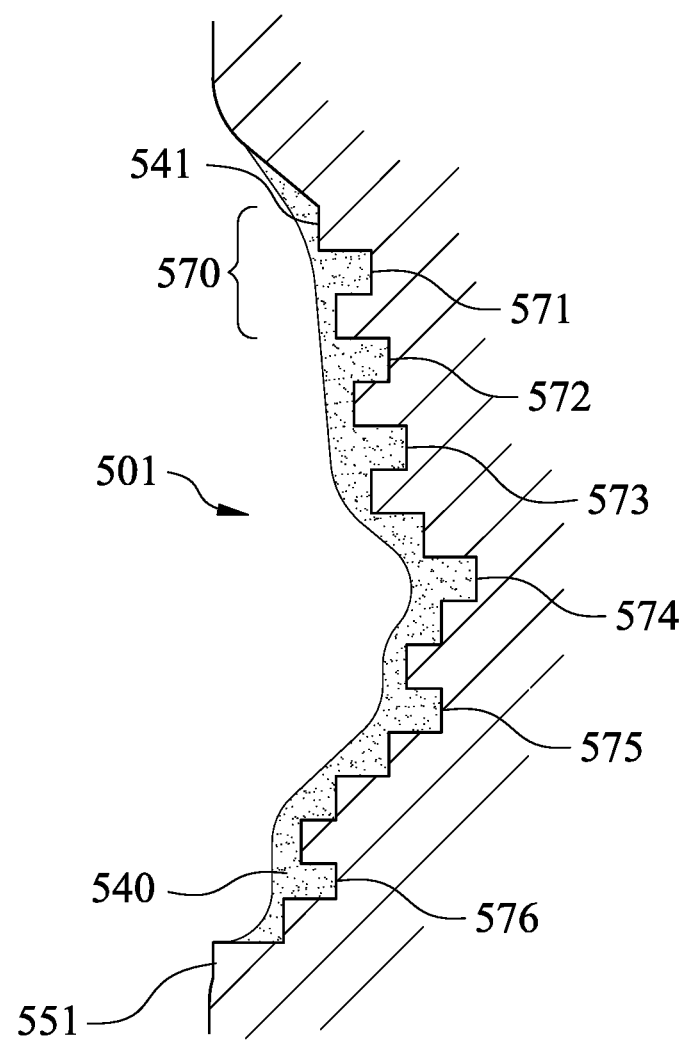
FIG. 5D is another schematic view of the annular groove structure according to FIG. 5B.
Figure 5E:
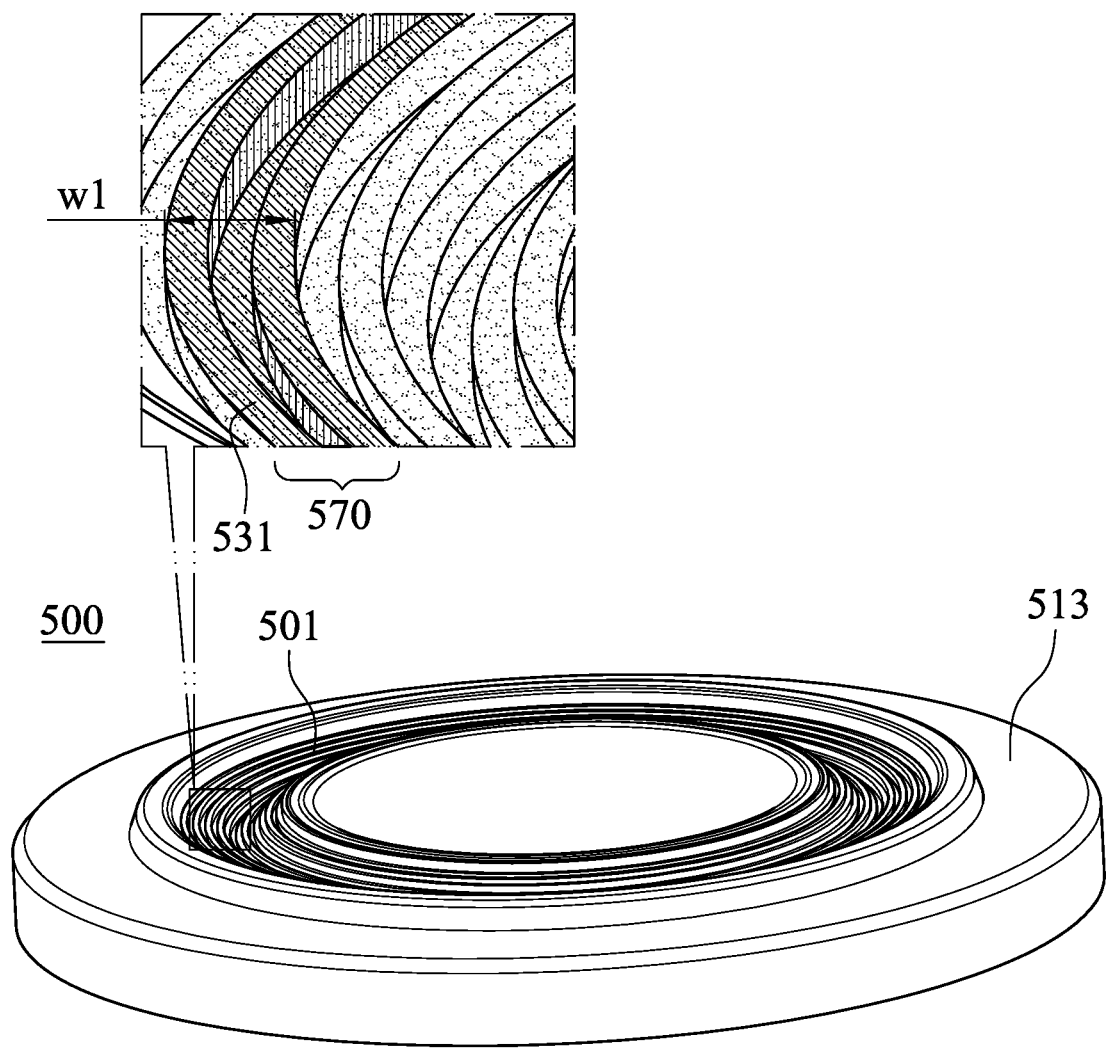
FIG. 5E is a three-dimensional view of the plastic lens element according to FIG. 5B.
Figure 5F:
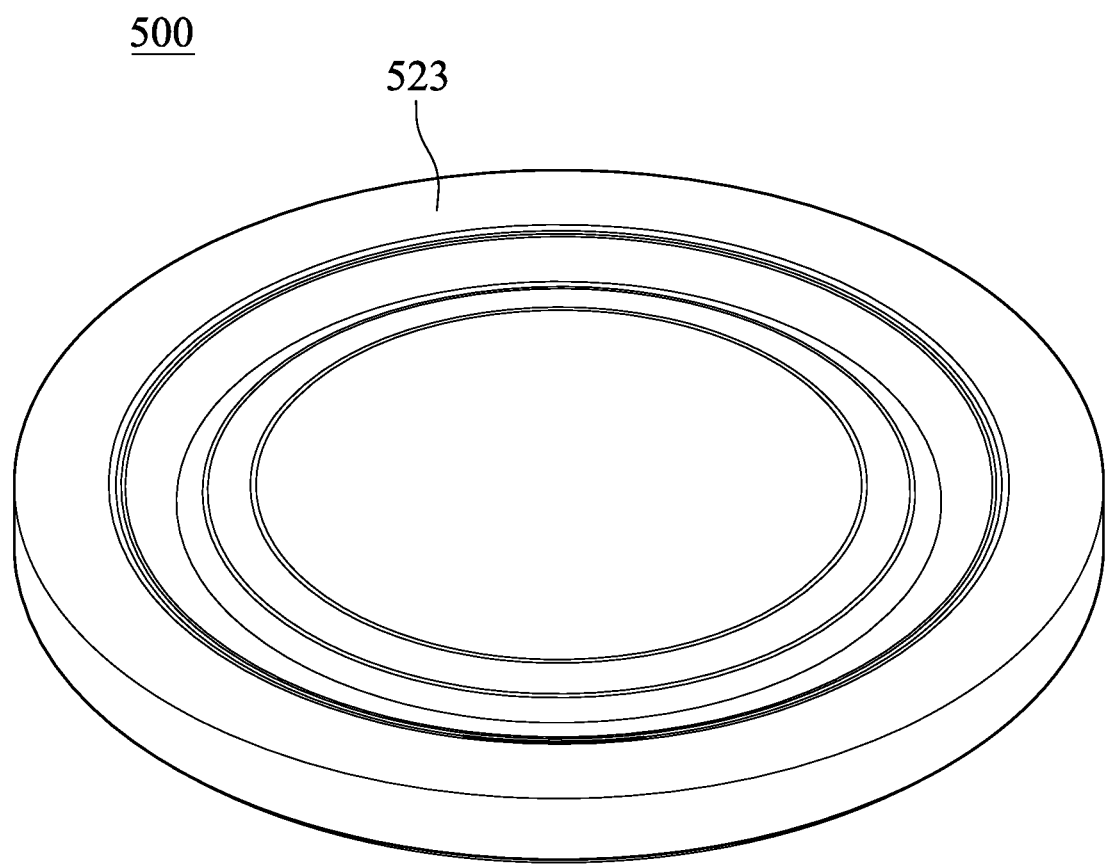
FIG. 5F is another three-dimensional view of the plastic lens element according to FIG. 5B.

FIG. 5D is another schematic view of the annular groove structure 501 according to FIG. 5B, FIG. 5E is a three-dimensional view of the plastic lens element 500 according to FIG. 5B, and FIG. 5F is another three-dimensional view of the plastic lens element 500 according to FIG. 5B. In FIG. 5D to FIG. 5F, a sub-groove 570 is formed by successive three of the stepped surfaces 531 of the annular groove structure 501 of the object-side surface 513, wherein the middle one of the successive three of the stepped surfaces 531 is closer to the image side than the other two locating on ends of the successive three of the stepped surfaces 531. When a sum of a number of the sub-groove 570 of the object-side surface 513 and a number of sub-groove of the image-side surface 523 of the plastic lens element 500 is Ns, the following condition may be satisfied: 1≤Ns<25. The middle one of the sub-groove 570 labeled in FIG. 5D is a sub-groove bottom 571. By analogy, on the annular groove structure 501, there are six sub-grooves 570 respectively corresponding to sub-groove bottoms 571, 572, 573, 574, 575 and 576 in order from the edge of the plastic lens element 500 to the central axis z, wherein one locating on one end of successive three of the stepped surfaces 531 may be shared by two of the sub-grooves 570 adjacent to each other. A number of the stepped surfaces 531 of the annular groove structure 501 of the object-side surface 513 is N1, a number of stepped surfaces of an annular groove structure of the image-side surface 523 is N2, a sum of N1 and N2 of the plastic lens element 500 is N, and that is "N=N1+N2". The sum N of N1 and N2 may be greater than or equal to 4, and smaller than or equal to 48. In the 5th embodiment, the image-side surface 523 includes neither an annular groove structure with stepped surfaces nor a sub-groove with stepped surfaces.

Figure 5G:
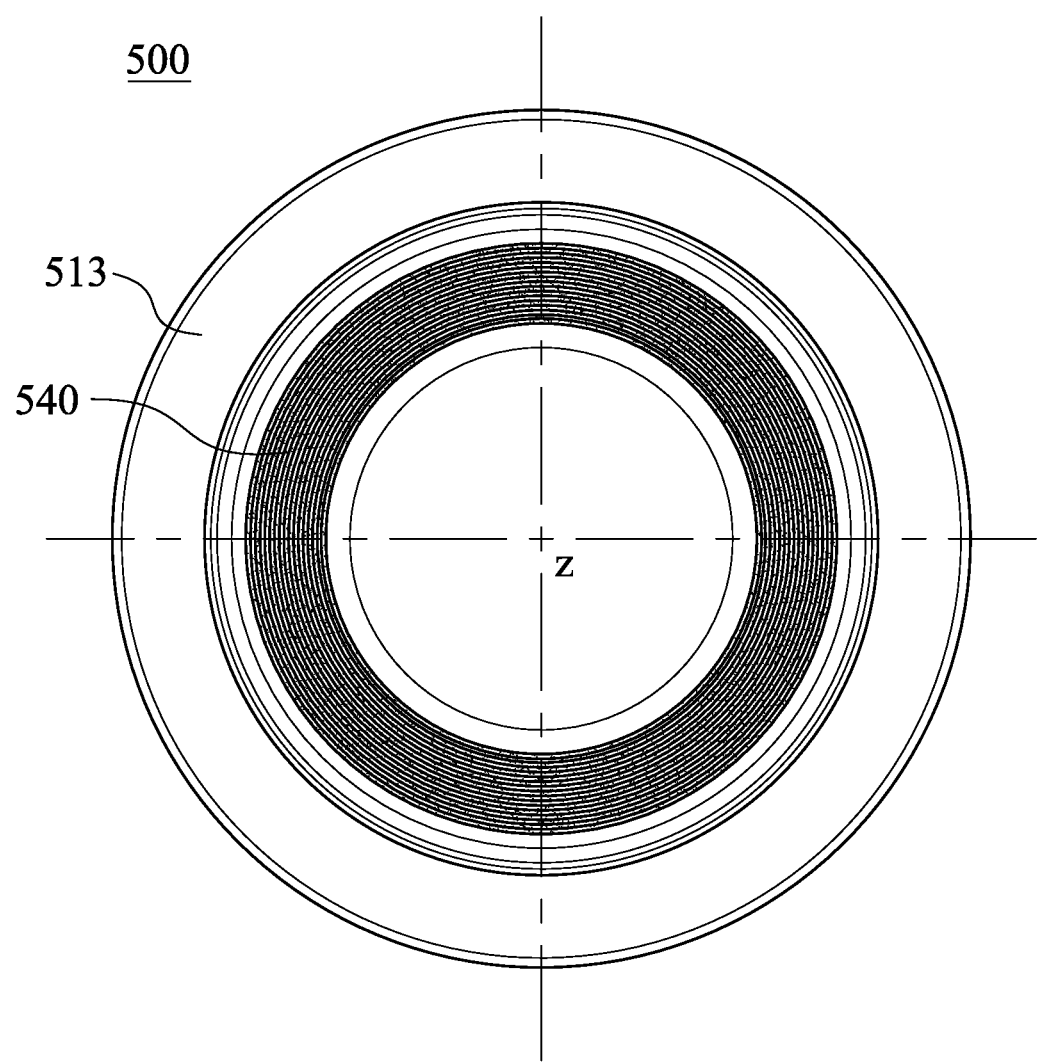
FIG. 5G is a plane view of the plastic lens element according to FIG. 5B.
Figure 5H:
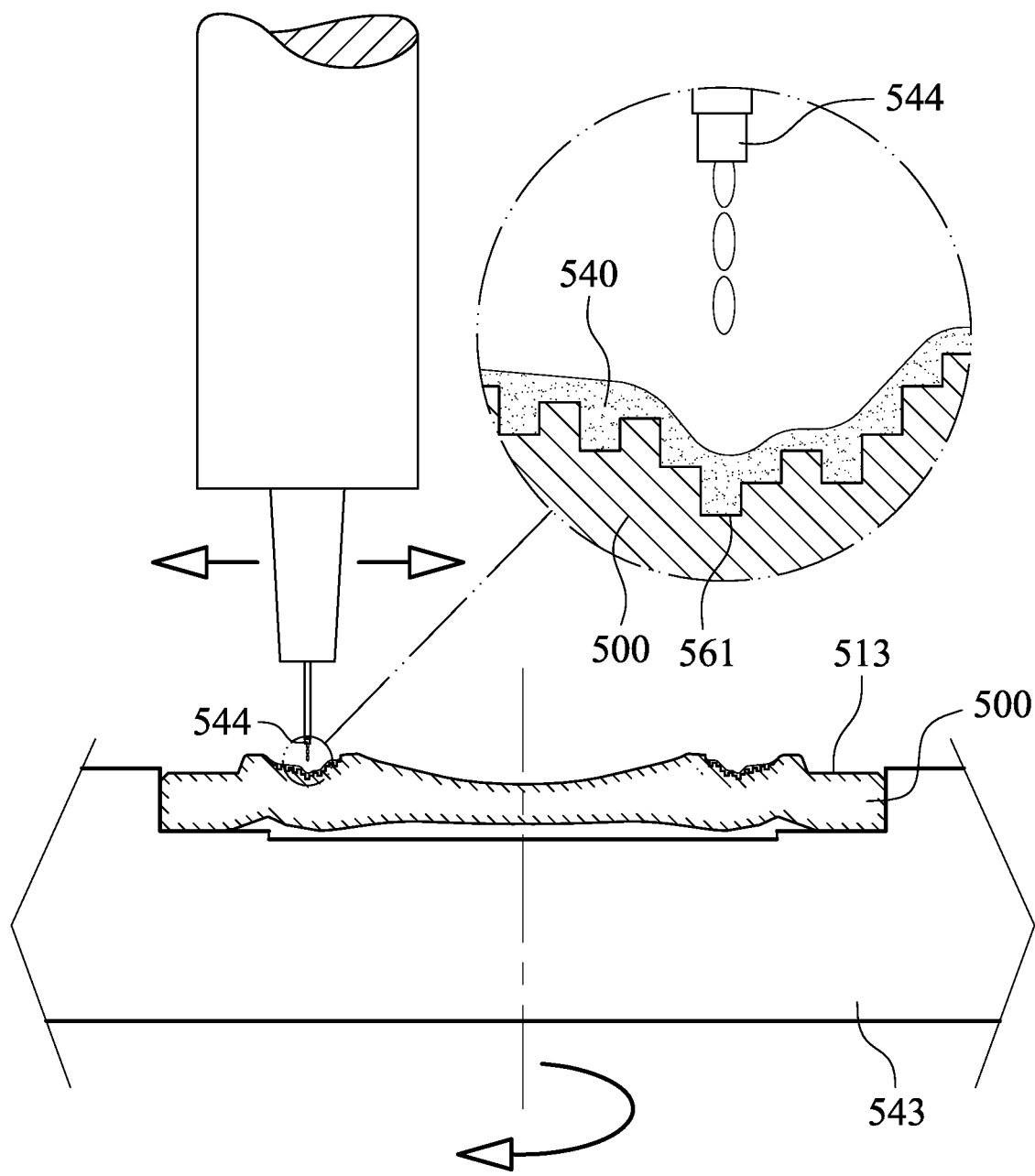
FIG. 5H is a coating schematic view of a light absorbing coating portion according to the 5th embodiment.

FIG. 5G is a plane view of the plastic lens element 500 according to FIG. 5B, and FIG. 5H is a coating schematic view of the light absorbing coating portion 540 according to the 5th embodiment. In FIG. 5G and FIG. 5H, the light absorbing coating portion 540 can be coated on the stepped surfaces 531 by a needle 544. Therefore, it is favorable for effectively controlling the coating range of the light absorbing coating portion 540. The steps of the light absorbing coating portion 540 coated by the needle 544 include placing the plastic lens element 500 with the object-side surface 513 upwards on a lens element platform 543, which can be a fixture of a single lens element or an array plate of multiple lens elements for fixing the plastic lens element 500, and placing the needle 544 above the stepped surfaces 531 of the plastic lens element 500. The lens element platform 543 and the needle 544 have degrees of freedom to move or rotate relatively. Then the light absorbing coating portion 540 may be coated on the stepped surfaces 531 intermittently.

Furthermore, the light absorbing coating portion 540 may be a black ink with flow characteristics initially so as to reduce the stray light reflection. A surface roughness of the stepped surfaces 531 may be adjusted in accordance with the requirements so as to be advantageous in controlling the applying of the light absorbing coating portion 540. In addition, it is not limited to use the needle 544 to apply the light absorbing coating portion 540.

In FIG. 5A, the lens peripheral section 515 of the object-side surface 513 includes a receiving surface 518, which is a flat surface, and a normal direction of the receiving surface 518 is parallel to the central axis z. The lens peripheral section 525 of the image-side surface 523 includes a receiving surface 528, which is a flat surface, and a normal direction of the receiving surface 528 is parallel to the central axis z. Specifically, the receiving surface 518 of the plastic lens element 500 is received with a receiving surface 558 of the lens element 505, and the receiving surface 528 of the plastic lens element 500 is received with a receiving surface 548 of the light blocking sheet 504.

The lens element 505, which is adjacent to the plastic lens element 500, and the plastic lens element 500 are arranged along the central axis z. The plastic lens element 500 and the lens element 505 respectively include axial connecting structures 516 and 556 for the plastic lens element 500 and the lens element 505 to be assembled with each other and aligned with the central axis z. The axial connecting structure 516 of the plastic lens element 500 includes the receiving surface 518 and a conical surface 517, wherein a normal direction of the receiving surface 518 is parallel to the central axis z, and the receiving surface 518 is farther from the effective optical section 514 than the conical surface 517 is from the effective optical section 514. Furthermore, the conical surface 517 is farther from the effective optical section 514 than the annular groove structure 501 is from the effective optical section 514. That is, the conical surface 517 is farther from the effective optical section 514 than the stepped surfaces 531 is from the effective optical section 514. The axial connecting structure 556 of the lens element 505 includes the receiving surface 558 and a conical surface 557, wherein a normal direction of the receiving surface 558 is parallel to the central axis z, and the receiving surface 558 is farther from an effective optical section 554 of an image-side surface of the lens element 505 than the conical surface 557 is from the effective optical section 554. More specifically, the receiving surfaces 518 and 558 are corresponding and connected to each other, and the conical surfaces 517 and 557 are corresponding and connected to each other, so that the axial connecting structures 516 and 556 could be for the plastic lens element 500 and the lens element 505 to be assembled with each other and aligned with the central axis z.

Furthermore, the effective optical section 514 of the plastic lens element 500 and the effective optical section 554 of the lens element 505, which is adjacent to the plastic lens element 500, may be cemented by the cementing glue 590.

The data of the parameters of the imaging lens set and the plastic lens element 500 thereof according to the 5th embodiment of the present disclosure are listed in the following Table 5, wherein the parameters are also shown as FIG. 5C. The definitions of these parameters shown in Table 5 are the same as those stated in the imaging lens set of the 1st embodiment with corresponding values for the imaging lens set in the 5th embodiment.

TABLE 5

| 5th Embodiment | | | |
|---|---|---|---|
| h1 (mm) | 0.15 | Ns2 | 0 |
| w1 (mm) | 0.075 | Ns | 6 |
| h1/w1 | 2.00 | N1 | 18 |
| α1 (deg.) | 121.2 | N2 | 0 |
| Ns1 | 6 | N | 18 |

6th Embodiment

Figure 6A:
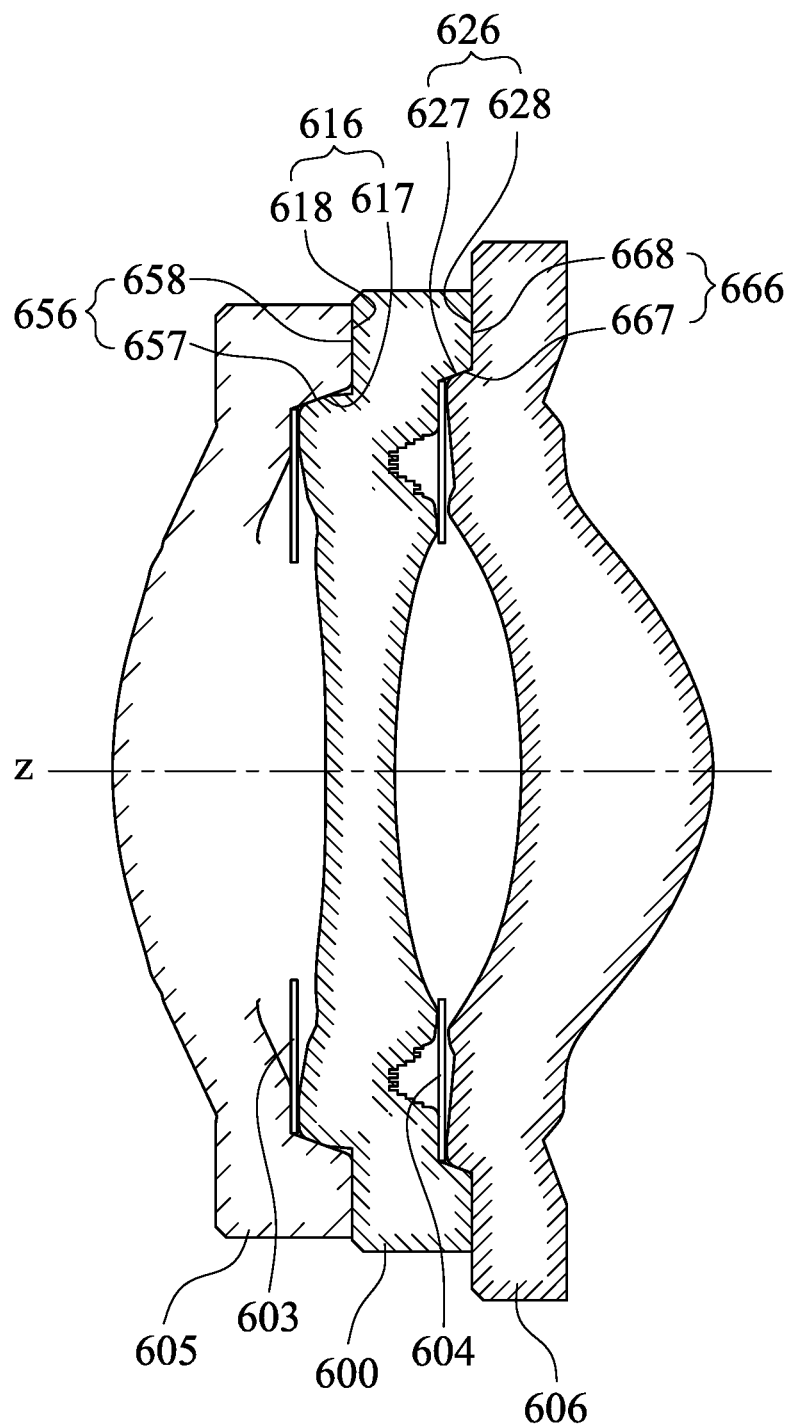
FIG. 6A is a schematic view of an imaging lens set according to the 6th embodiment of the present disclosure.

FIG. 6A is a schematic view of an imaging lens set according to the 6th embodiment of the present disclosure. In FIG. 6A, the imaging lens set (its reference numeral and some details about optical elements are omitted) includes a plurality of optical elements. The optical elements are a lens element 605, a light blocking sheet 603, a plastic lens element 600, a light blocking sheet 604 and a lens element 606 in order from an object side to an image side of the imaging lens set, wherein at least one of the lens elements (i.e. the lens element 605, the plastic lens element 600 and the lens element 606) is the plastic lens element 600. Furthermore, the imaging lens set may include additional optical elements in an object side of the lens element 605 and an image side of the lens element 606.

Figure 6B:
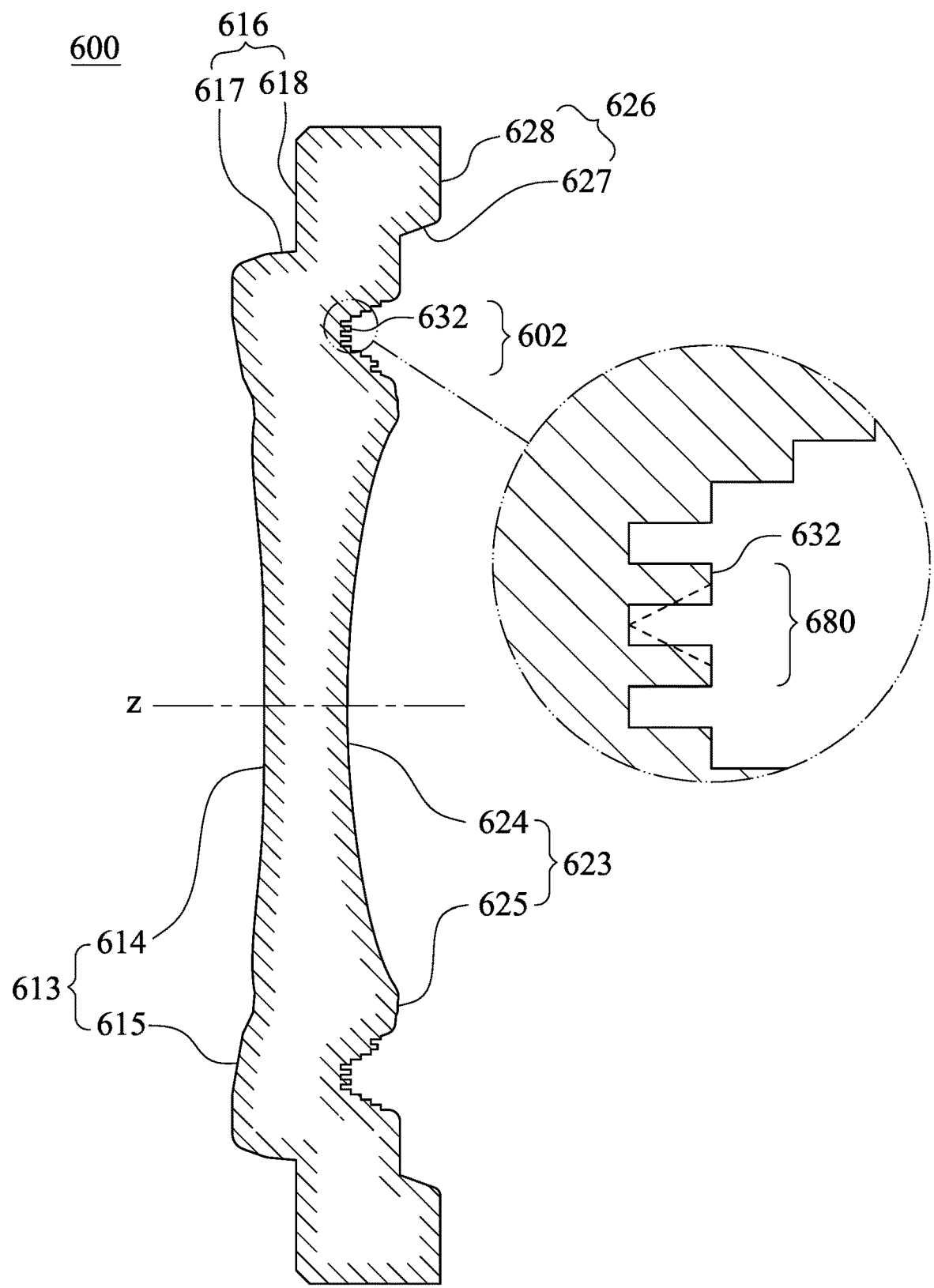
FIG. 6B is a schematic view of a plastic lens element according to FIG. 6A.
Figure 6C:
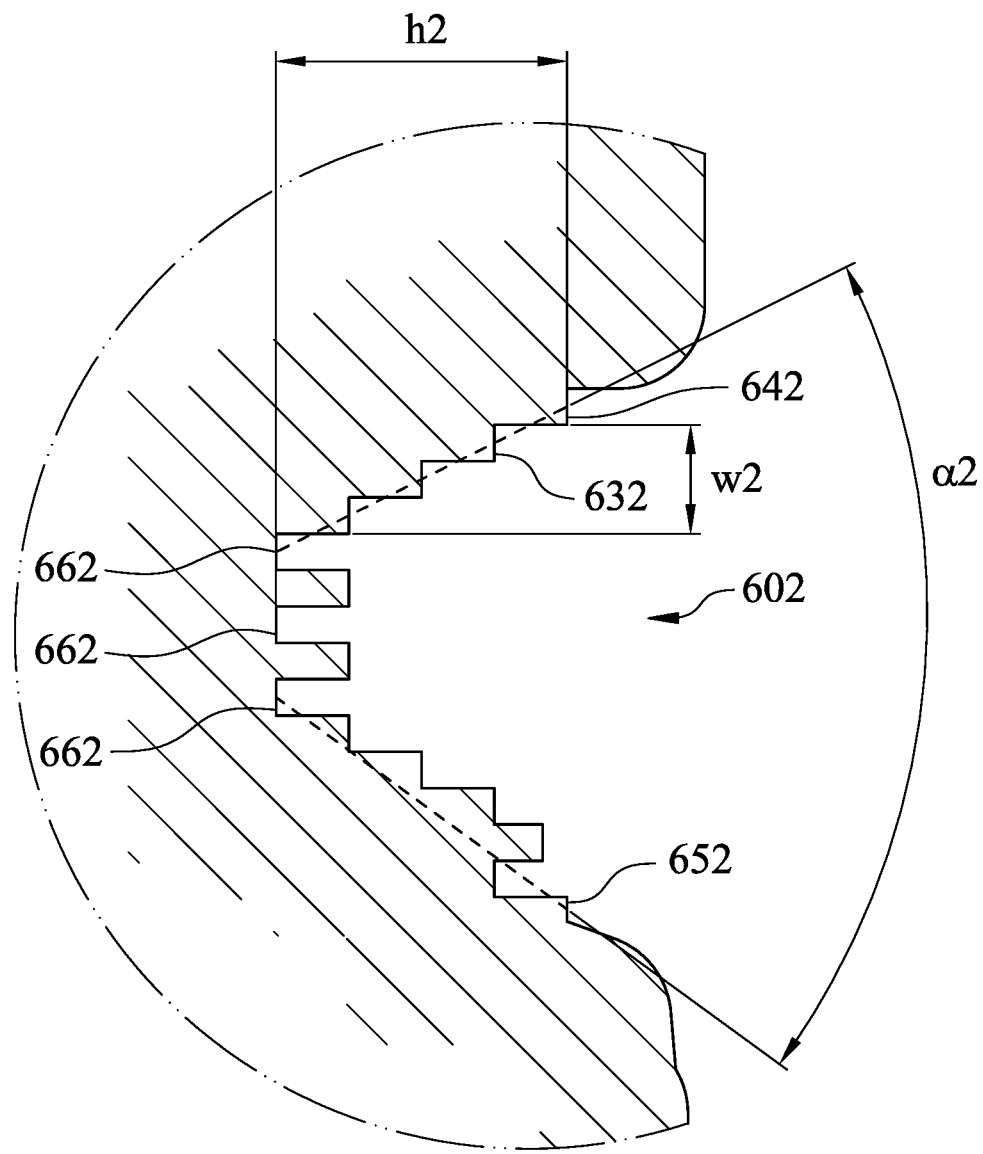
FIG. 6C is a schematic view of an annular groove structure according to FIG. 6B.

FIG. 6B is a schematic view of the plastic lens element 600 according to FIG. 6A, and FIG. 6C is a schematic view of an annular groove structure 602 according to FIG. 6B. In FIG. 6B and FIG. 6C, the plastic lens element 600 having a central axis z (i.e. an optical axis of the imaging lens set) includes an object-side surface 613 and an image-side surface 623, wherein the image-side surface 623 is located opposite to the object-side surface 613. The object-side surface 613 includes an effective optical section 614 and a lens peripheral section 615 in order from the central axis z to an edge of the plastic lens element 600. The effective optical section 614 is for being passed through by an imaging light and aspheric. The lens peripheral section 615 surrounds the effective optical section 614. The image-side surface 623 includes an effective optical section 624 and a lens peripheral section 625 in order from the central axis z to the edge of the plastic lens element 600. The effective optical section 624 is for being passed through by the imaging light and aspheric. The lens peripheral section 625 surrounds the effective optical section 624.

In the 6th embodiment, FIG. 6B is also a view of a cross-sectional plane of the plastic lens element 600, wherein the cross-sectional plane passes through the central axis z and a normal direction of the cross-sectional plane is vertical to the central axis z, and all the cross-sectional planes of the plastic lens element 600 satisfying the aforementioned conditions are the same. In FIG. 6B and FIG. 6C, the lens peripheral section 625 of the image-side surface 623 includes the annular groove structure 602, wherein the annular groove structure 602 includes a plurality of stepped surfaces 632.

In FIG. 6A, the annular groove structure 602 is not in contact with the optical elements except the plastic lens element 600 itself of the imaging lens set (i.e. not in contact with the lens element 605, the light blocking sheets 603, 604 and the lens element 606).

In FIG. 6B and FIG. 6C, the plastic lens element 600 with the annular groove structure 602 is formed integrally and made by an injection molding method. For easily understanding and interpreting the characteristics of the 6th embodiment according to the present disclosure, the stepped surfaces 632 indicate annular surfaces having normal directions parallel to the central axis z of the annular groove structure 602, wherein an annular surface (its reference numeral is omitted) between two of the stepped surfaces 632 adjacent to each other may have a normal direction vertical to the central axis z. It can be said that the stepped surfaces 632 are extended from the central axis z to the edge of the plastic lens element 600.

In FIG. 6C, a range of the annular groove structure 602 is defined by two groove ends 642 and 652, which are respectively two of the stepped surfaces 632 located on two ends of the annular groove structure 602. Each of the groove ends 642 and 652 is closer to the image side than another one of the stepped surfaces 632 which is adjacent thereto. That is, the groove end 642 is the one of the stepped surfaces 632 farthest from the central axis z of the annular groove structure 602, the groove end 652 is the one of the stepped surfaces 632 closest to the central axis z of the annular groove structure 602, one of the stepped surfaces 632 closest to the object side is a groove bottom 662, and a number of the groove bottom 662 is three. According to the above, a number of the annular groove structure 602 is only one.

In FIG. 6C, a greatest depth parallel to the central axis z of the annular groove structure 602 is h2, and a length in a radial direction of the central axis z of successive three of the stepped surfaces 632 of the annular groove structure 602 is w2. In the 6th embodiment, the groove ends 642 and 652 are the same close to the image side, and the parameter h2 is taken as a distance parallel to the central axis z between the groove end 642 (or the groove end 652) and the groove bottom 662. The parameter w2 shown in FIG. 6C indicates the length in the radial direction of the central axis z of successive three of the stepped surfaces 632, for example, which are counted from one of the stepped surfaces 632 labeled in FIG. 6C through another two of the stepped surfaces 632 successively following thereof towards the central axis z. The parameter w2 of every successive three of the stepped surfaces 632 in the 6th embodiment is the same value. Moreover, every one of the stepped surfaces 632 has the same length in the radial direction.

In FIG. 6C, the one of the stepped surfaces 632 farthest from the central axis z and the one of the stepped surfaces 632 closest to the central axis z are respectively the two groove ends 642 and 652, and an angle defined by the two groove ends 642 and 652 of the annular groove structure 602 is α2. More specifically, in the 6th embodiment, the angle α2 is between a line connecting a middle point of the groove end 642 with a middle point of one of the groove bottoms 662, and a line connecting a middle point of the groove end 652 with a middle point of another one of the groove bottoms 662 in FIG. 6C.

Figure 6D:
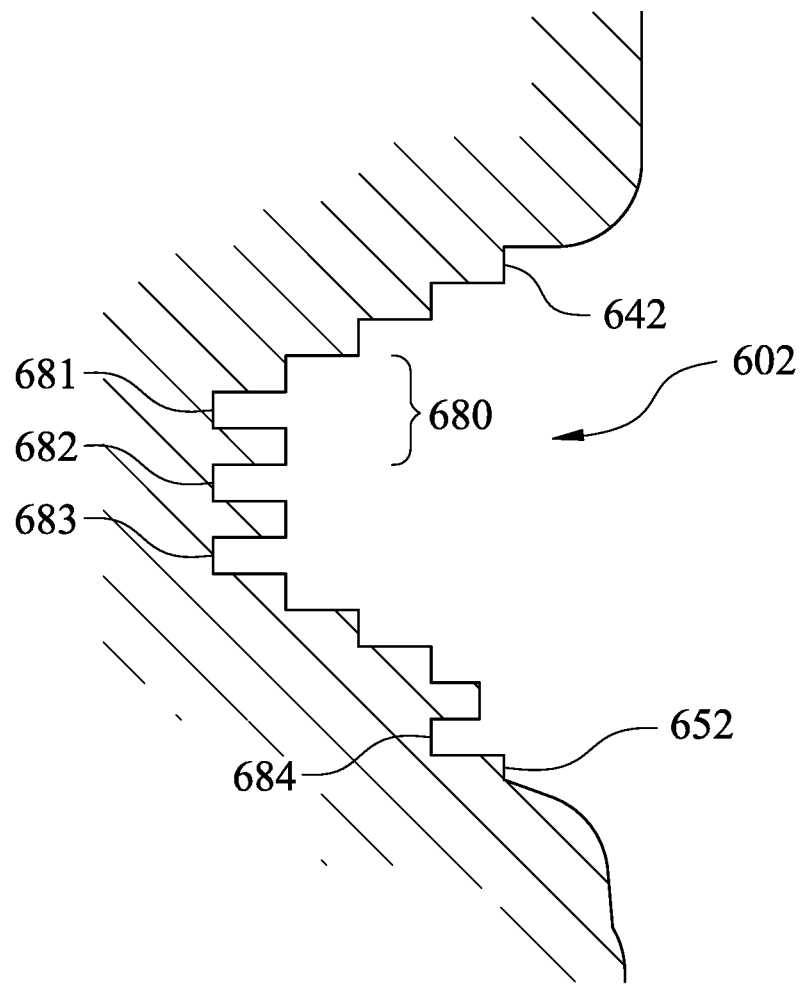
FIG. 6D is another schematic view of the annular groove structure according to FIG. 6B.
Figure 6E:
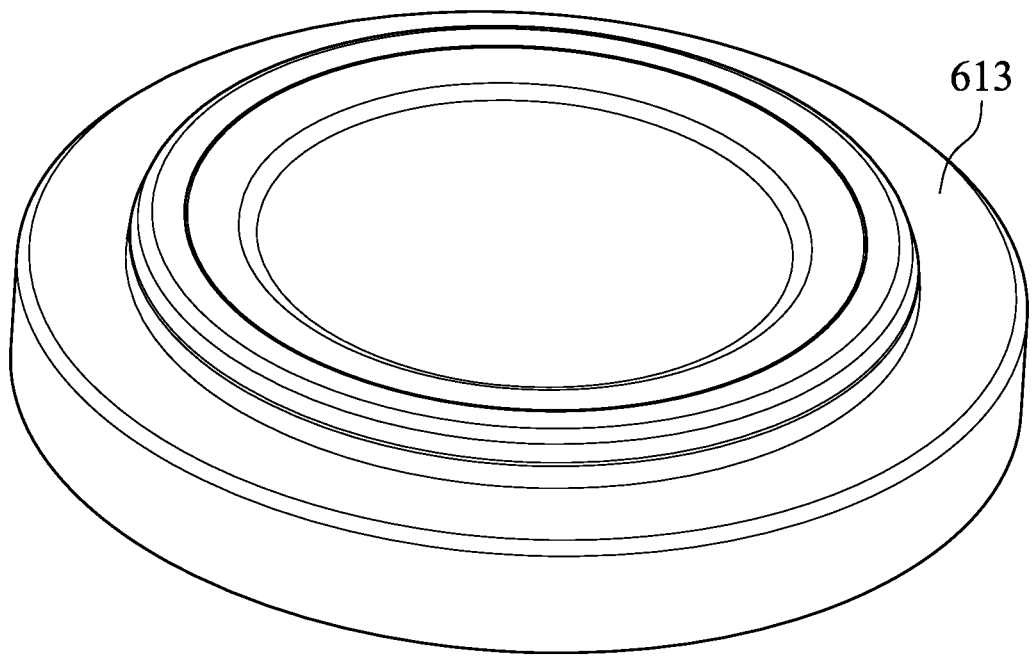
FIG. 6E is a three-dimensional view of the plastic lens element according to FIG. 6B.
Figure 6F:
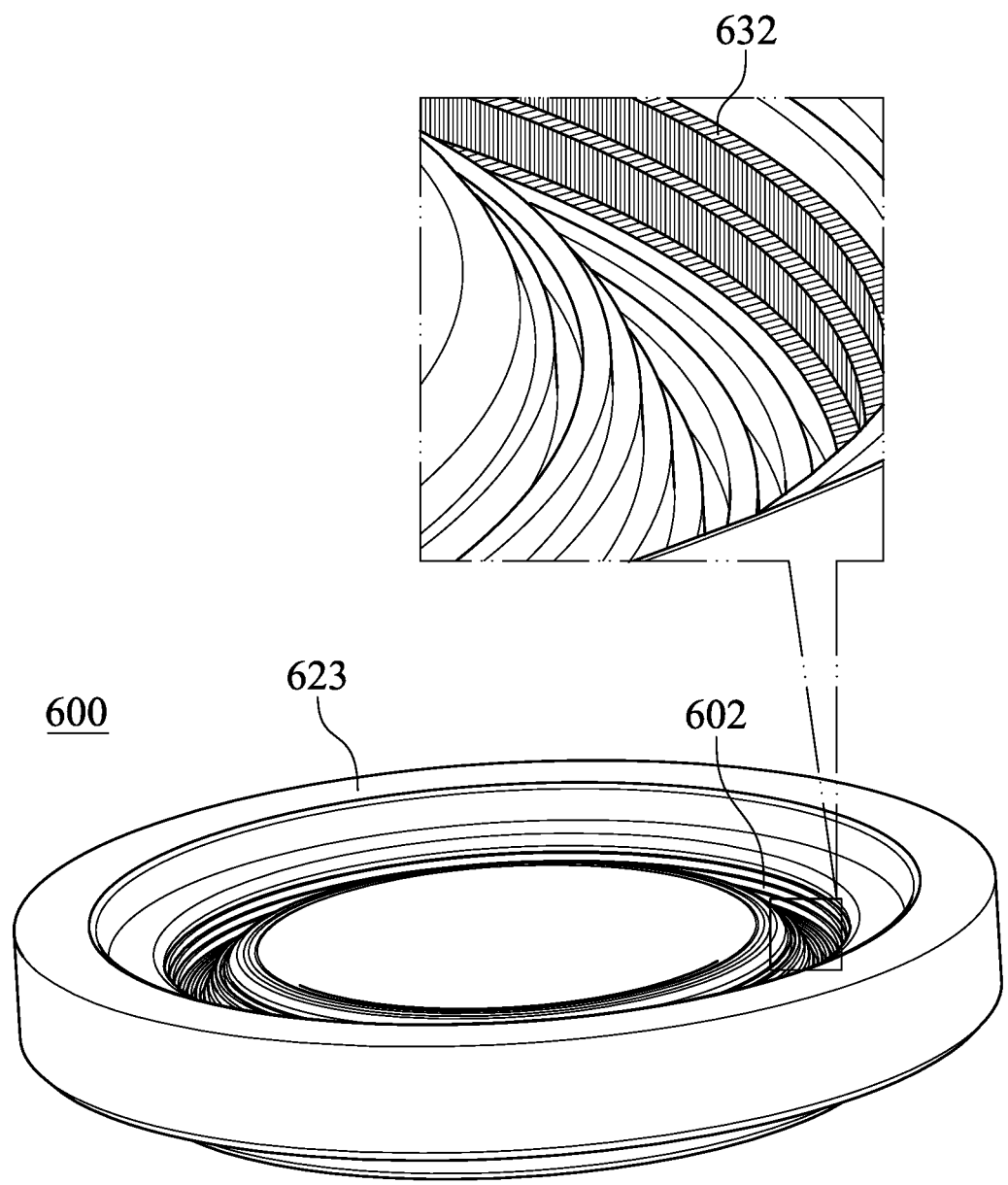
FIG. 6F is another three-dimensional view of the plastic lens element according to FIG. 6B.

FIG. 6D is another schematic view of the annular groove structure 602 according to FIG. 6B, FIG. 6E is a three-dimensional view of the plastic lens element 600 according to FIG. 6B, and FIG. 6F is another three-dimensional view of the plastic lens element 600 according to FIG. 6B. In FIG. 6D to 6F, a sub-groove 680 is formed by successive three of the stepped surfaces 632 of the annular groove structure 602 of the image-side surface 623, wherein the middle one of the successive three of the stepped surfaces 632 is closer to the object side than the other two locating on ends of the successive three of the stepped surfaces 632. The middle one of the sub-groove 680 labeled in FIG. 6D is a sub-groove bottom 681. By analogy, on the annular groove structure 602, there are four sub-grooves 680 respectively corresponding to sub-groove bottoms 681, 682, 683 and 684 in order from the edge of the plastic lens element 600 to the central axis z, wherein one locating on one end of successive three of the stepped surfaces 632 may be shared by two of the sub-grooves 680 adjacent to each other.

In FIG. 6A, the lens peripheral section 615 of the object-side surface 613 includes a receiving surface 618, which is a flat surface, and a normal direction of the receiving surface 618 is parallel to the central axis z. The lens peripheral section 625 of the image-side surface 623 includes a receiving surface 628, which is a flat surface, and a normal direction of the receiving surface 628 is parallel to the central axis z. Specifically, the receiving surface 618 of the plastic lens element 600 is received with a receiving surface 658 of the lens element 605, and the receiving surface 628 of the plastic lens element 600 is received with a receiving surface 668 of the lens element 606.

The lens element 605, the lens element 606, which are adjacent to the plastic lens element 600, and the plastic lens element 600 are arranged along the central axis z. The plastic lens element 600 and the lens element 605 respectively include axial connecting structures 616 and 656 for the plastic lens element 600 and the lens element 605 to be assembled with each other and aligned with the central axis z. The axial connecting structure 616 of the plastic lens element 600 includes the receiving surface 618 and a conical surface 617, wherein a normal direction of the receiving surface 618 is parallel to the central axis z, and the receiving surface 618 is farther from the effective optical section 614 than the conical surface 617 is from the effective optical section 614. The axial connecting structure 656 of the lens element 605 includes the receiving surface 658 and a conical surface 657, wherein a normal direction of the receiving surface 658 is parallel to the central axis z, and the receiving surface 658 is farther from an effective optical section (its reference numeral is omitted) of an image-side surface of the lens element 605 than the conical surface 657 is from the effective optical section thereof. More specifically, the receiving surfaces 618 and 658 are corresponding and connected to each other, and the conical surfaces 617 and 657 are corresponding and connected to each other, so that the axial connecting structures 616 and 656 could be for the plastic lens element 600 and the lens element 605 to be assembled with each other and aligned with the central axis z.

The plastic lens element 600 and the lens element 606 respectively include axial connecting structures 626 and 666 for the plastic lens element 600 and the lens element 606 to be assembled with each other and aligned with the central axis z. The axial connecting structure 626 of the plastic lens element 600 includes the receiving surface 628 and a conical surface 627, wherein a normal direction of the receiving surface 628 is parallel to the central axis z, and the receiving surface 628 is farther from the effective optical section 624 than the conical surface 627 is from the effective optical section 624. Furthermore, the conical surface 627 is farther from the effective optical section 624 than the annular groove structure 602 is from the effective optical section 624. That is, the conical surface 627 is farther from the effective optical section 624 than the stepped surfaces 632 is from the effective optical section 624. The axial connecting structure 666 of the lens element 606 includes the receiving surface 668 and a conical surface 667, wherein a normal direction of the receiving surface 668 is parallel to the central axis z, and the receiving surface 668 is farther from an effective optical section (its reference numeral is omitted) of an object-side surface of the lens element 606 than the conical surface 667 is from the effective optical section thereof. More specifically, the receiving surfaces 628 and 668 are corresponding and connected to each other, and the conical surfaces 627 and 667 are corresponding and connected to each other, so that the axial connecting structures 626 and 666 could be for the plastic lens element 600 and the lens element 606 to be assembled with each other and aligned with the central axis z.

The data of the parameters of the imaging lens set and the plastic lens element 600 thereof according to the 6th embodiment of the present disclosure are listed in the following Table 6, wherein the parameters are also shown as FIG. 6C. The definitions of these parameters shown in Table 6 are the same as those stated in the imaging lens set of the 1st embodiment with corresponding values for the imaging lens set in the 6th embodiment.

TABLE 6

6th Embodiment

| | | | |
|---|---|---|---|
| h2 (mm) | 0.12 | Ns2 | 3 |
| w2 (mm) | 0.045 | Ns | 3 |
| h2/w2 | 2.67 | N1 | 0 |
| α2 (deg.) | 62.7 | N2 | 15 |
| Ns1 | 0 | N | 15 |

7th Embodiment

Figure 7A:
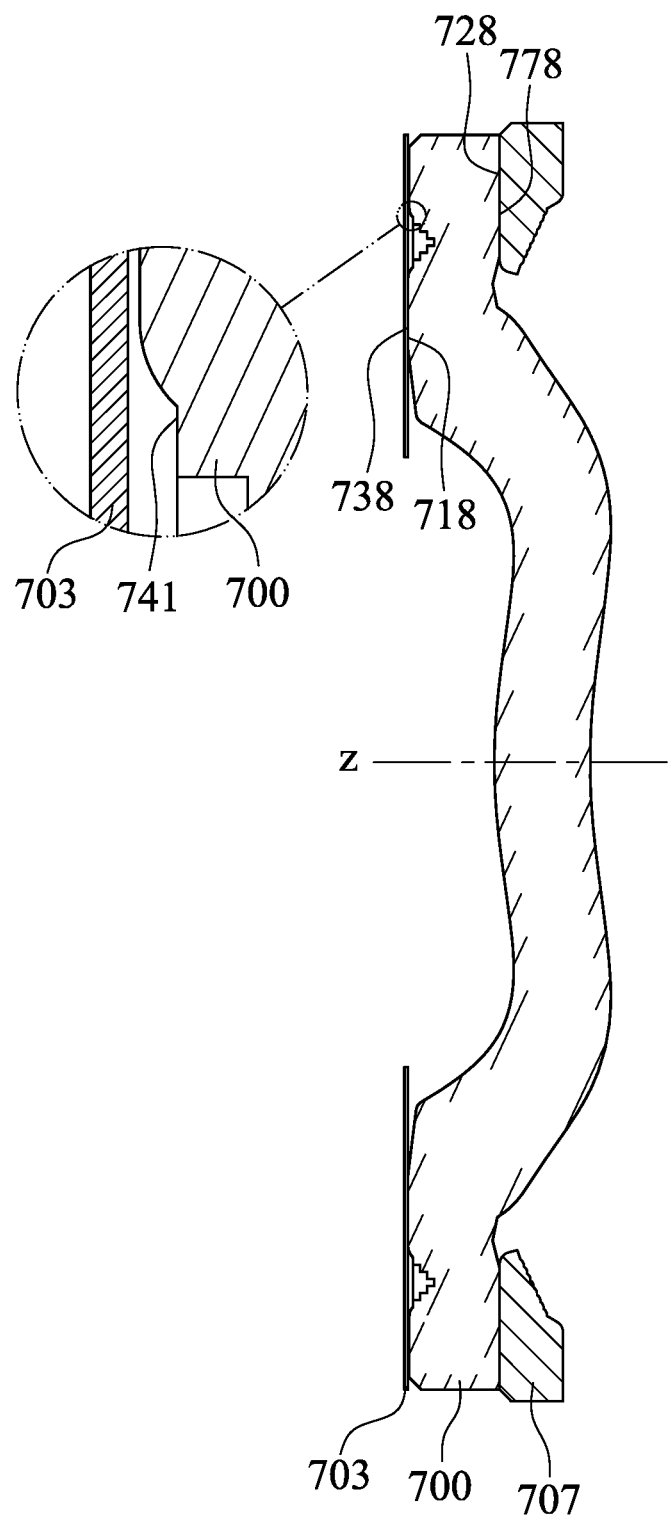
FIG. 7A is a schematic view of an imaging lens set according to the 7th embodiment of the present disclosure.

FIG. 7A is a schematic view of an imaging lens set according to the 7th embodiment of the present disclosure. In FIG. 7A, the imaging lens set (its reference numeral is omitted) includes a plurality of optical elements. The optical elements are a light blocking sheet 703, a plastic lens element 700 and a spacer 707 in order from an object side to an image side of the imaging lens set, wherein at least one of the lens element (i.e. the plastic lens element 700) is the plastic lens element 700. Furthermore, the imaging lens set may include additional optical elements in an object side of the light blocking sheet 703 and an image side of the spacer 707.

Figure 7B:
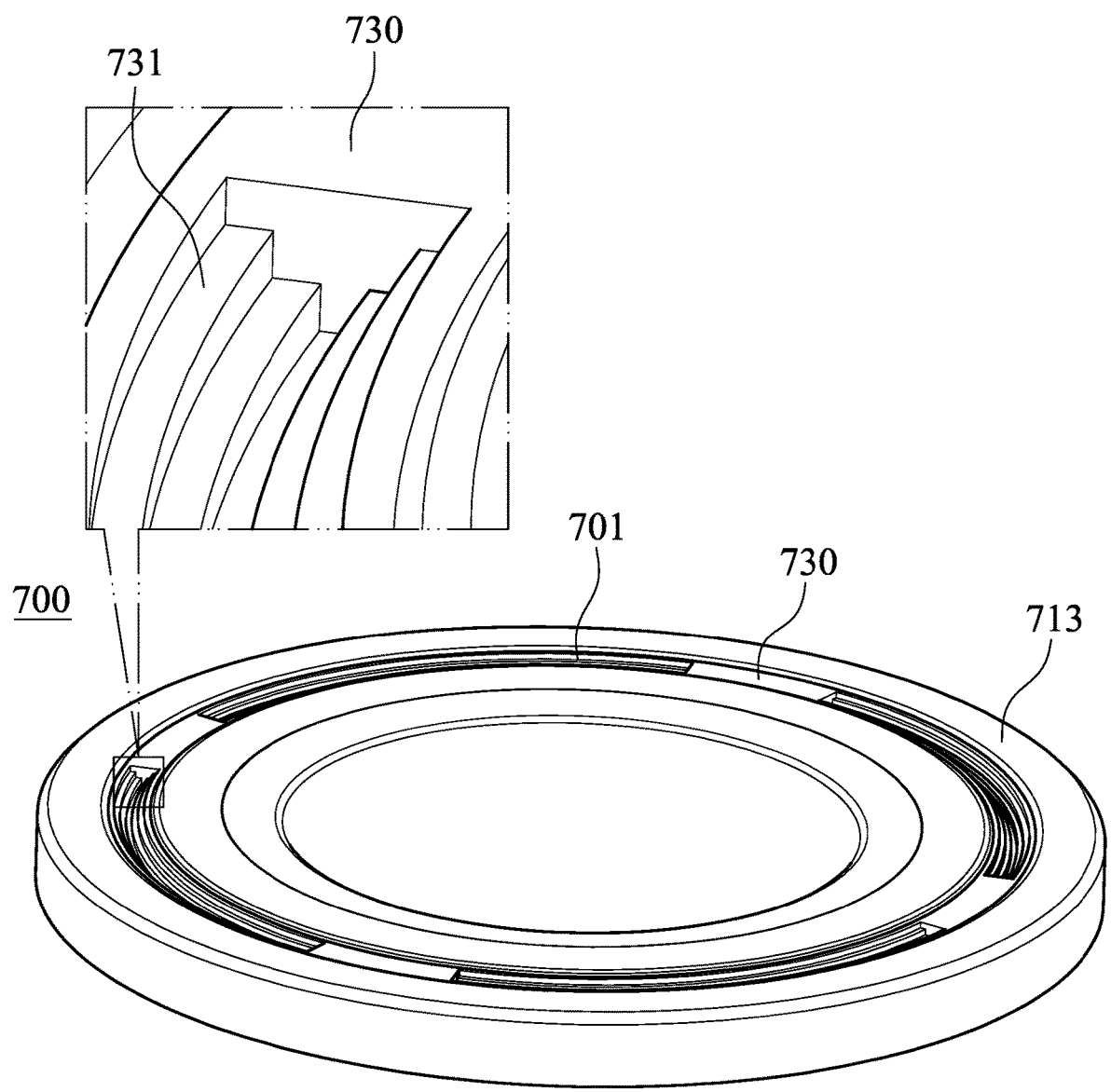
FIG. 7B is a three-dimensional view of a plastic lens element according to FIG. 7A.
Figure 7C:
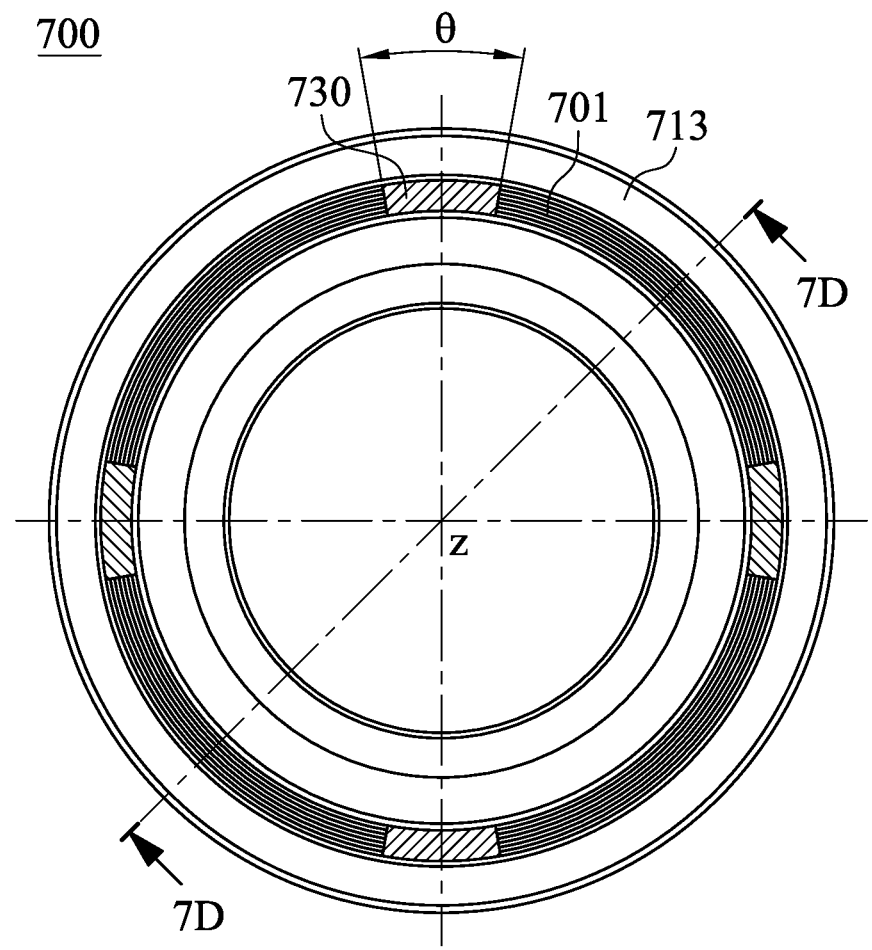
FIG. 7C is a plane view of the plastic lens element according to FIG. 7B.
Figure 7D:
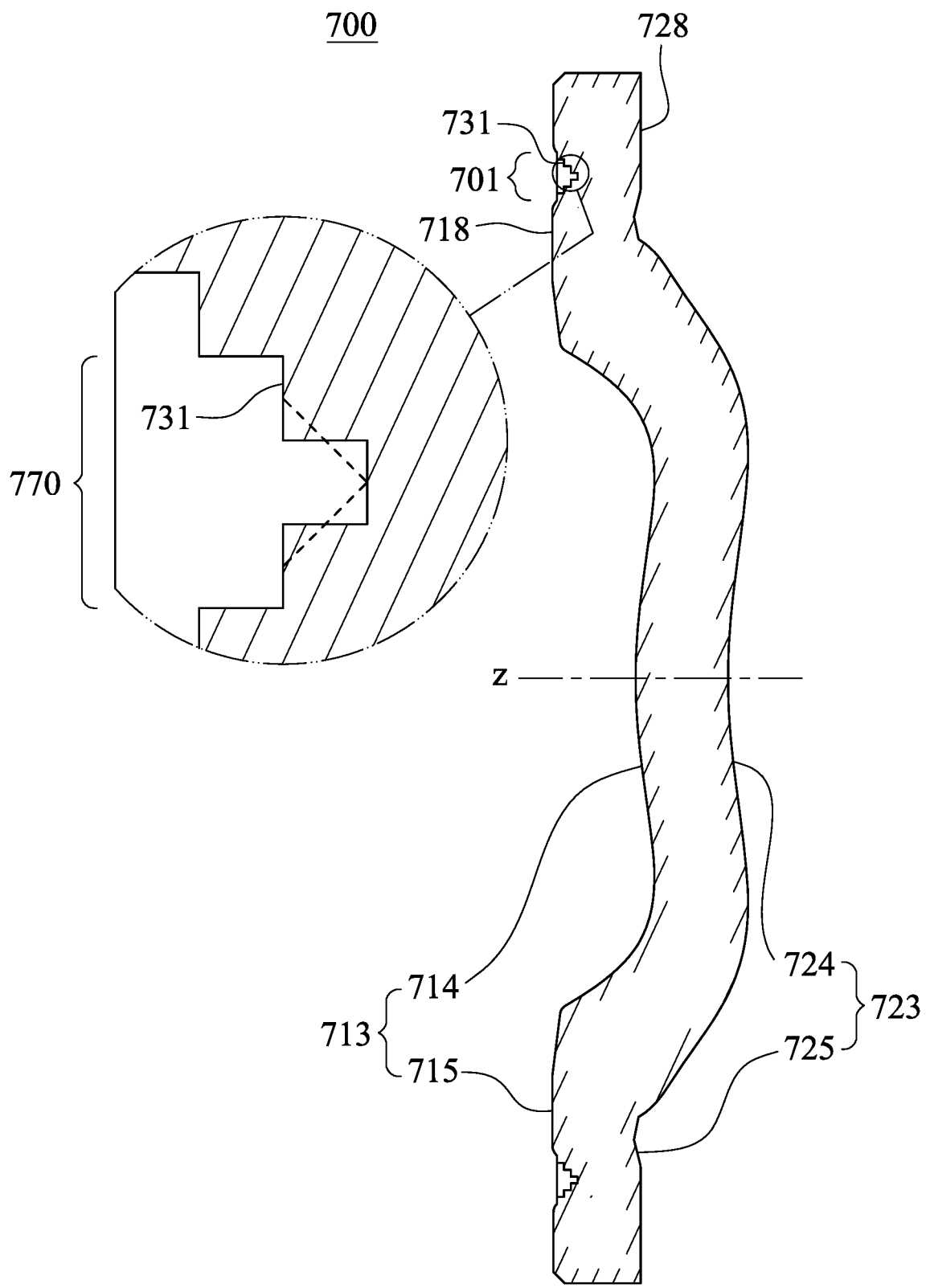
FIG. 7D is a cross-sectional view along line 7D-7D of FIG. 7C.

FIG. 7B is a three-dimensional view of the plastic lens element 700 according to FIG. 7A, FIG. 7C is a plane view of the plastic lens element 700 according to FIG. 7B, and FIG. 7D is a cross-sectional view along line 7D-7D of FIG. 7C. In FIG. 7B to FIG. 7D, the plastic lens element 700 having a central axis z (i.e. an optical axis of the imaging lens set) includes an object-side surface 713 and an image-side surface 723, wherein the image-side surface 723 is located opposite to the object-side surface 713. The object-side surface 713 includes an effective optical section 714 and a lens peripheral section 715 in order from the central axis z to an edge of the plastic lens element 700. The effective optical section 714 is for being passed through by an imaging light and aspheric. The lens peripheral section 715 surrounds the effective optical section 714. The image-side surface 723 includes an effective optical section 724 and a lens peripheral section 725 in order from the central axis z to the edge of the plastic lens element 700. The effective optical section 724 is for being passed through by the imaging light and aspheric. The lens peripheral section 725 surrounds the effective optical section 724.

In FIG. 7B and FIG. 7C, the lens peripheral section 715 of the object-side surface 713 includes an annular groove structure 701, wherein the annular groove structure 701 includes a plurality of stepped surfaces 731.

Specifically, the annular groove structure 701 includes four arc-shaped grooves (its reference numeral is omitted). That is, a groove spacing 730 is between each two of the arc-shaped grooves adjacent to each other, and thereby a number of the groove spacing 730 is four in the 7th embodiment. The annular groove structure 701 as a whole, which includes the four arc-shaped grooves, still has an appearance of an annular groove. In the 7th embodiment, an arc angle with respect to the central axis z of every of the four arc-shaped grooves is the same value. An arc angle with respect to the central axis z of each of the four groove spacings 730 is θ, wherein every one of the four groove spacings 730 has the same value of the arc angle θ.

In FIG. 7A, the annular groove structure 701 is not in contact with the optical elements except the plastic lens element 700 itself of the imaging lens set (i.e. not in contact with the light blocking sheets 703 and the spacer 707).

In FIG. 7D, the plastic lens element 700 with the annular groove structures 701 is formed integrally and made by an injection molding method. For easily understanding and interpreting the characteristics of the 7th embodiment according to the present disclosure, the stepped surfaces 731 indicate surfaces having normal directions parallel to the central axis z of the annular groove structure 701, wherein a surface (its reference numeral is omitted) between two of the stepped surfaces 731 adjacent to each other may have a normal direction vertical to the central axis z. It can be said that the stepped surfaces 731 are extended from the central axis z to the edge of the plastic lens element 700.

Figure 7E:
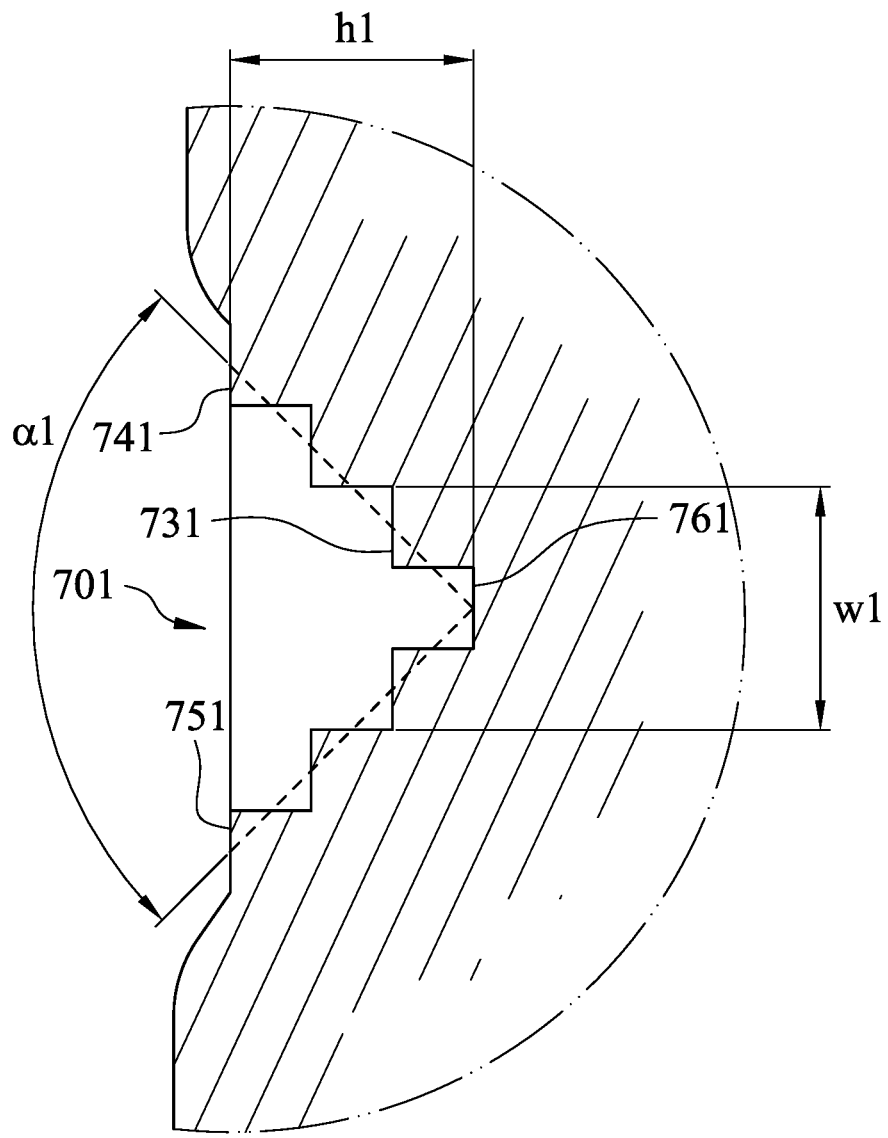
FIG. 7E is a schematic view of an annular groove structure according to FIG. 7D.

FIG. 7E is a schematic view of the annular groove structure 701 according to FIG. 7D. In FIG. 7E, a range of the annular groove structure 701 is defined by two groove ends 741 and 751, which are respectively two of the stepped surfaces 731 located on two ends of the annular groove structure 701. Each of the groove ends 741 and 751 is closer to the object side than another one of the stepped surfaces 731 which is adjacent thereto. That is, the groove end 741 is the one of the stepped surfaces 731 farthest from the central axis z of the annular groove structure 701, the groove end 751 is the one of the stepped surfaces 731 closest to the central axis z of the annular groove structure 701, and one of the stepped surfaces 731 closest to the image side is a groove bottom 761. According to the above, a number of the annular groove structure 701 is only one.

In FIG. 7E, a greatest depth parallel to the central axis z of the annular groove structure 701 is h1, and a length in a radial direction of the central axis z of successive three of the stepped surfaces 731 of the annular groove structure 701 is w1. In the 7th embodiment, the groove ends 741 and 751 are the same close to the object side, and the parameter h1 is taken as a distance parallel to the central axis z between the groove end 741 (or the groove end 751) and the groove bottom 761. The parameter w1 shown in FIG. 7E indicates the length in the radial direction of the central axis z of successive three of the stepped surfaces 731, for example, which are counted from one of the stepped surfaces 731 labeled in FIG. 7E through another two of the stepped surfaces 731 successively following thereof towards the central axis z. The parameter w1 of every successive three of the stepped surfaces 731 in the 7th embodiment is the same value. Moreover, every one of the stepped surfaces 731 has the same length in the radial direction.

In FIG. 7E, the one of the stepped surfaces 731 farthest from the central axis z and the one of the stepped surfaces 731 closest to the central axis z are respectively the two groove ends 741 and 751, and an angle defined by the two groove ends 741 and 751 of the annular groove structure 701 is α1. More specifically, in the 7th embodiment, the angle α1 is between a line connecting a middle point of the groove end 741 with a middle point of the groove bottom 761, and a line connecting a middle point of the groove end 751 with a middle point of the groove bottom 761 in FIG. 7E.

Figure 7F:
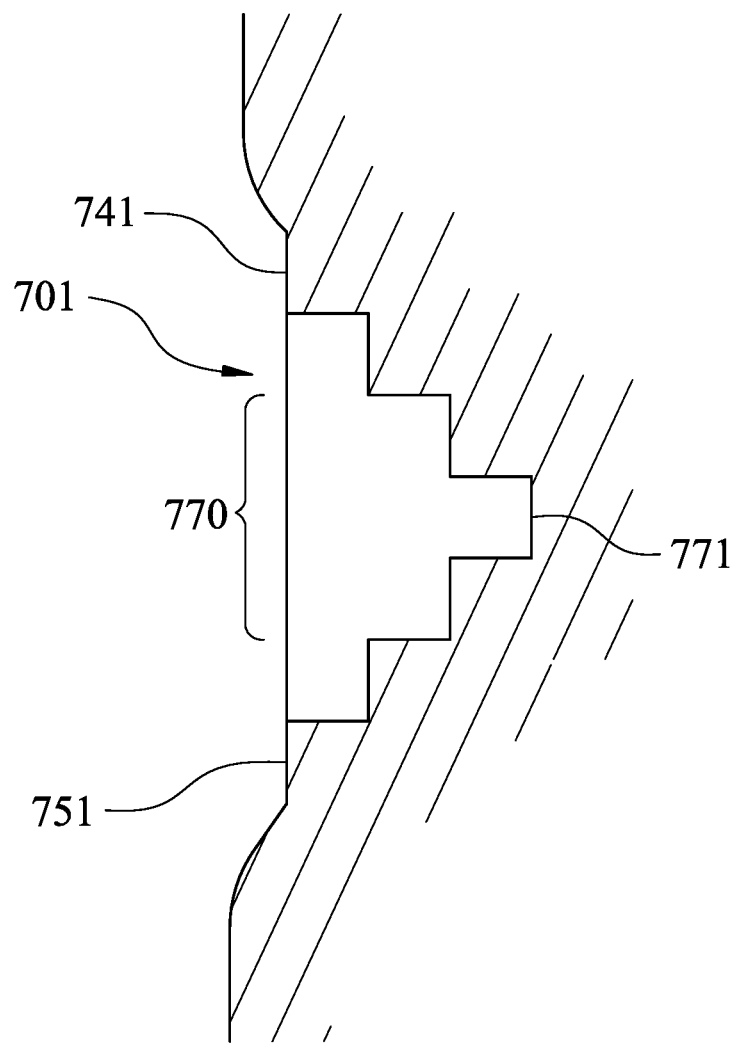
FIG. 7F is another schematic view of the annular groove structure according to FIG. 7D.

FIG. 7F is another schematic view of the annular groove structure 701 according to FIG. 7D. In FIG. 7F, a sub-groove 770 is formed by successive three of the stepped surfaces 731 of the annular groove structure 701 of the object-side surface 713, wherein the middle one of the successive three of the stepped surfaces 731 is closer to the image side than the other two locating on ends of the successive three of the stepped surfaces 731. The middle one of the sub-groove 770 labeled in FIG. 7F is a sub-groove bottom 771. There is only one sub-groove 770 corresponding to the sub-groove bottom 771 in order from the edge of the plastic lens element 700 to the central axis z.

In FIG. 7A, the lens peripheral section 715 of the object-side surface 713 includes a receiving surface 718, which is a flat surface, and a normal direction of the receiving surface 718 is parallel to the central axis z. The lens peripheral section 725 of the image-side surface 723 includes a receiving surface 728, which is a flat surface, and a normal direction of the receiving surface 728 is parallel to the central axis z. Specifically, the receiving surface 718 of the plastic lens element 700 is received with a receiving surface 738 of the light blocking sheet 703, and the receiving surface 728 of the plastic lens element 700 is received with a receiving surface 778 of the spacer 707.

The data of the parameters of the imaging lens set and the plastic lens element 700 thereof according to the 7th embodiment of the present disclosure are listed in the following Table 7, wherein the parameters are also shown as FIG. 7C and FIG. 7E. The definitions of these parameters shown in Table 7 are the same as those stated in the imaging lens set of the 1st embodiment with corresponding values for the imaging lens set in the 7th embodiment.

TABLE 7

| 7th Embodiment | | | |
|---|---|---|---|
| θ (deg.) | 20 | Ns2 | 0 |
| h1 (mm) | 0.09 | Ns | 1 |
| w1 (mm) | 0.09 | N1 | 7 |
| h1/w1 | 1.00 | N2 | 0 |
| α1 (deg.) | 90.1 | N | 7 |
| Ns1 | 1 | | |

8th Embodiment

Figure 8:
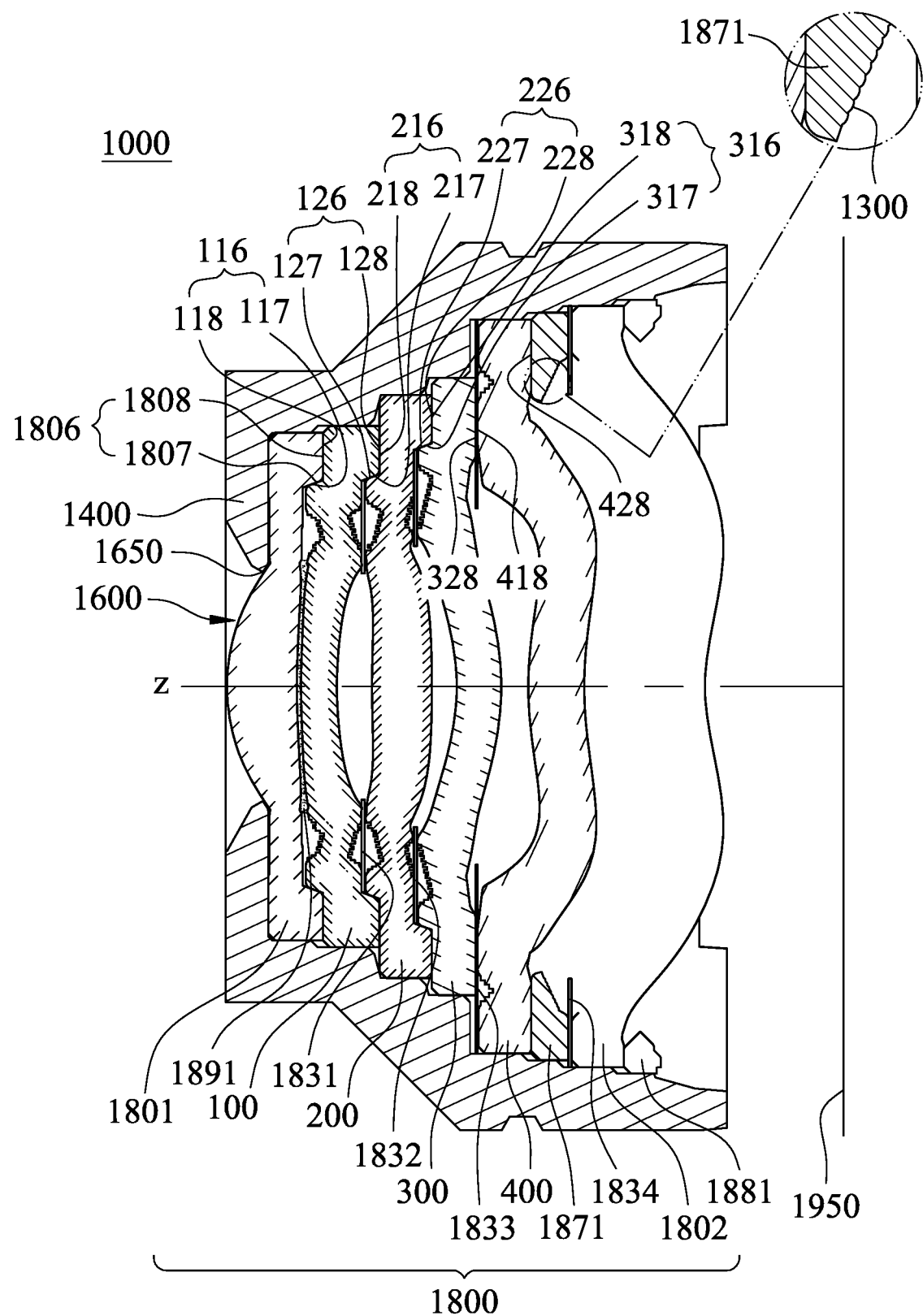
FIG. 8 is a schematic view of an imaging lens module according to the 8th embodiment of the present disclosure.

FIG. 8 is a schematic view of an imaging lens module 1000 according to the 8th embodiment of the present disclosure (some details about optical elements are omitted). In FIG. 8, the imaging lens module 1000 includes an imaging lens set 1800 and a plastic barrel 1400. The imaging lens set 1800 includes a plurality of optical elements, wherein at least one of the optical elements is a lens element, and at least one of the lens element is the plastic lens element 100 of the 1st embodiment according to the present disclosure. The other details of the plastic lens element 100 have been described in the foregoing paragraphs of the 1st embodiment and will not be described again herein.

The imaging lens set 1800 is disposed along an optical axis of the imaging lens module 1000 (i.e. the central axis z of the plastic lens element 100) in the plastic barrel 1400. The plastic barrel 1400 includes a barrel hole 1600, wherein the barrel hole 1600 has a smallest diameter position 1650. Therefore, it is favorable for suppressing the stray light and thereby enhancing the image quality of the imaging lens module 1000.

Specifically, the imaging lens module 1000 includes the imaging lens set 1800 and an image surface 1950 in order from an object side to an image side. The imaging lens set 1800 includes a lens element 1801, the plastic lens element 100, the plastic lens element 200 of the 2nd embodiment, the plastic lens element 300 of the 3rd embodiment, the plastic lens element 400 of the 4th embodiment and a lens element 1802 in order from the object side to the image side, wherein the imaging lens set 1800 has a total of six lens elements (1801, 100, 200, 300, 400 and 1802), which are disposed along the optical axis of the imaging lens module 1000 in the plastic barrel 1400. Therefore, it is favorable for further suppressing the stray light and thereby enhancing the image quality of the imaging lens module 1000. From FIG. 8 and details about the plastic lens element 100 in FIG. 1B, the effective optical section 114 of the plastic lens element 100 and an effective optical section (its reference numeral is omitted) of the lens element 1801, which is adjacent to the plastic lens element 100, are cemented by a cementing glue 1891. The other details of the plastic lens elements 200, 300 and 400 have been respectively described in the foregoing paragraphs of the 2nd, 3rd and 4th embodiments, and will not be described again herein.

The smallest diameter position 1650 of the barrel hole 1600 may act as an aperture stop of the imaging lens module 1000. Therefore, it is favorable for reducing the mechanism complexities of the imaging lens module 1000.

Furthermore, in FIG. 8, the imaging lens set 1800 may further include additional optical elements, such as light blocking sheets 1831, 1832, 1833, 1834, a spacer 1871 and a retainer 1881. From FIG. 8 and details in FIG. 1B, FIG. 2B, FIG. 3B and FIG. 4B, the annular groove structures 101, 102, 201, 202, 301 and 401 are not in contact with the optical elements of the imaging lens set 1800, except the plastic lens element on which the annular groove structure itself is located.

In FIG. 8, the lens element 1801 and the plastic lens element 100 respectively include axial connecting structures 1806 and 116 for the lens element 1801 and the plastic lens element 100 to be assembled with each other and aligned with the central axis z. The axial connecting structure 1806 of the lens element 1801 includes a receiving surface 1808 and a conical surface 1807, and the axial connecting structure 116 of the plastic lens element 100 includes the receiving surface 118 and the conical surface 117. Specifically, the receiving surfaces 1808 and 118 are corresponding and connected to each other, and the conical surfaces 1807 and 117 are corresponding and connected to each other, so that the axial connecting structures 1806 and 116 could be for the lens element 1801 and the plastic lens element 100 to be assembled with each other and aligned with the central axis z.

The plastic lens elements 100 and 200 respectively include the axial connecting structures 126 and 216 for the plastic lens elements 100 and 200 to be assembled with each other and aligned with the central axis z. The axial connecting structure 126 of the plastic lens element 100 includes the receiving surface 128 and the conical surface 127, and the axial connecting structure 216 of the plastic lens element 200 includes the receiving surface 218 and the conical surface 217. Specifically, the receiving surfaces 128 and 218 are corresponding and connected to each other, and the conical surfaces 127 and 217 are corresponding and connected to each other, so that the axial connecting structures 126 and 216 could be for the plastic lens elements 100 and 200 to be assembled with each other and aligned with the central axis z.

The plastic lens elements 200 and 300 respectively include the axial connecting structures 226 and 316 for the plastic lens elements 200 and 300 to be assembled with each other and aligned with the central axis z. The axial connecting structure 226 of the plastic lens element 200 includes the receiving surface 228 and the conical surface 227, and the axial connecting structure 316 of the plastic lens element 300 includes the receiving surface 318 and the conical surface 317. Specifically, the receiving surfaces 228 and 318 are corresponding and connected to each other, and the conical surfaces 227 and 317 are corresponding and connected to each other, so that the axial connecting structures 226 and 316 could be for the plastic lens elements 200 and 300 to be assembled with each other and aligned with the central axis z.

Moreover, the receiving surface 328 of the plastic lens element 300 is received with a receiving surface (its reference numeral is omitted) of the light blocking sheet 1833. Another receiving surface (its reference numeral is omitted) of the light blocking sheet 1833 is received with the receiving surface 418 of the plastic lens element 400. The receiving surface 428 of the plastic lens element 400 is received with a receiving surface (its reference numeral is omitted) of the spacer 1871.

In addition, the spacer 1871 includes a microstructure 1300, which may include a plurality of annular protrusion structures being continued one by one thereof and coaxial with respect to the central axis z, wherein each of the annular protrusion structures may have an arc annular surface. Therefore, it is favorable for effectively reducing the stray light.

9th Embodiment

Figure 9:
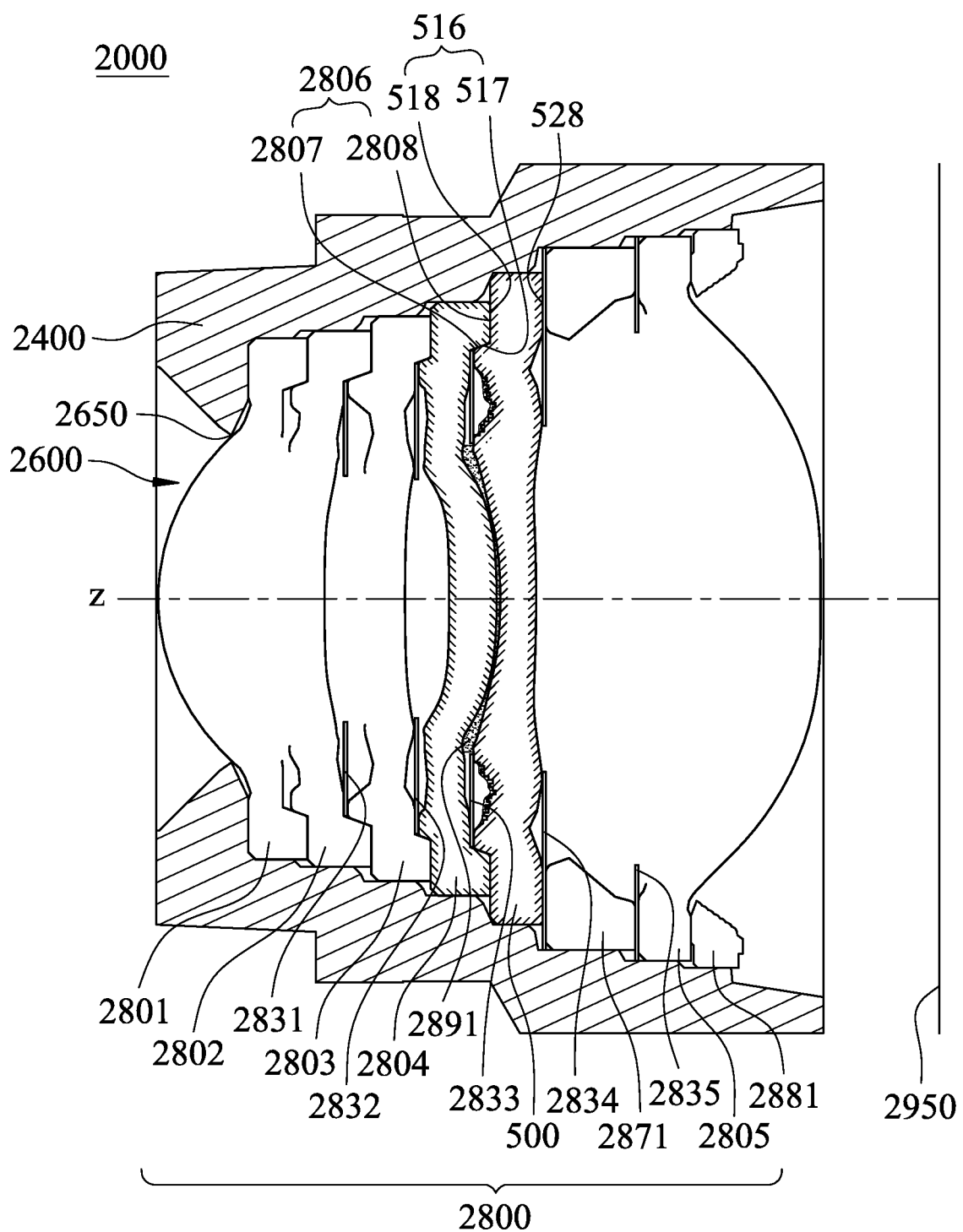
FIG. 9 is a schematic view of an imaging lens module according to the 9th embodiment of the present disclosure.
Figure 10:
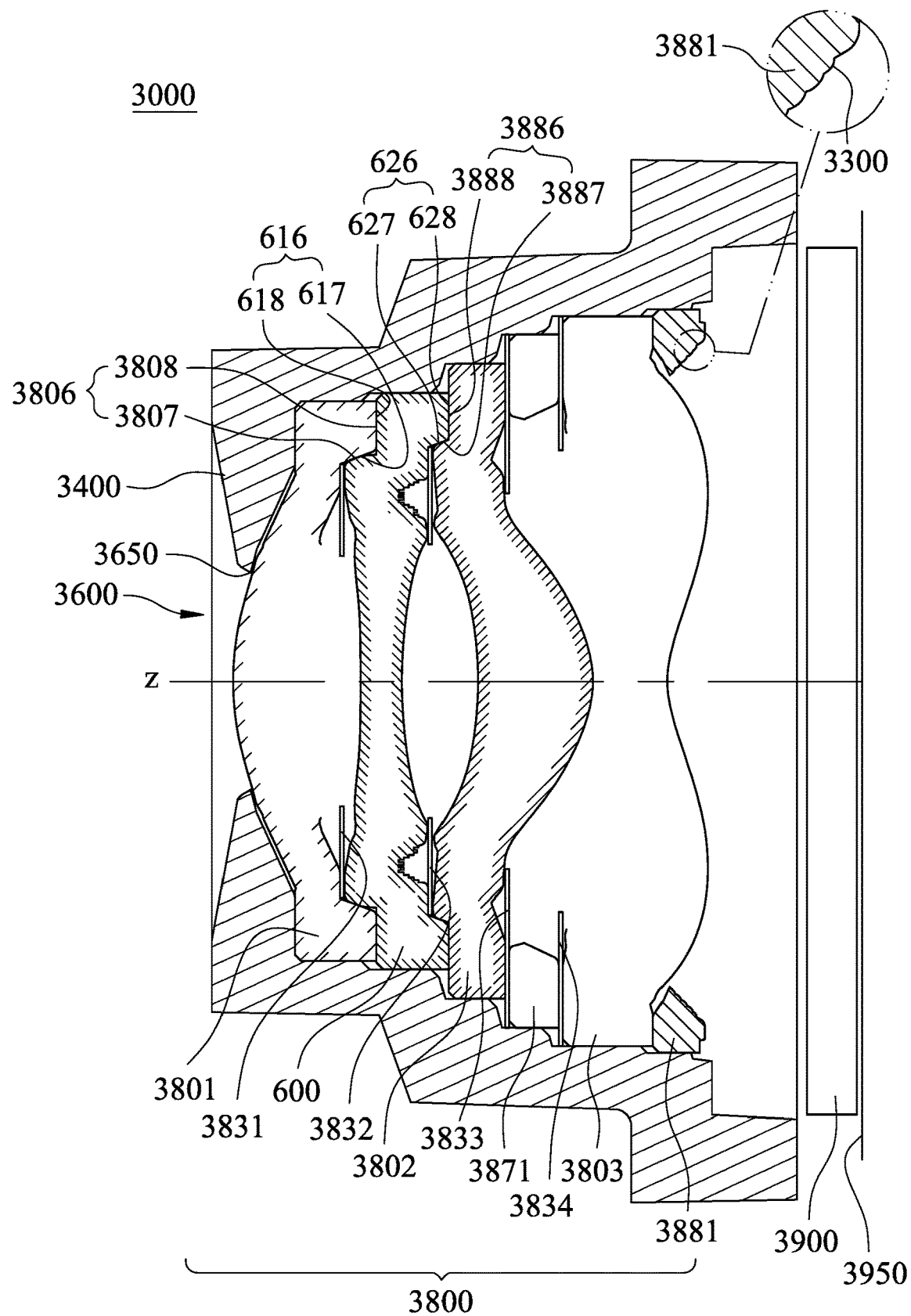
FIG. 10 is a schematic view of an imaging lens module according to the 10th embodiment of the present disclosure.

FIG. 9 is a schematic view of an imaging lens module 2000 according to the 9th embodiment of the present disclosure (some details about optical elements are omitted). In FIG. 9, the imaging lens module 2000 includes an imaging lens set 2800 and a plastic barrel 2400. The imaging lens set 2800 includes a plurality of optical elements.

Specifically, the imaging lens module 2000 includes the imaging lens set 2800 and an image surface 2950 in order from an object side to an image side. The imaging lens set 2800 includes lens elements 2801, 2802, 2803, 2804, the plastic lens element 500 of the 5th embodiment and a lens element 2805 in order from the object side to the image side, wherein the imaging lens set 2800 has a total of six lens elements (2801, 2802, 2803, 2804, 500 and 2805), which are disposed along an optical axis of the imaging lens module 2000 (i.e. the central axis z of the plastic lens element 500) in the plastic barrel 2400. The plastic barrel 2400 includes a barrel hole 2600, wherein the barrel hole 2600 has a smallest diameter position 2650. From FIG. 9 and details about the plastic lens element 500 in FIG. 5B, the effective optical section 514 of the plastic lens element 500 and an effective optical section (its reference numeral is omitted) of the lens element 2804, which is adjacent to the plastic lens element 500, are cemented by a cementing glue 2891. The other details of the plastic lens element 500 have been described in the foregoing paragraphs of the 5th embodiment and will not be described again herein.

In FIG. 9, the imaging lens set 2800 further includes additional optical elements, such as light blocking sheets 2831, 2832, 2833, 2834, 2835, a spacer 2871 and a retainer 2881. From FIG. 9 and details in FIG. 5B, the annular groove structure 501 is not in contact with the optical elements of the imaging lens set 2800, except the plastic lens element 500 itself.

In FIG. 9, the lens element 2804 and the plastic lens element 500 respectively include axial connecting structures 2806 and 516 for the lens element 2804 and the plastic lens element 500 to be assembled with each other and aligned with the central axis z. The axial connecting structure 2806 of the lens element 2804 includes a receiving surface 2808 and a conical surface 2807, and the axial connecting structure 516 of the plastic lens element 500 includes the receiving surface 518 and the conical surface 517. Specifically, the receiving surfaces 2808 and 518 are corresponding and connected to each other, and the conical surfaces 2807 and 517 are corresponding and connected to each other, so that the axial connecting structures 2806 and 516 could be for the lens element 2804 and the plastic lens element 500 to be assembled with each other and aligned with the central axis z. Moreover, the receiving surface 528 of the plastic lens element 500 is received with a receiving surface (its reference numeral is omitted) of the light blocking sheet 2834.

10th Embodiment

FIG. 1C is a schematic view of an imaging lens module 3000 according to the 10th embodiment of the present disclosure (some details about optical elements are omitted). In FIG. 1C, the imaging lens module 3000 includes an imaging lens set 3800 and a plastic barrel 3400. The imaging lens set 3800 includes a plurality of optical elements.

Specifically, the imaging lens module 3000 includes the imaging lens set 3800, a glass panel 3900 and an image surface 3950 in order from an object side to an image side. The imaging lens set 3800 includes a lens element 3801, the plastic lens element 600 of the 6th embodiment, lens elements 3802 and 3803 in order from the object side to the image side, wherein the imaging lens set 3800 has a total of four lens elements (3801, 600, 3802 and 3803), which are disposed along an optical axis of the imaging lens module 3000 (i.e. the central axis z of the plastic lens element 600) in the plastic barrel 3400. The glass panel 3900 can be a cover glass, a filter or both above, and will not affect the focal length of the imaging lens set 3800. The plastic barrel 3400 includes a barrel hole 3600, wherein the barrel hole 3600 has a smallest diameter position 3650. The other details of the plastic lens element 600 have been described in the foregoing paragraphs of the 6th embodiment and will not be described again herein.

The smallest diameter position 3650 of the barrel hole 3600 acts as an aperture stop of the imaging lens module 3000. Furthermore, in FIG. 1C, the imaging lens set 3800 further includes additional optical elements, such as light blocking sheets 3831, 3832, 3833, 3834, a spacer 3871 and a retainer 3881. From FIG. 1C and details in FIG. 6B, the annular groove structure 602 is not in contact with the optical elements of the imaging lens set 3800, except the plastic lens element 600 itself.

In FIG. 1C, the lens element 3801 and the plastic lens element 600 respectively include axial connecting structures 3806 and 616 for the lens element 3801 and the plastic lens element 600 to be assembled with each other and aligned with the central axis z. The axial connecting structure 3806 of the lens element 3801 includes a receiving surface 3808 and a conical surface 3807, and the axial connecting structure 616 of the plastic lens element 600 includes the receiving surface 618 and the conical surface 617. Specifically, the receiving surfaces 3808 and 618 are corresponding and connected to each other, and the conical surfaces 3807 and 617 are corresponding and connected to each other, so that the axial connecting structures 3806 and 616 could be for the lens element 3801 and the plastic lens element 600 to be assembled with each other and aligned with the central axis z.

The plastic lens element 600 and the lens element 3802 respectively include axial connecting structures 626 and 3886 for the plastic lens element 600 and the lens element 3802 to be assembled with each other and aligned with the central axis z. The axial connecting structure 626 of the plastic lens element 600 includes the receiving surface 628 and the conical surface 627, and the axial connecting structure 3886 of the lens element 3802 includes a receiving surface 3888 and a conical surface 3887. Specifically, the receiving surfaces 628 and 3888 are corresponding and connected to each other, and the conical surfaces 627 and 3887 are corresponding and connected to each other, so that the axial connecting structures 626 and 3886 could be for the plastic lens element 600 and the lens element 3802 to be assembled with each other and aligned with the central axis z.

In addition, the retainer 3881 includes a microstructure 3300, which may include a plurality of annular protrusion structures being continued one by one thereof and coaxial with respect to the central axis z, wherein each of the annular protrusion structures may have an arc annular surface. Therefore, it is favorable for effectively reducing the stray light.

11th Embodiment

Figure 11:
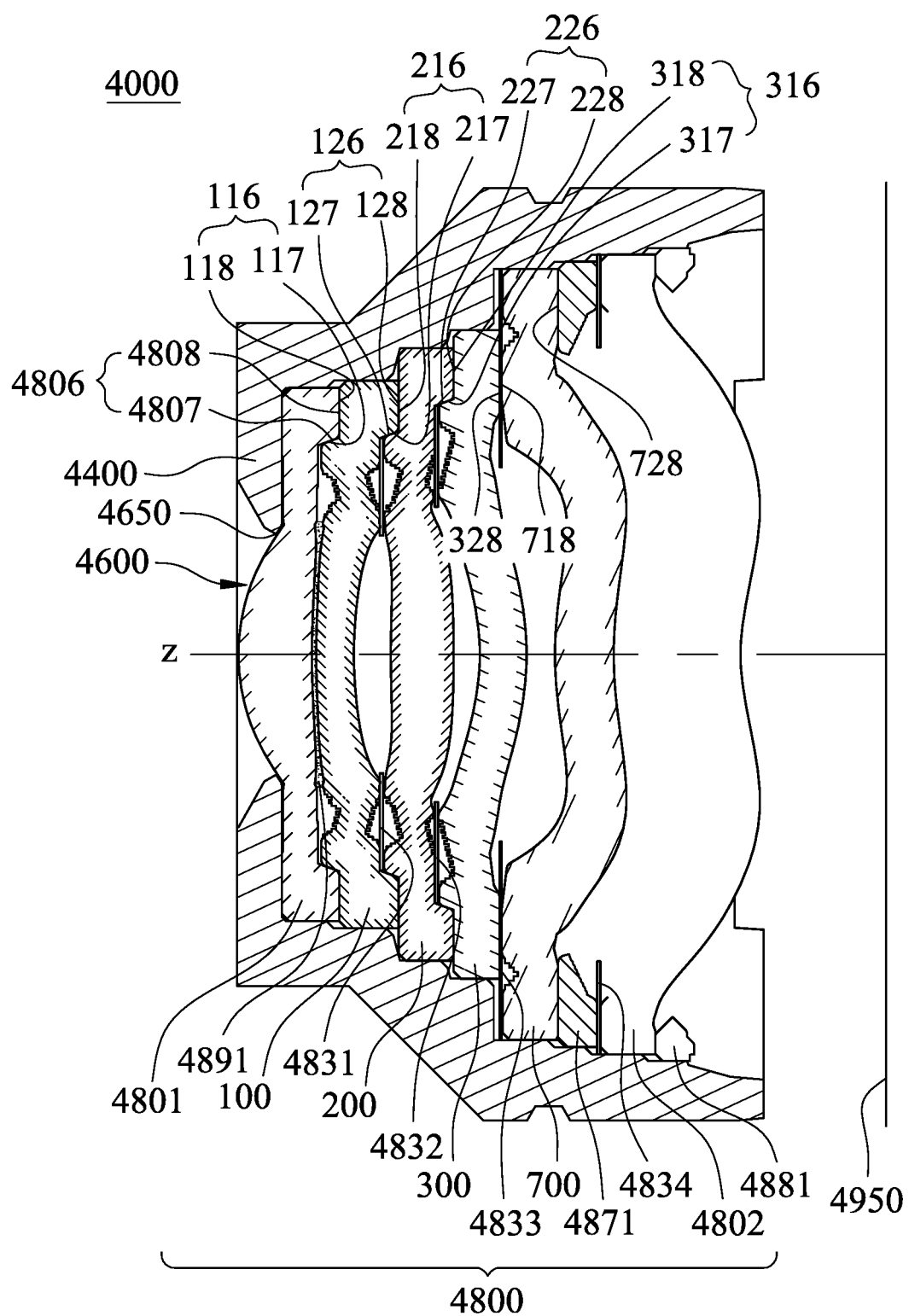
FIG. 11 is a schematic view of an imaging lens module according to the 11th embodiment of the present disclosure.

FIG. 11 is a schematic view of an imaging lens module 4000 according to the 11th embodiment of the present disclosure (some details about optical elements are omitted). In FIG. 11, the imaging lens module 4000 includes an imaging lens set 4800 and a plastic barrel 4400. The imaging lens set 4800 includes a plurality of optical elements.

Specifically, the imaging lens module 4000 includes the imaging lens set 4800 and an image surface 4950 in order from an object side to an image side. The imaging lens set 4800 includes a lens element 4801, the plastic lens element 100 of the 1st embodiment, the plastic lens element 200 of the 2nd embodiment, the plastic lens element 300 of the 3rd embodiment, the plastic lens element 700 of the 7th embodiment and a lens element 4802 in order from the object side to the image side, wherein the imaging lens set 4800 has a total of six lens elements (4801, 100, 200, 300, 700 and 4802), which are disposed along an optical axis of the imaging lens module 4000 (i.e. the central axis z) in the plastic barrel 4400. The plastic barrel 4400 includes a barrel hole 4600, wherein the barrel hole 4600 has a smallest diameter position 4650. From FIG. 11 and details about the plastic lens element 100 in FIG. 1B, the effective optical section 114 of the plastic lens element 100 and an effective optical section (its reference numeral is omitted) of the lens element 4801, which is adjacent to the plastic lens element 100, are cemented by a cementing glue 4891. The other details of the plastic lens elements 100, 200, 300 and 700 have been respectively described in the foregoing paragraphs of the 1st, 2nd, 3rd and 7th embodiments, and will not be described again herein.

The smallest diameter position 4650 of the barrel hole 4600 acts as an aperture stop of the imaging lens module 4000. Furthermore, in FIG. 11, the imaging lens set 4800 further includes additional optical elements, such as light blocking sheets 4831, 4832, 4833, 4834, a spacer 4871 and a retainer 4881. From FIG. 11 and details in FIG. 1B, FIG. 2B, FIG. 3B and FIG. 7D, the annular groove structures 101, 102, 201, 202, 301 and 701 are not in contact with the optical elements of the imaging lens set 4800, except the plastic lens element on which the annular groove structure itself is located.

In FIG. 11, the lens element 4801 and the plastic lens element 100 respectively include axial connecting structures 4806 and 116 for the lens element 4801 and the plastic lens element 100 to be assembled with each other and aligned with the central axis z. The axial connecting structure 4806 of the lens element 4801 includes a receiving surface 4808 and a conical surface 4807, and the axial connecting structure 116 of the plastic lens element 100 includes the receiving surface 118 and the conical surface 117. Specifically, the receiving surfaces 4808 and 118 are corresponding and connected to each other, and the conical surfaces 4807 and 117 are corresponding and connected to each other, so that the axial connecting structures 4806 and 116 could be for the lens element 4801 and the plastic lens element 100 to be assembled with each other and aligned with the central axis z.

The plastic lens elements 100 and 200 respectively include the axial connecting structures 126 and 216 for the plastic lens elements 100 and 200 to be assembled with each other and aligned with the central axis z. The axial connecting structure 126 of the plastic lens element 100 includes the receiving surface 128 and the conical surface 127, and the axial connecting structure 216 of the plastic lens element 200 includes the receiving surface 218 and the conical surface 217. Specifically, the receiving surfaces 128 and 218 are corresponding and connected to each other, and the conical surfaces 127 and 217 are corresponding and connected to each other, so that the axial connecting structures 126 and 216 could be for the plastic lens elements 100 and 200 to be assembled with each other and aligned with the central axis z.

The plastic lens elements 200 and 300 respectively include the axial connecting structures 226 and 316 for the plastic lens elements 200 and 300 to be assembled with each other and aligned with the central axis z. The axial connecting structure 226 of the plastic lens element 200 includes the receiving surface 228 and the conical surface 227, and the axial connecting structure 316 of the plastic lens element 300 includes the receiving surface 318 and the conical surface 317. Specifically, the receiving surfaces 228 and 318 are corresponding and connected to each other, and the conical surfaces 227 and 317 are corresponding and connected to each other, so that the axial connecting structures 226 and 316 could be for the plastic lens elements 200 and 300 to be assembled with each other and aligned with the central axis z.

Moreover, the receiving surface 328 of the plastic lens element 300 is received with a receiving surface (its reference numeral is omitted) of the light blocking sheet 4833. Another receiving surface (its reference numeral is omitted) of the light blocking sheet 4833 is received with the receiving surface 718 of the plastic lens element 700. The receiving surface 728 of the plastic lens element 700 is received with a receiving surface (its reference numeral is omitted) of the spacer 4871.

12th Embodiment

Figure 12A:
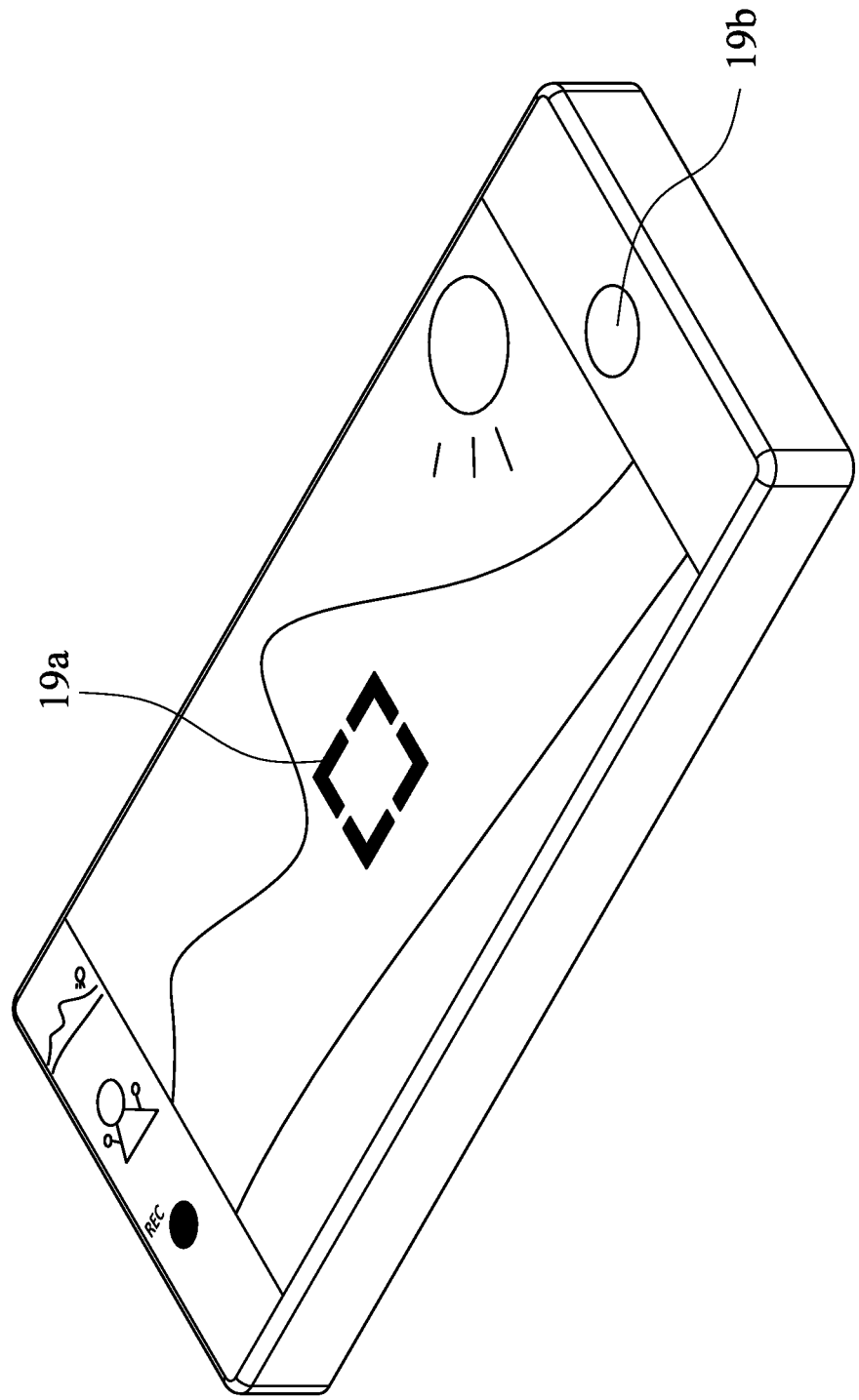
FIG. 12A shows a schematic view of an electronic device according to the 12th embodiment of the present disclosure.
Figure 12B:
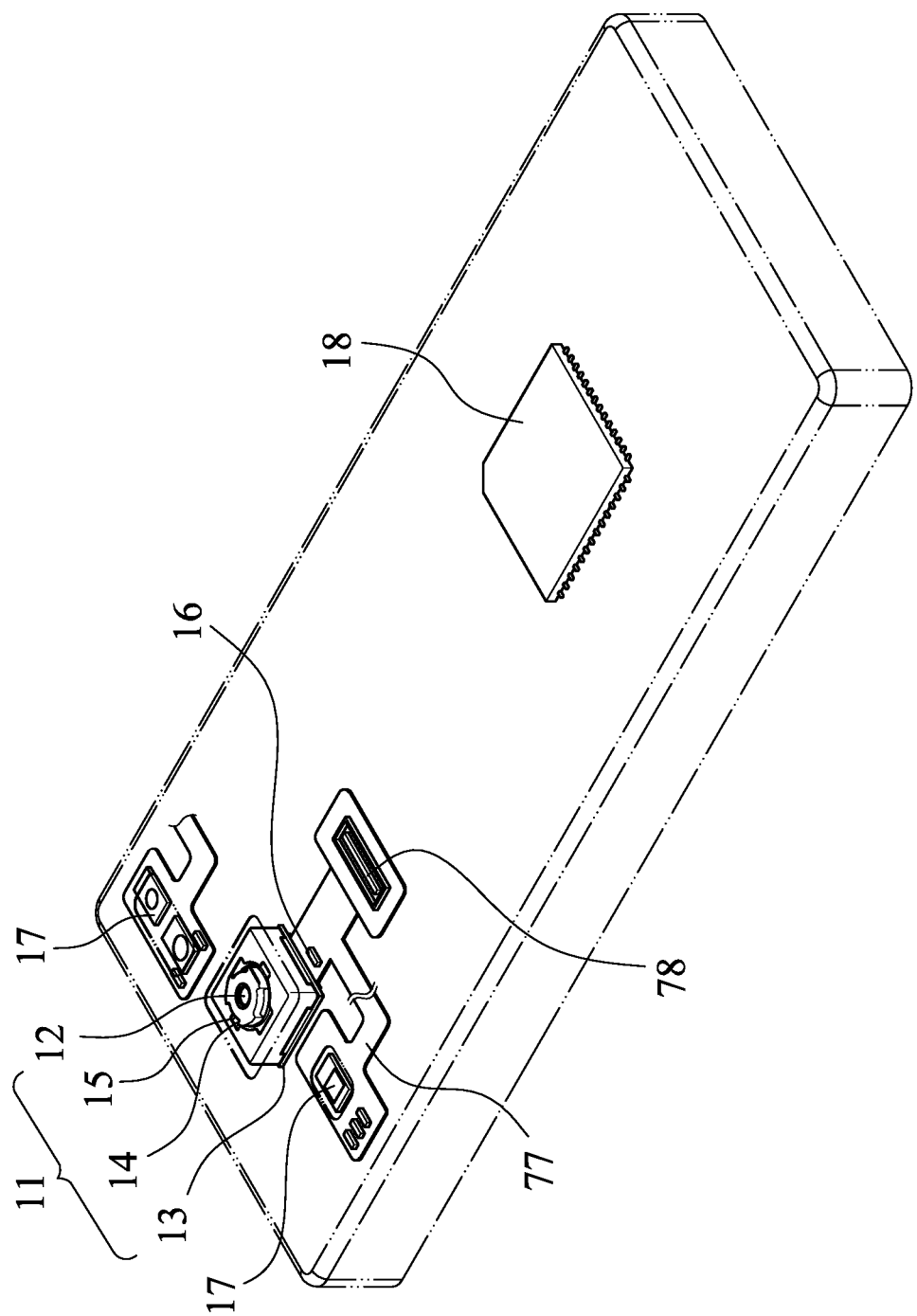
FIG. 12B shows another schematic view of the electronic device according to the 12th embodiment.

FIG. 12A shows a schematic view of an electronic device 10 according to the 12th embodiment of the present disclosure, FIG. 12B shows another schematic view of the electronic device 10 according to the 12th embodiment, and particularly, FIG. 12A and FIG. 12B are schematic views related to a camera of the electronic device 10. In FIG. 12A and FIG. 12B, the electronic device 10 of the 12th embodiment is a smart phone, wherein the electronic device 10 includes a camera module 11. The camera module 11 includes an imaging lens module 12 according to the present disclosure and an image sensor 13, wherein the image sensor 13 is disposed on an image surface (not shown in drawings) of the imaging lens module 12. Therefore, a better image quality can be achieved, and hence the high-end imaging requirements of modern electronic devices can be satisfied.

Furthermore, the user activates the capturing mode via a user interface 19 of the electronic device 10, wherein the user interface 19 of the 12th embodiment can be a touch screen 19a, a button 19b and etc. At this moment, the imaging light is converged on the image sensor 13 of the imaging lens module 12, and the electronic signal associated with image is output to an image signal processor (ISP) 18.

Figure 12C:
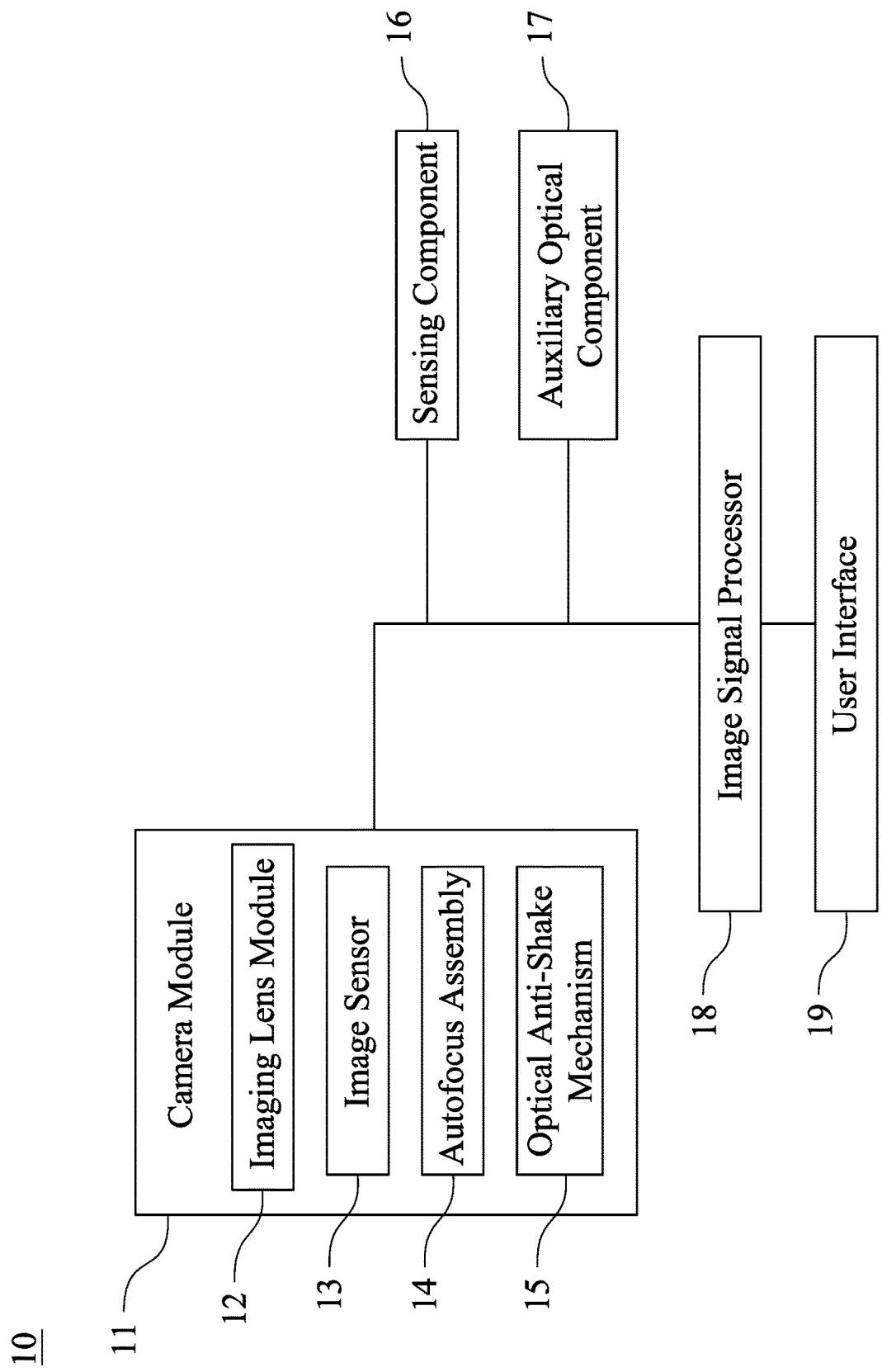
FIG. 12C shows a block diagram of the electronic device according to the 12th embodiment.

FIG. 12C shows a block diagram of the electronic device 10 according to the 12th embodiment, and in particular, the block diagram is related to the camera of the electronic device 10. In FIG. 12A to FIG. 12C, the camera module 11 can further include an autofocus assembly 14 and an optical anti-shake mechanism 15 based on the camera specification of the electronic device 10. Moreover, the electronic device 10 can further include at least one auxiliary optical component 17 and at least one sensing component 16. The auxiliary optical component 17 can be a flash module for compensating for the color temperature, an infrared distance measurement component, a laser focus module and etc. The sensing component 16 can have functions for sensing physical momentum and kinetic energy, and thereby can be an accelerator, a gyroscope, and a Hall effect element, to sense shaking or jitters applied by hands of the user or external environments. Accordingly, the functions of the autofocus assembly 14 and the optical anti-shake mechanism 15 of the camera module 11 can be aided and enhanced to achieve the superior image quality. Furthermore, the electronic device 10 according to the present disclosure can have a capturing function with multiple modes, such as taking optimized selfies, high dynamic range (HDR) under a low light condition, 4K resolution recording, etc. Additionally, the user can visually see the captured image of the camera through the touch screen 19a and manually operate the view finding range on the touch screen 19a to achieve the auto focus function of what you see is what you get.

Furthermore, in FIG. 12B, the camera module 11, the sensing component 16 and the auxiliary optical component 17 can be disposed on a flexible printed circuit board (FPC) 77 and electrically connected with the associated components, such as the imaging signal processor 18, via a connector 78 to perform a capturing process. Since the current electronic devices, such as smart phones, have a tendency of being compact, the way of firstly disposing the camera module and related components on the flexible printed circuit board and secondly integrating the circuit thereof into the main board of the electronic device via the connector can satisfy the requirements of the mechanical design and the circuit layout of the limited space inside the electronic device, and obtain more margins. The autofocus function of the camera module can also be controlled more flexibly via the touch screen of the electronic device. In the 12th embodiment, the electronic device 10 includes a plurality of sensing components 16 and a plurality of auxiliary optical components 17. The sensing components 16 and the auxiliary optical components 17 are disposed on the flexible printed circuit board 77 and at least one other flexible printed circuit board (its reference numeral is omitted) and electrically connected with the associated components, such as the image signal processor 18, via corresponding connectors to perform the capturing process. In other embodiments (not shown herein), the sensing components and the auxiliary optical components can also be disposed on the main board of the electronic device or carrier boards of other types according to requirements of the mechanical design and the circuit layout.

In addition, the electronic device 10 can further include but not be limited to a wireless communication unit, a control unit, a storage unit, a random access memory, a read-only memory, or a combination thereof.

13th Embodiment

Figure 13:
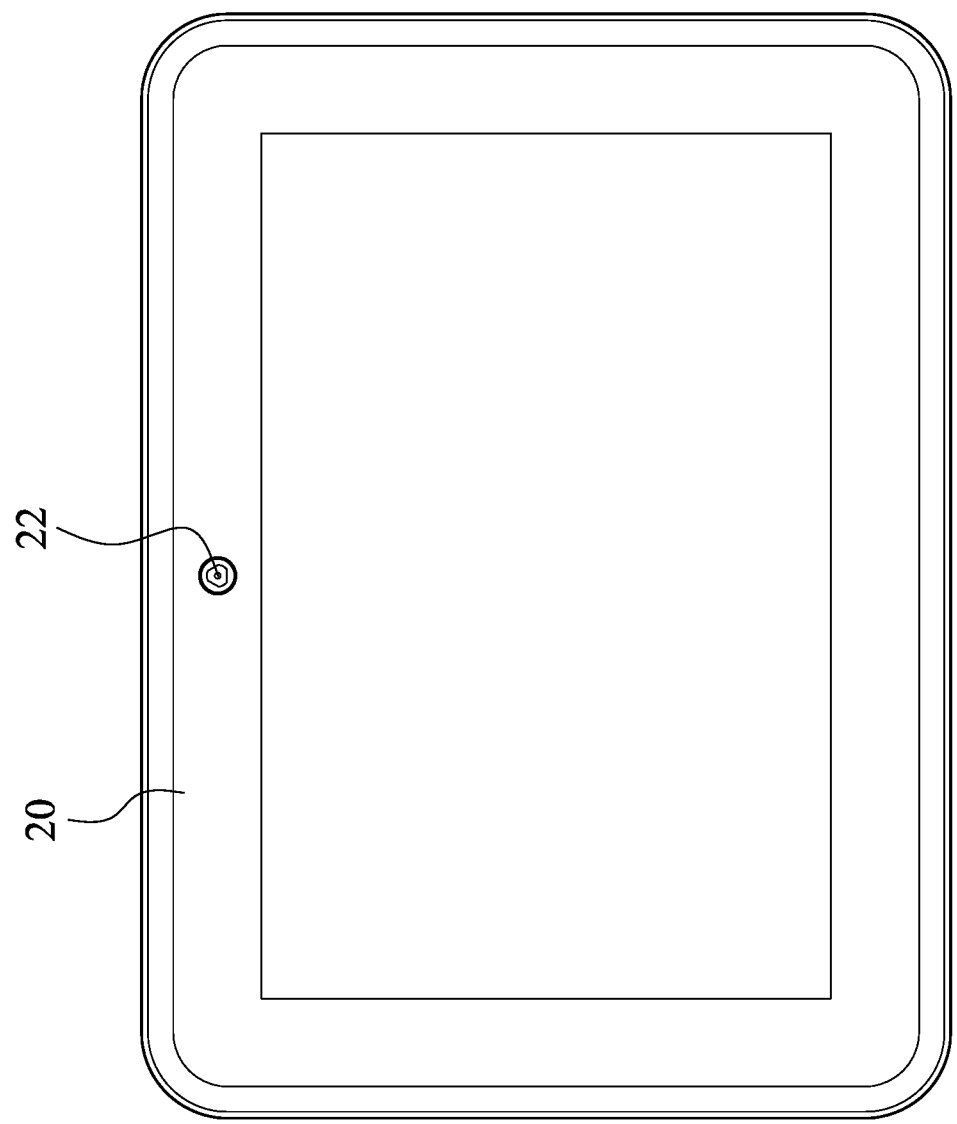
FIG. 13 shows an electronic device according to the 13th embodiment of the present disclosure.

FIG. 13 shows an electronic device 20 according to the 13th embodiment of the present disclosure. The electronic device 20 of the 13th embodiment is a tablet personal computer. The electronic device 20 includes an imaging lens module 22 according to the present disclosure and an image sensor (not shown in drawings), wherein the image sensor is disposed on an image surface (not shown in drawings) of the imaging lens module 22.

14th Embodiment

Figure 14:
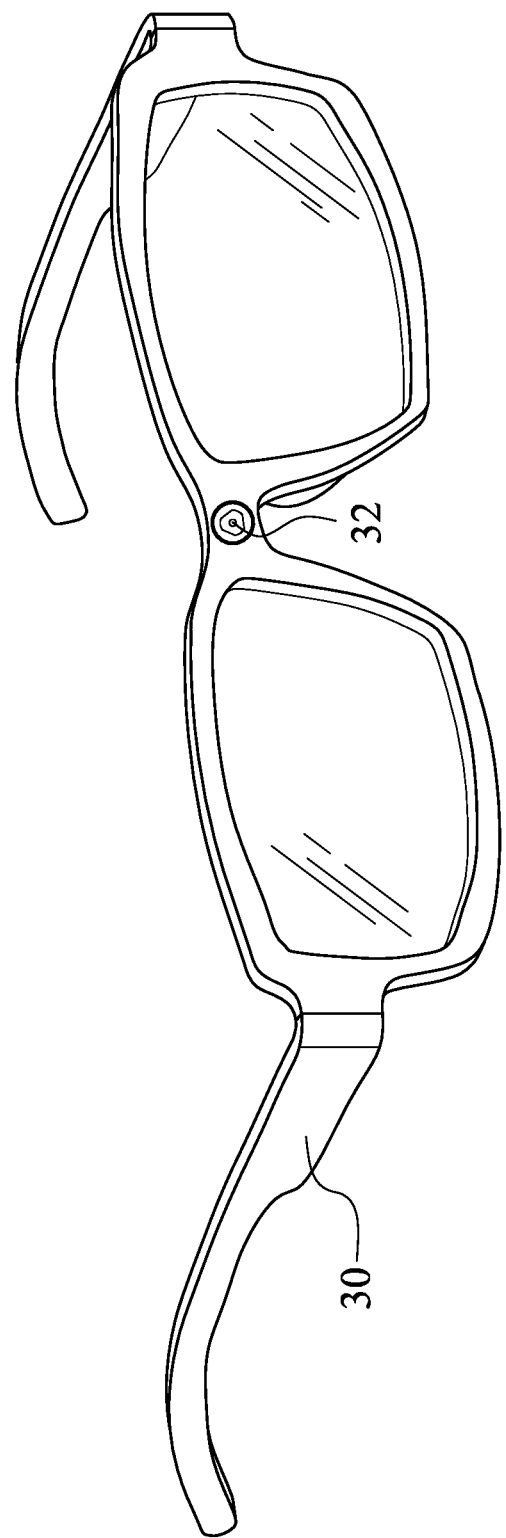
FIG. 14 shows an electronic device according to the 14th embodiment of the present disclosure.

FIG. 14 shows an electronic device 30 according to the 14th embodiment of the present disclosure. The electronic device 30 of the 14th embodiment is a wearable device. The electronic device 30 includes an imaging lens module 32 according to the present disclosure and an image sensor (not shown in drawings), wherein the image sensor is disposed on an image surface (not shown in drawings) of the imaging lens module 32.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An imaging lens set comprising a plurality of optical elements, wherein at least two of the optical elements are lens elements, one of the at least two lens elements is a plastic lens element, the plastic lens element having a central axis comprises an object-side surface and an image-side surface, the image-side surface is located opposite to the object-side surface, and in order from the central axis to an edge of the plastic lens element, each of the object-side surface and the image-side surface comprises:

an effective optical section for being passed through by an imaging light and being aspheric; and a lens peripheral section surrounding the effective optical section;

wherein at least one of the lens peripheral section of the object-side surface and the lens peripheral section of the image-side surface comprises at least one annular groove structure, and the annular groove structure comprises a plurality of stepped surfaces and is not in contact with any optical element other than the plastic lens element;

wherein the plastic lens element and another one of the lens elements which is adjacent to the plastic lens element are arranged along the central axis, each of the plastic lens element and the another one of the lens elements comprises an axial connecting structure for being assembled with each other and aligned with the central axis, each of the axial connecting structures comprises a receiving surface and a conical surface, and a normal direction of each of the receiving surfaces is parallel to the central axis.

2. The imaging lens set of claim 1, wherein the plastic lens element with the annular groove structure is formed integrally and made by an injection molding method.

3. The imaging lens set of claim 2, wherein each of the lens peripheral section of the object-side surface and the lens peripheral section of the image-side surface comprises the receiving surface, which is a flat surface, and the normal direction of each of the receiving surfaces is parallel to the central axis.

4. The imaging lens set of claim 2, wherein a number of the stepped surfaces of the annular groove structure is at least three, a greatest depth parallel to the central axis of the annular groove structure is h, a length in a radial direction of the central axis of successive three of the stepped surfaces of the annular groove structure is w, and the following condition is satisfied:

$$0.5 < h/w < 4.5.$$

5. The imaging lens set of claim 2, wherein a greatest depth parallel to the central axis of the annular groove structure is h, and the following condition is satisfied:

$$0.02 \text{ mm} < h < 0.21 \text{ mm}.$$

6. The imaging lens set of claim 2, wherein each of one of the stepped surfaces farthest from the central axis and one of the stepped surfaces closest to the central axis is a groove end, one of the stepped surfaces defines a greatest depth parallel to the central axis of the annular groove structure is a groove bottom, an angle defined by the two groove ends and the groove bottom of the annular groove structure is a, and the following condition is satisfied:

$$35 \text{ degrees} < \alpha < 150 \text{ degrees}.$$

7. The imaging lens set of claim 2, wherein a number of the annular groove structure of the lens peripheral section of the object-side surface is only one, and a number of the annular groove structure of the lens peripheral section of the image-side surface is only one.

8. The imaging lens set of claim 2, wherein a number of the stepped surfaces of the annular groove structure is at least three, a sub-groove is formed by successive three of the stepped surfaces of the annular groove structure, a sum of a number of sub-grooves of the object-side surface and a number of sub-grooves of the image-side surface of the plastic lens element is Ns, and the following condition is satisfied:

$$1 \leq Ns < 25.$$

9. The imaging lens set of claim 8, wherein the sum of the number of the sub-grooves of the object-side surface and the number of the sub-grooves of the image-side surface of the plastic lens element is Ns, and the following condition is satisfied:

$$2 \leq Ns < 16.$$

10. The imaging lens set of claim 8, wherein a length in a radial direction of the central axis of successive three of the stepped surfaces of the annular groove structure is w, and the following condition is satisfied:

$$0.02 \text{ mm} < w < 0.19 \text{ mm}.$$

11. The imaging lens set of claim 1, wherein a sum of a number of the stepped surfaces of the object-side surface and a number of the stepped surfaces of the image-side surface of the plastic lens element is greater than or equal to 4, and smaller than or equal to 48.

12. The imaging lens set of claim 11, wherein the sum of the number of the stepped surfaces of the object-side surface and the number of the stepped surfaces of the image-side surface of the plastic lens element is greater than or equal to 6, and smaller than or equal to 38.

13. The imaging lens set of claim 1, wherein a number of the lens element of the imaging lens set is at least two, and one of the effective optical sections of the plastic lens element and an effective optical section of another one of the lens elements which is adjacent to the plastic lens element are cemented by a cementing glue.

14. The imaging lens set of claim 1, wherein the receiving surface of the plastic lens element is farther from the effective optical section thereof than the conical surface thereof is from the effective optical section thereof, and the receiving surface of the another one of the lens elements is farther from an effective optical section thereof than the conical surface thereof is from the effective optical section thereof.

15. An imaging lens module, comprising:
the imaging lens set of claim 1; and
a plastic barrel, wherein the imaging lens set is disposed along the central axis in the plastic barrel, the plastic barrel comprises a barrel hole, and the barrel hole has a smallest diameter position.

16. The imaging lens module of claim 15, wherein the smallest diameter position of the barrel hole acts as an aperture stop of the imaging lens module.

17. An electronic device, comprising:
the imaging lens module of claim 15; and
an image sensor, wherein the image sensor is disposed on an image surface of the imaging lens module.

18. An imaging lens set comprising a plurality of optical elements, wherein at least two of the optical elements are lens elements, one of the at least two lens elements is a plastic lens element, the plastic lens element having a central axis comprises an object-side surface and an image-side surface, the image-side surface is located opposite to the object-side surface, and in order from the central axis to an edge of the plastic lens element, each of the object-side surface and the image-side surface comprises:
an effective optical section for being passed through by an imaging light and being aspheric; and
a lens peripheral section surrounding the effective optical section;
wherein at least one of the lens peripheral section of the object-side surface and the lens peripheral section of the image-side surface comprises at least one annular groove structure, the annular groove structure comprises a plurality of stepped surfaces, a light absorbing coating portion is disposed on at least part of one of the stepped surfaces, and the annular groove structure is not in contact with any optical element other than the plastic lens element;
wherein the plastic lens element and another one of the lens elements which is adjacent to the plastic lens element are arranged along the central axis, each of the plastic lens element and the another one of the lens elements comprises an axial connecting structure for being assembled with each other and aligned with the central axis, each of the axial connecting structures comprises a receiving surface and a conical surface, and a normal direction of each of the receiving surfaces is parallel to the central axis.

19. The imaging lens set of claim 18, wherein the plastic lens element with the annular groove structure is formed integrally and made by an injection molding method.

20. The imaging lens set of claim 19, wherein a number of the stepped surfaces of the annular groove structure is at least three, a length in a radial direction of the central axis of successive three of the stepped surfaces of the annular groove structure is w, and the following condition is satisfied:

$0.02 \text{ mm} < w < 0.19 \text{ mm}$.

21. The imaging lens set of claim 19, wherein a number of the stepped surfaces of the annular groove structure is at least three, a sub-groove is formed by successive three of the stepped surfaces of the annular groove structure, a sum of a number of sub-grooves of the object-side surface and a number of sub-grooves of the image-side surface of the plastic lens element is Ns, and the following condition is satisfied:

$1 \leq Ns < 25$.

22. The imaging lens set of claim 19, wherein a sum of a number of the stepped surfaces of the object-side surface and a number of the stepped surfaces of the image-side surface of the plastic lens element is greater than or equal to 4, and smaller than or equal to 48.

23. The imaging lens set of claim 19, wherein a number of the lens element of the imaging lens set is at least two, and one of the effective optical sections of the plastic lens element and an effective optical section of another one of the lens elements which is adjacent to the plastic lens element are cemented by a cementing glue.

24. The imaging lens set of claim 18, wherein the receiving surface of the plastic lens element is farther from the effective optical section thereof than the conical surface thereof is from the effective optical section thereof, and the receiving surface of the another one of the lens elements is farther from an effective optical section thereof than the conical surface thereof is from the effective optical section thereof.

25. An imaging lens module, comprising:
the imaging lens set of claim 18; and
a plastic barrel, wherein the imaging lens set is disposed along the central axis in the plastic barrel, the plastic barrel comprises a barrel hole, and the barrel hole has a smallest diameter position.

26. An electronic device, comprising:
the imaging lens module of claim 25; and
an image sensor, wherein the image sensor is disposed on an image surface of the imaging lens module.

* * * * *